US012779406B2

(12) United States Patent
Hasan et al.

(10) Patent No.: US 12,779,406 B2
(45) Date of Patent: Nov. 3, 2026

(54) MEMBRANE-BASED-SELF-ASSEMBLED, CHARGED MULTI-WALLED CARBON NANOTUBE/GRAPHENE OXIDE NANOHYBRIDS

(71) Applicant: Khalifa University of Science and Technology, Abu Dhabi (AE)

(72) Inventors: Shadi Wajih Hasan, Abu Dhabi (AE); Fawzi Banat, Abu Dhabi (AE); Ahmed Fayez Yousef, Abu Dhabi (AE); Lobna Issa Nassar, Abu Dhabi (AE); Hiyam Hisham Khalil, Abu Dhabi (AE); Hanaa Mohamed Samy Mohamed Saber Hegab, Abu Dhabi (AE); Vijay Kumar Shankarayya Wadi, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 468 days.

(21) Appl. No.: 18/381,753

(22) Filed: Oct. 19, 2023

(65) Prior Publication Data

US 2024/0131476 A1 Apr. 25, 2024
US 2024/0226815 A9 Jul. 11, 2024

Related U.S. Application Data

(60) Provisional application No. 63/417,412, filed on Oct. 19, 2022.

(51) Int. Cl.

| | |
|---|---|
| ***B01D 67/00*** | (2006.01) |
| ***B01D 69/14*** | (2006.01) |

(Continued)

(52) U.S. Cl.

CPC ....... *B01D 69/148* (2013.01); *B01D 67/0079* (2013.01); *B01D 71/0211* (2022.08);

(Continued)

(58) Field of Classification Search

CPC .............. B01D 67/0079; B01D 69/148; B01D 71/0211; B01D 71/0212; C02F 2305/08; C01B 32/198; C01B 2202/06

See application file for complete search history.

(56) References Cited

U.S. PATENT DOCUMENTS

2011/0220574 A1* 9/2011 Bakajin ................ B01D 69/148 977/902

FOREIGN PATENT DOCUMENTS

CN 107381970 A * 11/2017 .............. C02F 3/342
CN 111330456 A * 6/2020 ........... B01D 71/021

OTHER PUBLICATIONS

Mou et al—CN 107381970 A merged original document and FIT tranlsation—Nov. 24, 2017 (Year: 2017).*

(Continued)

*Primary Examiner* — Bradley R Spies
(74) *Attorney, Agent, or Firm* — Billion & Armitage

(57) ABSTRACT

The present disclosure relates to sustainable and green polylactic acid-based membranes embedded with self-assembled positively and negatively charged multiwalled carbon nanotube/graphene oxide nanohybrids for the removal of organic and inorganic nutrients from wastewater, and methods of synthesis of the same. A positively charged multi-walled carbon nanotube/graphene oxide (f-MWCNT/GO) nanohybrid-based mixed matrix membrane can comprise a self-assembled multi-walled carbon nanotube and graphene oxide (f-MWCNT/GO) nanohybrid, and a polylactic acid (PLA) membrane matrix. The f-MWCNT/GO nanohybrid is integrated into the PLA membrane matrix to form the positively charged mixed matrix membrane. A negatively charged multi-walled carbon nanotubes (f-GO/MWCNTs-COOH) nanohybrid-based mixed matrix membrane can comprise a positively charged Graphene Oxide and negatively charged multi-walled carbon nanotube- (Continued)

COOH (f-GO/MWCNTs-COOH) nanohybrid, and a polylactic acid (PLA) membrane matrix. The f-GO/MWCNTs-COOH nanohybrid is integrated into the PLA membrane matrix to form the negatively charged mixed matrix membrane.

20 Claims, 52 Drawing Sheets

(51) Int. Cl.

| | |
|---|---|
| ***B01D 71/02*** | (2006.01) |
| ***B01D 71/48*** | (2006.01) |
| ***C01B 32/174*** | (2017.01) |
| ***C01B 32/194*** | (2017.01) |
| ***C01B 32/198*** | (2017.01) |
| ***C02F 1/44*** | (2023.01) |

(52) U.S. Cl.
CPC ......... *B01D 71/0212* (2022.08); *B01D 71/48* (2013.01); *C01B 32/174* (2017.08); *C01B 32/194* (2017.08); *C01B 32/198* (2017.08); *C02F 1/44* (2013.01); *C01B 2202/06* (2013.01); *C01P 2002/72* (2013.01); *C01P 2002/82* (2013.01); *C01P 2002/88* (2013.01); *C01P 2004/03* (2013.01)

(56) References Cited

OTHER PUBLICATIONS

Zheng et al—CN 111330456 A merged original document and FIT translation—Mar. 5, 2020 (Year: 2020).*
Ahmad, et al., "Biodegradable Poly (lactic acid)/Poly (ethylene glycol) Reinforced Multi-Walled Carbon Nanotube Nanocomposite Fabrication, Characterization, Properties, and Applications", Polymers, 12(2), 2020, 427.
Ahmadiannamini, et al., "Mixed-matrix membranes for efficient ammonium removal from wastewaters", Journal of Membrane Science, 526(4), 2017, 147-155.
Aseri, et al., "Preparation and characterization of polylactic acid-modified polyvinylidene fluoride hollow fiber membranes with enhanced water flux and antifouling resistance", Journal of Water Process Engineering 32, 2019, 10 pages.
Aslam, et al., "Functionalized Carbon Nanotubes (CNTs) for Water and Wastewater Treatment: Preparation to Application", Sustainability 13(10), 2021, 54 pages.
Atieh, et al., "Effect of Carboxylic Functional Group Functionalized on Carbon Nanotubes Surface on the Removal of Lead from Water", Bioinorganic Chemistry and Applications, 2010(1), 2010, 9 pages.
Basu, et al., "Poly-L-Lysine functionalised MWCNT-rGO nanosheets based 3-d hybrid structure for femtomolar level cholesterol detection using cantilever based sensing platform", Scientific reports, 9(1), 2019, 13 pages.
Bódalo, et al., "Ammonium removal from aqueous solutions by reverse osmosis using cellulose acetate membranes", Desalination, 184(1-3), 2005, 149-155.
Cairone, et al., "Novel eco-friendly polylactic acid nanocomposite integrated membrane system for sustainable wastewater treatment: Performance evaluation and antifouling analysis", Science of The Total Environment, 912, 2024, 13 pages.
Chieng, et al., "Poly(lactic acid)/Poly(ethylene glycol) Polymer Nanocomposites: Effects of Graphene Nanoplatelets", Polymers, 6(1), 2013, 93-104.
Gebru, et al., "Removal of bovine serum albumin from wastewater using fouling resistant ultrafiltration membranes based on the blends of cellulose acetate, and PVP-TiO2 nanoparticles", Journal of Environmental Management, 200(7), 2017, 283-294.
He, et al., "Simultaneous removal of ammonium and phosphate by alkaline-activated and lanthanum-impregnated zeolite", Chemosphere, 164, 2016, 387-395.
Hsiao, et al., "Preparation of Covalently Functionalized Graphene Using Residual Oxygen-Containing Functional Groups", ACS Applied Materials and Interfaces, 2(11), 2010, 3092-3099.
Hu, et al., "Enabling Graphene Oxide Nanosheets as Water Separation Membranes", Environmental Science and Technology, 47(8), 2013, 3715-3723.
Ibrahim, et al., "Preparation of novel polyvinylidene fluoride (PVDF)-Tin(IV) oxide (SnO2) ion exchange mixed matrix membranes for the removal of heavy metals from aqueous solutions", Separation and Purification Technology, 250(2), 2020, 15 pages.
Ibrahim, et al., "Surface modification of anti-fouling novel cellulose/graphene oxide (GO) nanosheets (NS) microfiltration membranes for seawater desalination applications", Journal of Chemical Technology and Biotechnology, 95(7), 2020, 1915-1925.
Khalil, et al., "Asymmetrical ultrafiltration membranes based on polylactic acid for the removal of organic substances from wastewater", Journal of Water Process Engineering, 45, 2022, 10 pages.
Khalil, et al., "High-performance f-GO/MWCNTs-COOH nanohybrid-based polylactic acid mixed matrix membrane for wastewater treatment", Journal of Water Process Engineering, 53, 2023, 16 pages.
Khalil, et al., "Self-assembled Negatively Charged GO-MWCNT Composite for Wastewater Filtration", Advances in Science, Technology and Innovation, 2022, 157-159.
Koh, et al., "Improvement of Ultrafiltration for Treatment of Phosphorus-Containing Water by a Lanthanum-Modified Aminated Polyacrylonitrile Membrane", ACS Omega, 5(13), 2020, 7170-7181.
Kumar, et al., "Novel antifouling positively charged hybrid ultrafiltration membranes for protein separation based on blends of carboxylated carbon nanotubes and aminated poly(arylene ether sulfone)", Journal of Membrane Science, 448, 2013, 62-73.
Makhetha, et al., "Incorporation of a novel Ag—Cu@ZIF-8@GO nanocomposite into polyethersulfone membrane for fouling and bacterial resistance", Journal of Membrane Science, 618(4), 2021, 12 pages.
Mehrparvar, et al., "Modified ultrafiltration membranes for humic acid removal", Journal of the Taiwan Institute of Chemical Engineers, 45(1), 2014, 275-282.
Mohamad, et al., "Evaluation on structural properties and performances of graphene oxide incorporated into chitosan/poly-lactic acid composites: Cs/pla versus cs/pla-go", Polymers, 13(11), 2021, 17 pages.
Mousavi, et al., "Chitosan-wrapped multiwalled carbon nanotube as filler within PEBA thin film nanocomposite (TFN) membrane to improve dye removal", Carbohydrate Polymers, 237(4), 2020, 11 pages.
Nassar, et al., "Development of green polylactic acid asymmetric ultrafiltration membranes for nutrient removal", Science of The Total Environment, 824, 2022, 12 pages.
Nassar, et al., "Self-assembled Positively Charged MWCNT-GO Composites for Wastewater Treatment", Advances in Science, Technology and Innovation, 2022, 149-151.
Nassar, et al., "Sustainable and green polylactic acid-based membrane embedded with self-assembled positively charged f-MWCNTs/GO nanohybrids for the removal of nutrients from wastewater", Npj Clean Water, 5(1),, 2022, 1-11.
Razavi, et al., "A novel thin film nanocomposite forward osmosis membrane modified with zwitterionic GO-g-PSBMA with high fouling resistance and heavy metal ions rejection", Journal of Environmental Chemical Engineering, 13(1), 2025, 11 pages.
Rohani, et al., "Ammonia removal from raw water by using adsorptive membrane filtration process", Separation and Purification Technology 270, 2021, 8 pages.
Sianipar, et al., "Functionalized carbon nanotube (CNT) membrane: progress and challenges", RSC Advances, 7(81), 2017, 24 pages.
Vuković, et al., "Removal of cadmium from aqueous solutions by oxidized and ethylenediamine-functionalized multi-walled carbon nanotubes", Chemical Engineering Journal, 157(1), 2010, 238-248.

(56) References Cited

OTHER PUBLICATIONS

Wimalasiri, et al., "Thermodynamics and kinetics of adsorption of ammonium ions by graphene laminate electrodes in capacitive deionization", Desalination, 357, 2015, 178-188.
Wu, et al., "Synergistic effects of CNT and GO on enhancing mechanical properties and separation performance of polyelectrolyte complex membranes", Materials & Design, 119(10), 2017, 38-46.
Wulandari, et al., "Synthesis and characterization carboxyl functionalized Multi-Walled Carbon Nanotubes (MWCNT-COOH) and NH2 functionalized Multi-Walled Carbon Nanotubes (MWCNTNH2)", Journal of Physics: Conference Series, 1025(1), 2018, 10 pages.
Xia, et al., "Phosphorus removal from diluted wastewaters using a La/C nanocomposite-doped membrane with adsorption-filtration dual functions", Chemical Engineering Journal, 405(4275), 2021, 9 pages.
Xu, et al., "Removal of Pb(II) from aqueous solution by oxidized multiwalled carbon nanotubes", Journal of Hazardous Materials, 154(1-3), 2008, 407-416.
Yuan, et al., "Multifunctional PVDF/CNT/GO mixed matrix membranes for ultrafiltration and fouling detection", Journal of Hazardous Materials, 384(6), 2020, 11 pages.
Zhang, et al., "Construction of SiO2@MWNTs incorporated PVDF substrate for reducing internal concentration polarization in forward osmosis", Journal of Membrane Science, 564, 2018, 328-341.
Zhuo, et al., "Preparation and characterization of WPU/CNT/GO nanocomposites", Integrated Ferroelectrics, 171(1), 2016, 52-58.

* cited by examiner (ii)

(i)

(i)

(iii)

(ii)

(iii)

M0 M1 M2 M3

MEMBRANE-BASED-SELF-ASSEMBLED, CHARGED MULTI-WALLED CARBON NANOTUBE/GRAPHENE OXIDE NANOHYBRIDS

CROSS-REFERENCE TO RELATED APPLICATION

This application claims the benefit of U.S. Provisional Application No. 63/417,412 filed on Oct. 19, 2022. U.S. Provisional Application No. 63/417,412 is incorporated herein by reference in its entirety. A claim of priority is made.

BACKGROUND

By 2025, around 1.80 billion people may experience water scarcity. The growing population, rising industrialization, and the ever-increasing demand for energy have made water scarcity an emerging global issue. Thus, there is a need to develop advanced, efficient, and sustainable water and wastewater treatment technologies. The membrane water and wastewater treatment market size has been growing at a moderate pace with substantial growth rates over the last few years and is estimated that the market will grow significantly in the forecasted period, i.e., 2023 to 2030. The growing scarcity of potable water, increasing demand for water, and rising urbanization are expected to drive the membrane water and wastewater treatment market over the predicted years. Coupled with these factors, stringent government emission regulations and rising urbanization are expected to give a boost to the market in the coming years.

Based on the type of product, the wastewater treatment market can be bifurcated into microfiltration, ultrafiltration, nanofiltration, and reverse osmosis. Based on application, the market can be bifurcated into municipal, food and beverage, healthcare, and others. Based on regional analysis, the global membrane water and wastewater treatment market may be dominated by the Asia Pacific region owing to the upsurge in the need for disposal of wastewater due to rapid industrialization in this region.

It would be beneficial to develop a membrane for wastewater treatment applications that is effective at removing organics and nutrients but is also biodegradable.

SUMMARY

According to one aspect, a positively charged multi-walled carbon nanotube/graphene oxide (f-MWCNT/GO) nanohybrid-based mixed matrix membrane for wastewater treatment includes a self-assembled multi-walled carbon nanotube and graphene oxide (f-MWCNT/GO) nanohybrid and a polylactic acid (PLA) membrane matrix. The f-MWCNT/GO nanohybrid is integrated into the PLA membrane matrix to form the positively charged mixed matrix membrane.

According to another aspect, a method of synthesis of a positively charged multi-walled carbon nanotube/graphene oxide (f-MWCNT/GO) nanohybrid-based mixed matrix membrane includes adding a self-assembled positively charged multi-walled carbon nanotube and graphene oxide (f-MWCNT/GO) nanohybrid to a solvent and dispersing the f-MWCNT/GO nanohybrid in the solvent to form a mixture. The method further includes adding polylactic acid (PLA) and polyvinylpyrrolidone (PVP) to the mixture to form a homogeneous dope solution and casting the homogeneous dope solution onto a support to form the positively charged mixed matrix membrane of the f-MWCNT/GO nanohybrid integrated into a PLA membrane matrix.

According to another aspect, a negatively charged multi-walled carbon nanotubes (f-GO/MWCNTs-COOH) nanohybrid-based mixed matrix membrane for wastewater treatment includes a positively charged Graphene Oxide and negatively charged multi-walled carbon nanotube-COOH (f-GO/MWCNTs-COOH) nanohybrid and a polylactic acid (PLA) membrane matrix. The f-GO/MWCNTs-COOH nanohybrid is integrated into the PLA membrane matrix to form the negatively charged mixed matrix membrane.

According to another aspect, a method of synthesis of a negatively charged self-assembled functionalized graphene oxide carboxylic multi walled carbon nanotubes (f-GO/MWCNTs-COOH) nanohybrid-based mixed matrix membrane includes adding a self-assembled negatively charged f-GO/MWCNTs-COOH nanohybrid to a solvent and dispersing the f-GO/MWCNTs-COOH nanohybrid in the solvent to form a mixture. The method further includes adding polylactic acid (PLA) and polyvinylpyrrolidone (PVP) to the mixture to form a homogeneous dope solution and casting the homogeneous dope solution onto a support to form the negatively charged mixed matrix membrane of the f-GO/MWCNTs-COOH nanohybrid integrated into a PLA membrane matrix.

This summary is intended to provide an overview of subject matter of the present disclosure. It is not intended to provide an exclusive or exhaustive explanation of the invention. The detailed description is included to provide further information about the present patent application.

BRIEF DESCRIPTION OF DRAWINGS

This written disclosure describes illustrative embodiments that are non-limiting and non-exhaustive. Reference is made to illustrative embodiments that are depicted in the figures, in which:

FIG. 6A shows the SEM images of prepared nanomaterials. FIG. 6B shows the Zeta potential measurements of the fabricated nanohybrids with different ratios. FIG. 6C shows the TGA curves of the fabricated nanomaterials. FIG. 6D shows the FTIR spectrum of fabricated nanomaterials. FIG. 6E shows the XRD patterns of fabricated nanomaterials.

FIG. 7A shows the SEM images and EDS elemental mapping of the pristine and nanocomposite membranes. FIG. 7B shows the cross-sectional and magnified SEM images of the pristine and nanocomposite membranes. FIG. 7Ci and FIG. 7Cii show the TGA curves of the pristine and nanocomposite membranes. FIG. 7Di and FIG. 7Dii show the FTIR spectrum of pristine and nanocomposite membranes.

FIG. 11A shows the static CA and surface free energy of the pristine and nanocomposite membranes. FIG. 11B shows the pure water flux and permeability profiles of the pristine and nanocomposite membranes.

FIG. 11C shows the Zeta potential of M0 and M1.5 membranes. Nutrient ions removal over 3 h of operation using the M0 membrane (FIG. 11D) and the M1.5 membrane (FIG. 11E). Nutrient ion removal of M0 (FIG. 11F), M1.5 membranes (FIG. 11G), and h pure water flux (FIG. 11H), after several raw wastewater filtration cycles.

DETAILED DESCRIPTION

Figure 1:
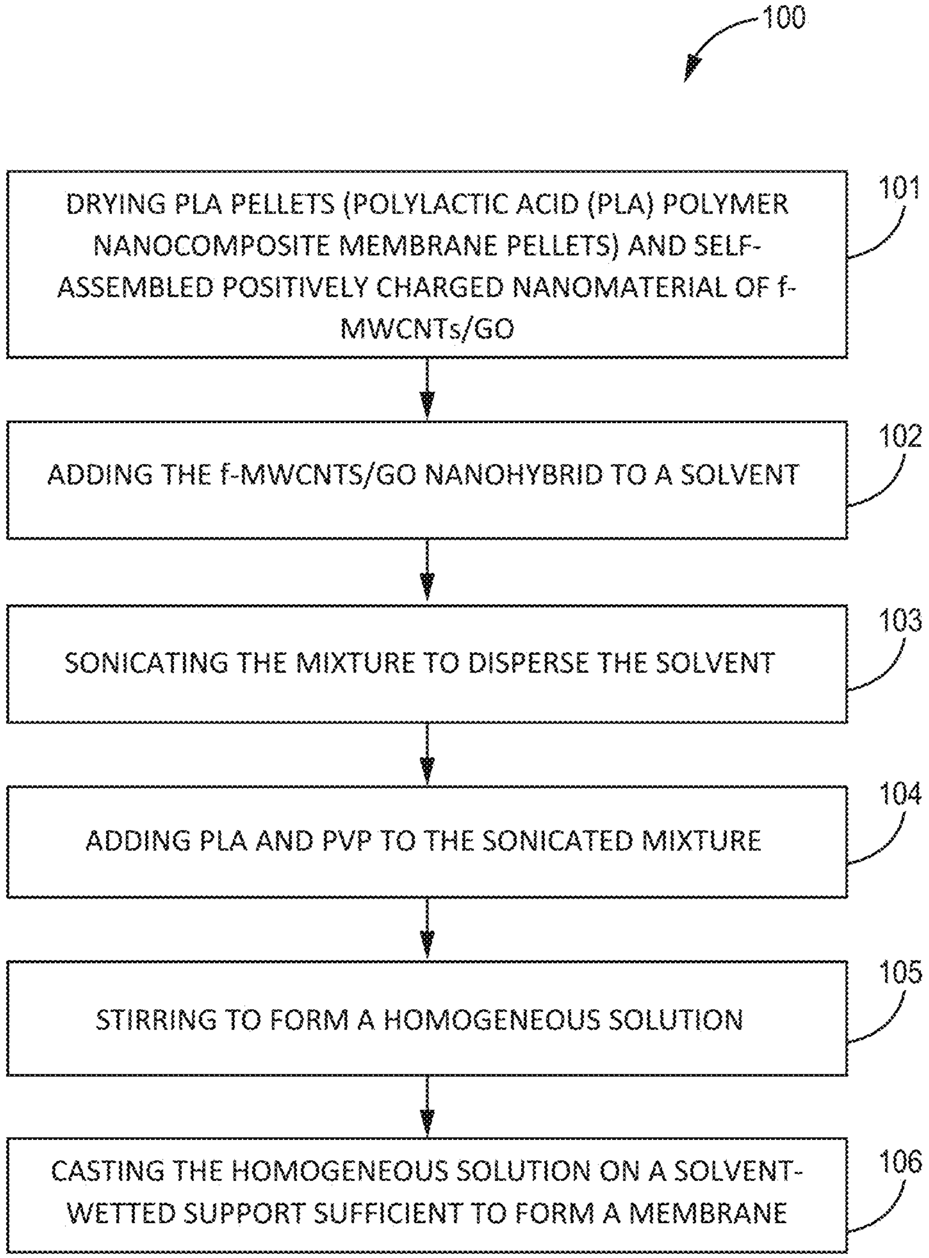
FIG. 1 is a flowchart illustrating the steps utilized in a method of synthesis of positively charged multi-walled carbon nanotube/graphene oxide (f-MWCNT/GO) nanohybrid-based mixed matrix membrane, according to some embodiments.

The present disclosure is directed to novel advanced mixed matrix membranes for the removal of pollutants from wastewater including organics and nutrients, including functionalized graphene oxide (GO) and functionalized multi-walled carbon nanotubes (MWCNTs) nanocomposite membranes for wastewater treatment applications. The exceptional properties of CNT and GO nanomaterials, such as high dispersion and solubility, excellent thermal stability, high tensile strength as well as their hydrophilicity properties, make them a great candidate for further membrane development for specific applications. The present invention is directed to the incorporation of functionalized multi-walled CNT (f-MWCNT)/GO nanohybrids in the fabrication of membranes for the removal of organics and nutrients, such as nitrogen (N), ammonia (NH 3), and phosphorus (P), from wastewater.

Biodegradable polymeric membranes, unlike synthetic polymers, can be composted after their life cycle is complete through the composting process, mitigating the negative environmental consequences. The present disclosure in general relates to the fabrication of polylactic acid (PLA) membranes for the removal of nutrients from synthetic and real wastewater. Unlike synthetic polymers, PLA was chosen for such an application because of its low toxicity and recyclability.

The present disclosure is directed to sustainable and green polylactic acid-based membranes embedded with self-assembled positively and negatively charged multiwalled carbon nanotube/graphene oxide nanohybrids for the removal of organic, inorganic nutrients from wastewater and methods of synthesis of the same. A positively charged multi-walled carbon nanotube/graphene oxide (f-MWCNT/GO) nanohybrid-based mixed matrix membrane can comprise a self-assembled multi-walled carbon nanotube and graphene oxide (f-MWCNT/GO) nanohybrid, and a polylactic acid (PLA) membrane matrix. The f-MWCNT/GO nanohybrid is integrated into the PLA membrane matrix to form the positively charged mixed matrix membrane. A negatively charged multi-walled carbon nanotubes (f-GO/MWCNTs-COOH) nanohybrid-based mixed matrix membrane can comprise a positively charged Graphene Oxide and negatively charged multi-walled carbon nanotube-COOH (f-GO/MWCNTs-COOH) nanohybrid, and a polylactic acid (PLA) membrane matrix. The f-GO/MWCNTs-COOH nanohybrid is integrated into the PLA membrane matrix to form the negatively charged mixed matrix membrane.

The term 'loading' as used herein can refer to a concentration by weight of the nanohybrid (f-MWCNT/GO or f-GO/MWCNTs-COOH), relative to a concentration by weight of polylactic acid (PLA), during formation of the mixed matrix membrane. The nanohybrid is combined with PLA in a homogeneous dope solution during a process for forming the mixed matrix membrane. In the formation of a positively charged multi-walled carbon nanotube/graphene oxide (f-MWCNT/GO) nanohybrid-based mixed matrix membrane, in some embodiments, the loading or concentration of the f-MWCNT/GO nanohybrid can be between about 0.5 wt. % and about 6.0 wt. %, relative to the amount (by weight) of PLA. In the formation of a negatively charged self-assembled functionalized graphene oxide carboxylic multi-walled carbon nanotubes (f-GO/MWCNTs-COOH) nanohybrid-based mixed matrix membrane, in some embodiments, the loading or concentration of the f-GO/MWCNTs-COOH nanohybrid can be between about 0.5 wt. % and about 6.0 wt. %, relative to the amount (by weight) of PLA.

The nanohybrid is generally stable during formation of the mixed matrix membrane and thus the amount of the nanohybrid in the mixed matrix membrane is generally the same as in the dope solution. In some embodiments, the amount of the f-MWCNT/GO nanohybrid in the positively charged mixed matrix membrane is between about 0.5 wt. % and about 6.0 wt. %. In some embodiments, the amount of the f-GO/MWCNTs-COOH nanohybrid in the negatively charged mixed matrix membrane is between about 0.5 wt. % and about 6.0 wt. %.

Positively Charged Multi-Walled Carbon Nanotube/Graphene Oxide (F-MWCNT/GO) Nanohybrid-Based Mixed Matrix Membrane Embodiments of the present disclosure describe a positively charged multi-walled carbon nanotube/graphene oxide (f-MWCNT/GO) nanohybrid-based mixed matrix membrane for wastewater treatment, comprising self-assembled multi-walled carbon nanotube and graphene oxide nanohybrid; and polylactic acid (PLA) membrane matrix. The f-MWCNT/GO nanohybrid is integrated into the PLA membrane matrix to form the positively charged mixed matrix membrane. The f-MWCNT/GO nanohybrid loading during formation of the mixed matrix membrane can be between about 0.5 wt. % and about 6 wt. %, relative to the amount by weight of PLA. In some embodiments, the loading is between about 1.5 wt. % and about 6 wt. %. In some embodiments, the loading is between about 1.5 wt. % and about 3 wt. %. In some embodiments, the loading is between about 3 wt. % and about 6 wt. %. In some embodiments, the loading is about 4 wt. % or about 5 wt. %.

In some embodiments of the present disclosure, the positively charged nanohybrid-based mixed matrix membrane is such wherein the multi-walled carbon nanotube and graphene oxide are present in a solvent. The solvent solution comprising the multi-walled carbon nanotube and graphene oxide constitutes the dope solution. In some embodiments of the present disclosure, the solvent includes but is not limited to dimethyl acetamide, dioxane, acetonitrile, chloroform, methylene chloride, 1,1,2-trichloroethane and dichloroacetic acid.

Embodiments of the present disclosure describe a positively charged nanohybrid-based mixed matrix membrane, wherein the multi-walled carbon nanotube and graphene oxide are present in different ratios. In some embodiments, the multi-walled carbon nanotube is present in a higher amount relative to the amount (by weight) of graphene oxide. Some embodiments of the present disclosure describe a positively charged nanohybrid-based mixed matrix membrane, wherein the multi-walled carbon nanotube and graphene oxide are present in the ratio (by weight) of about 60:40. Some embodiments of the present disclosure describe a positively charged nanohybrid-based mixed matrix membrane, wherein the multi-walled carbon nanotube and graphene oxide are present in the ratio of about 70:30. Yet other embodiments of the present disclosure describe a positively charged nanohybrid-based mixed matrix membrane, wherein the multi-walled carbon nanotube and graphene oxide are present in the ratio of about 80:20.

Some embodiments of the present disclosure describe a positively charged nanohybrid-based mixed matrix membrane, wherein the membrane is thermally stable up to about 280° C. Some embodiments of the present disclosure describe a positively charged nanohybrid-based mixed matrix membrane, wherein the membrane has a semi-crystalline structure.

Some embodiments of the present disclosure describe a positively charged nanohybrid-based mixed matrix membrane, wherein an amount of the f-MWCNT/GO nanohybrid in the mixed matrix membrane is about 0.5 wt. % and about 6.0 wt. %. Some embodiments of the present disclosure describe a positively charged nanohybrid-based mixed matrix membrane, wherein an amount of the f-MWCNT/GO nanohybrid in the mixed matrix membrane is about 1.5 wt. %. Some embodiments of the present disclosure describe a positively charged nanohybrid-based mixed matrix membrane, wherein the amount of the f-MWCNT/GO nanohybrid in the mixed matrix membrane is about 3.0 wt. %. Some embodiments of the present disclosure describe a positively charged nanohybrid-based mixed matrix membrane, wherein the amount of the f-MWCNT/GO nanohybrid in the mixed matrix membrane is about 6.0 wt. %. In some embodiments, the amount of the f-MWCNT/GO nanohybrid is about 4.0 wt. % or about 5.0 wt. %.

Some embodiments of the present disclosure describe a positively charged nanohybrid-based mixed matrix membrane, wherein wastewater treatment comprises the removal of nutrients. Yet other embodiments of the present disclosure describe a positively charged nanohybrid-based mixed matrix membrane, wherein the nutrients removed comprise nitrate ($NO_3^-$—N), phosphate ($PO_4^{3-}$—P) and ammonium ($NH_4^+$—N).

Some embodiments of the present disclosure describe a positively charged nanohybrid-based mixed matrix membrane, wherein the loading of the nanohybrid in the PLA membrane matrix increases the water flux. Certain embodiments of the present disclosure describe a positively charged nanohybrid-based mixed matrix membrane, wherein the water flux increases from about 9 to about 140 $L/m^2 \cdot h \cdot bar$ (as compared to a PLA membrane without the nanohybrid).

Method of Synthesis of Positively Charged Multi-Walled Carbon Nanotube/Graphene Oxide (f-MWCNT/GO) Nanohybrid-Based Mixed Matrix Membrane FIG. 1 is a flowchart illustrating the steps utilized in method 100 of the synthesis of positively charged multi-walled carbon nanotube/graphene oxide (f-MWCNT/GO) nanohybrid-based mixed matrix membrane. As shown in FIG. 1, the method of synthesis of a positively charged multi-walled carbon nanotube/graphene oxide (f-MWCNT/GO) nanohybrid-based mixed matrix membrane may comprise drying (101) PLA pellets (polylactic acid pellets) and self-assembled positively charged nanomaterial of f-MWCNTs/GO. This is followed by adding (102) the f-MWCNTs/GO nanohybrid to a solvent and sonicating (103) the mixture to disperse the solvent. Adding (104) PLA and polyvinylpyrrolidone (PVP) to the sonicated mixture and stirring (105) the mixture to form a homogeneous solution. This is followed by casting (106) the solution on solvent-wetted support sufficient to form a membrane, wherein the fabrication of free-standing membranes was performed without support.

Step 101 includes drying PLA pellets and self-assembled positively charged nanomaterial of f-MWCNTs/GO. PLA pellets were purchased from Nature Works LLC (Ingeo™ Biopolymer 4060D as indicated by the supplier) and dried in an oven at 60° C. for 12 h before use. The viscous mixture of self-assembled positively charged nanomaterial of f-MWCNTs/GO was freeze-dried for 72 h to obtain a dry powder. PLA pellets and the self-assembled positively charged nanomaterial of f-MWCNTs/GO were dried overnight in an oven at a temperature of 70° C. to ensure the removal of any moisture traces.

Figure 2A:
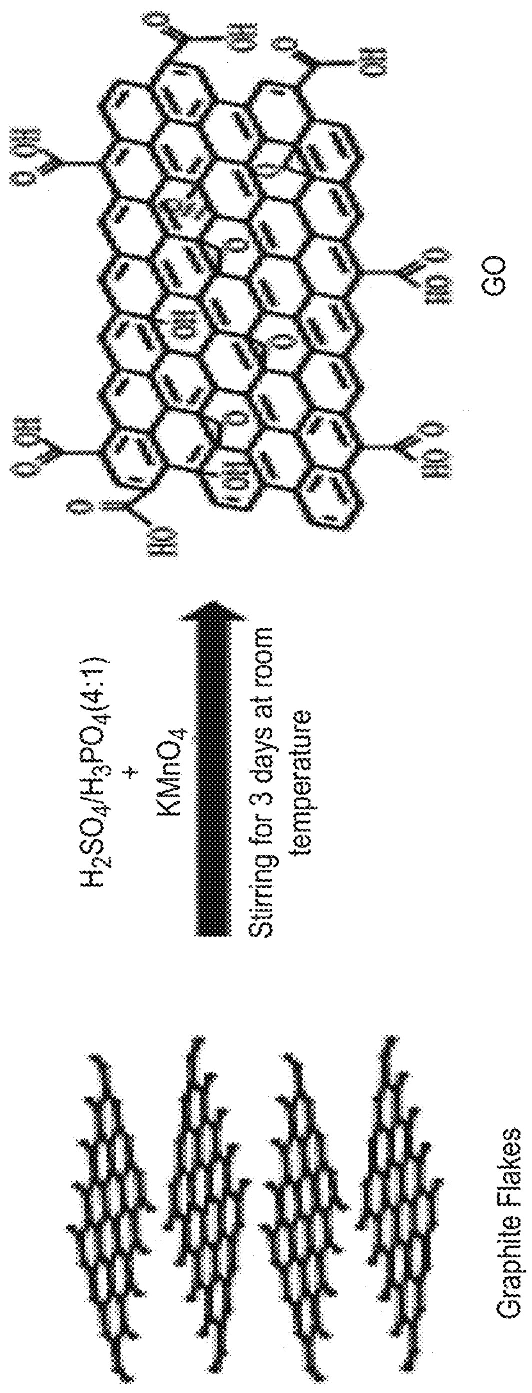
FIGS. 2A-2C are schematic representations of the synthesis of (FIG. 2A) GO nanosheets, (FIG. 2B) f-MWCNTs nanomaterial, and (FIG. 2C) f-MWCNTs/GO nanohybrid, according to some embodiments.

For the synthesis of GO nanosheets, the graphite (Gt) flakes were oxidized using the simplified Hummers' method (FIG. 2A). $H_2SO_4$ and $H_3PO_4$ (4:1 by volume ratio) were added to a 2 L beaker. To this, 3 g of natural Gt flakes were added, then 18 g of $KMnO_4$ were added in several parts to avoid any rapid exothermic reaction. The solution was kept for 3 days under slow stirring using a magnetic stirrer to allow the oxidation of Gt. The solution was then transferred to an ice bath, and $H_2O_2$ solution was added dropwise until the oxidation process was stopped, resulting in a color change from dark brown to bright yellow, reflecting the high-degree oxidation of Gt. The mixture obtained was washed with 1 M HCl followed by DI water by centrifugation until the pH of the solution was neutral. The GO solution was placed in dialysis tubes for two to three days to remove the impurities further. Finally, the highly concentrated intercalated oxidized Gt oxide solution was then collected and exfoliated by ultrasonication to obtain a GO solution.

Figure 2B:
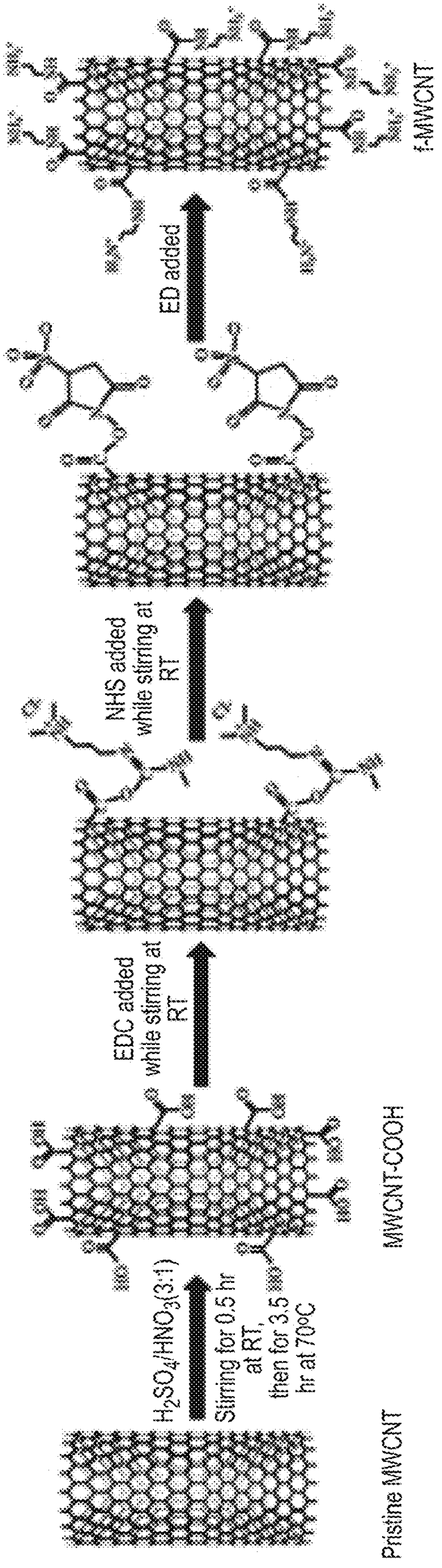

For the synthesis of positively functionalized MWCNTs, carboxylated MWCNTs (MWCNTs-COOH) was prepared as follows: 2 g of pristine MWCNTs were treated with a strong oxidizing acid mixture of $H_2SO_4$ and $HNO_3$ (3:1 by volume ratio). The mixture was stirred for 30 min at room temperature, then heated at 70° C. in an oil bath and stirred for another 3.5 h. The mixture was left to cool to room temperature and then carefully poured into ice water to stop the reaction. The MWCNTs-COOH was purified via centrifugation with DI water until the wash water had a neutral pH, and the MWCNTs-COOH was collected in an airtight bottle. The concentration of both GO and MWCNTs-COOH was calculated by the weight difference method. To prepare the positive functionalized-MWCNTs (f-MWCNTs); 2 g of 1-Ethyl-3-(3-dimethylaminopropyl) carbodiimide hydrochloride (EDC) and 2 g of N-Hydroxysuccinimide (NHS) were added to a known volume of MWCNTs-COOH and left to stir at room temperature for 4 h to convert the carboxyl groups (R—COOH) of the MWCNTs into intermediate amine-reactive esters. Subsequently, 2.5 g of ethylenediamine (ED) in DI water was added to the mixture dropwise while stirring, allowing the reaction of free amino groups with the reactive esters to covalently bond the R—COOH of MWCNTs (FIG. 2B). Since the reaction favors acidic conditions, HCl was added until the pH was acidic. The mixture was left to stir at room temperature overnight. Finally, the mixture was washed and centrifuged with DI water several times to remove the underacted reactants and coupling agents.

Figure 2C:
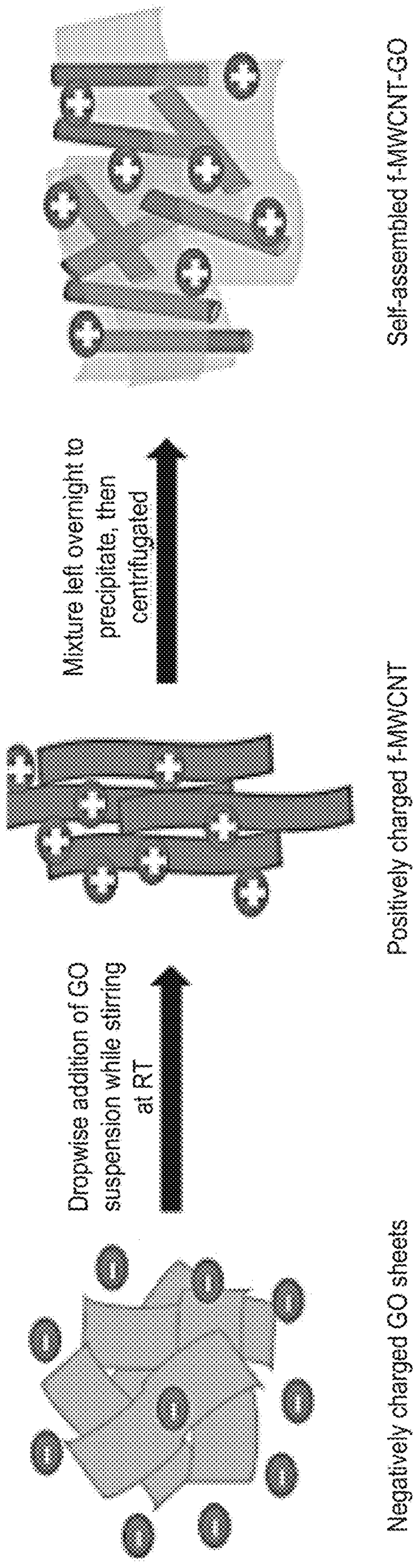

The self-assembled positively charged f-MWCNTs/GO nanohybrid (FIG. 2C) was prepared via the electrostatic co-precipitation approach. Briefly, the 80:20 f-MWCNT/GO preparation was as follows: 120 mL of GO solution (1.5 mg $mL^{-1}$) was ultrasonicated for 30 min to ensure exfoliation and homogeneous dispersion. In a separate beaker, 480 mL of f-MWCNTs solution (1.5 mg $mL^{-1}$) was added dropwise under vigorous stirring at room temperature to the GO solution. The mixture was left overnight to precipitate the self-assembled product and then collected by centrifugation (8000 rpm). The viscous mixture was freeze-dried for 72 h to obtain a dry powder.

Step 102 includes adding (102) the f-MWCNTs/GO nanohybrid to a solvent and sonicating (103) the mixture to disperse the solvent. The f-MWCNTs/GO nanohybrid with different concentrations (1.5, 3, and 6 wt. %) were added to the N, N-Dimethylacetamide (DMAc), then placed in Branson® Ultrasonic Bath for 3 h to assure dispersity in the solvent.

Step 104 includes adding (104) PLA and polyvinylpyrrolidone (PVP) to the sonicated mixture and stirring (105) the mixture to form a homogeneous solution. To the sonicated mixture, known masses of PLA and PVP were then added and stirred for 24 h at 70° C. to form a homogeneous solution. In some embodiments, the PLA can be added as pellets and the PVP can be added as powder.

Step 106 includes casting (106) the solution on solvent-wetted support sufficient to form a membrane, wherein the fabrication of free-standing membranes was performed without support. Before membrane casting, all solutions were sonicated for at least an hour, then placed in a vacuum oven at 70° C. for another hour and finally placed on the shelf for 30 min to achieve bubble-free solutions. The membranes were cast on DMAc-wetted support on the glass plate using a casting knife set with a thickness of 250 microns.

The wet membranes were then immediately immersed in a deionized (DI) water coagulation bath for 24 h, the membranes were again rinsed with DI water to remove any traces of DMAc and finally left to dry and stored at room temperature. Moreover, the fabrication of free-standing membranes was performed because some characterizations required the membranes to be without support.

Embodiments of the present disclosure describe a method of synthesis of positively charged multi-walled carbon nanotube/graphene oxide (f-MWCNT/GO) nanohybrid-based mixed matrix membrane, wherein the f-MWCNT/GO nanohybrid loading during formation of the mixed matrix membrane is between about 0.5 wt. % and about 6 wt. %, relative to the amount of PLA. In some embodiments, the f-MWCNT/GO nanohybrid loading is about 1.5 wt. %, about 3 wt. %, about 4 wt. %, or about 5 wt. %.

In some embodiments of the present disclosure, the method of synthesis of positively charged nanohybrid-based mixed matrix membrane is such wherein the multi-walled carbon nanotube and graphene oxide are present in a solvent. The solvent solution comprising the constituted carbon nanotube and graphene oxide constitutes the dope solution. Some embodiments of the present disclosure describe a method of synthesis of positively charged nanohybrid-based mixed matrix membrane, wherein the solvent includes, but is not limited to dimethyl acetamide, dioxane, acetonitrile, chloroform, methylene chloride, 1,1,2-trichloroethane and dichloroacetic acid.

Embodiments of the present disclosure describe a method of synthesis of positively charged nanohybrid-based mixed matrix membrane, wherein the multiwalled carbon nanotube and graphene oxide are present in different ratios. In some embodiments, the multi-walled carbon nanotube is present in a higher amount relative to the graphene oxide. Some embodiments of the present disclosure describe a method of synthesis of positively charged nanohybrid-based mixed matrix membrane, wherein the multi-walled carbon nanotube and graphene oxide are present in the ratio (by weight) of about 60:40. Some embodiments of the present disclosure describe a method of synthesis of positively charged nanohybrid-based mixed matrix membrane, wherein the multi-walled carbon nanotube and graphene oxide are present in the ratio of about 70:30. Yet other embodiments of the present disclosure describe a method of synthesis of positively charged nanohybrid-based mixed matrix membrane, wherein the multi-walled carbon nanotube and graphene oxide are present in the ratio of about 80:20.

Some embodiments of the present disclosure describe a method of synthesis of positively charged nanohybrid-based mixed matrix membrane, wherein the membrane is thermally stable up to 280°. Some embodiments of the present disclosure describe a method of synthesis of positively charged nanohybrid-based mixed matrix membrane, wherein the membrane has a semi-crystalline structure.

Some embodiments of the present disclosure describe a method of synthesis of positively charged nanohybrid-based mixed matrix membrane, wherein the f-MWCNT/GO nanohybrid loading in the PLA membrane matrix is between about 0.5 wt. % and about 6.0 wt. %, relative to the amount of PLA. Some embodiments of the present disclosure describe a method of synthesis of positively charged nanohybrid-based mixed matrix membrane, wherein the f-MWCNT/GO nanohybrid loading in the PLA membrane matrix is about 1.5 wt. %. Some embodiments of the present disclosure describe a method of synthesis of positively charged nanohybrid-based mixed matrix membrane, wherein the f-MWCNT/GO nanohybrid loading in the PLA membrane matrix is about 3.0 wt. %. In some embodiments, the f-MWCNT/GO nanohybrid loading is about 4 wt. %, about 5 wt. % or about 6 wt. %.

Some embodiments of the present disclosure describe a method of synthesis of positively charged nanohybrid-based mixed matrix membrane, wherein the membrane exhibits wastewater treatment. Some embodiments of the present disclosure describe a method of synthesis of positively charged nanohybrid-based mixed matrix membrane, wherein the wastewater treatment comprises the removal of nutrients. Yet other embodiments of the present disclosure describe a method of synthesis of positively charged nanohybrid-based mixed matrix membrane, wherein the nutrients removed include, but are not limited to nitrogen and phosphorus.

Some embodiments of the present disclosure describe a method of synthesis of positively charged nanohybrid-based mixed matrix membrane, wherein the loading of the nanohybrid in the PLA membrane matrix increases the water flux. Certain embodiments of the present disclosure describe a method of synthesis of positively charged nanohybrid-based mixed matrix membrane, wherein the water flux increases from 9 to 140 $L/m^2 \cdot h \cdot bar$.

Negatively Charged Self-Assembled Functionalized Graphene Oxide Carboxylic Multi-Walled Carbon Nanotubes (F-GO/MWCNTs-COOH) Nanohybrid-Based Mixed Matrix Membrane Embodiments of the present disclosure describe a negatively charged self-assembled functionalized graphene oxide carboxylic multi-walled carbon nanotubes (f-GO/MWCNTs-COOH) nanohybrid-based mixed matrix membrane for wastewater treatment, comprising a positively charged Graphene Oxide and negatively charged multi-walled carbon nanotube-COOH nanohybrid; and polylactic acid (PLA) polymer membrane matrix. The f-GO/MWCNTs-COOH nanohybrid is integrated into the PLA membrane matrix to form the negatively charged mixed matrix membrane. The f-GO/MWCNTs-COOH nanohybrid loading during formation of the mixed matrix membrane can be between about 0.5 wt. % and about 6 wt. %, relative to the amount by weight of PLA. In some embodiments, the loading is between about 1.5 wt. % and about 6 wt. %. In some embodiments, the loading is between about 1.5 wt. % and about 3 wt. %. In some embodiments, the loading is between about 3 wt. % and about 6 wt. %. In some embodiments, the loading is about 4 wt. % or about 5 wt. %.

Some embodiments of the present disclosure describe a negatively charged mixed matrix membrane, wherein the positively charged Graphene Oxide and the negatively charged multi-walled CNT-COOH are present in different ratios. In some embodiments, the negatively charged multi-walled CNT-COOH is present in a higher amount relative to the amount (by weight) of the positively charged Graphene Oxide. Some embodiments of the present disclosure describe a negatively charged mixed matrix membrane, wherein the positively charged Graphene Oxide and the negatively charged multi-walled CNT-COOH are present in the ratio (by weight) of about 40:60. Some embodiments of the present disclosure describe a negatively charged mixed matrix membrane, wherein the positively charged Graphene Oxide and the negatively charged multi-walled CNT-COOH are present in the ratio of about 30:70. Yet other embodiments of the present disclosure describe a negatively charged mixed matrix membrane, wherein the positively charged Graphene Oxide and the negatively charged multi-walled CNT-COOH are present in the ratio of about 20:80.

Some embodiments of the present disclosure describe a negatively charged mixed matrix membrane, wherein the membrane has a pore size ranging from 1.5 nm-5 nm. Some embodiments of the present disclosure describe a negatively charged mixed matrix membrane, wherein the pore size increases with the increase in the amount of f-GO/MWCNT-COOH nanohybrid in the membrane.

Some embodiments of the present disclosure describe a negatively charged mixed matrix membrane, wherein the membrane has a semi-crystalline structure. Some embodiments of the present disclosure describe a negatively charged mixed matrix membrane, wherein the membrane exhibits water permeability. Some embodiments of the present disclosure describe a negatively charged mixed matrix membrane, wherein the water permeability ranges from 25 $L/m^2h$ to 100 $L/m^2h$.

Some embodiments of the present disclosure describe a negatively charged mixed matrix membrane, wherein the membrane exhibits antifouling properties.

Some embodiments of the present disclosure describe a negatively charged mixed matrix membrane, wherein an amount of the f-GO/MWCNT-COOH nanohybrid in the mixed matrix membrane is about 0.5 wt. % and about 6.0 wt. %. Some embodiments of the present disclosure describe a negatively charged mixed matrix membrane, wherein the amount of the f-GO/MWCNT-COOH nanohybrid in the mixed matrix membrane is about 1.5%. Some embodiments of the present disclosure describe a negatively charged mixed matrix membrane, wherein the amount of the f-GO/MWCNT-COOH nanohybrid in the mixed matrix membrane is about 3.0 wt. % Some embodiments of the present disclosure describe a negatively charged mixed matrix membrane, wherein the amount of the f-GO/MWCNT-COOH nanohybrid in the mixed matrix membrane is about 6.0 wt. %. In some embodiments, the amount of the f-GO/MWCNT-COOH nanohybrid is about 4.0 wt. % or about 5.0 wt. %.

Figure 3:
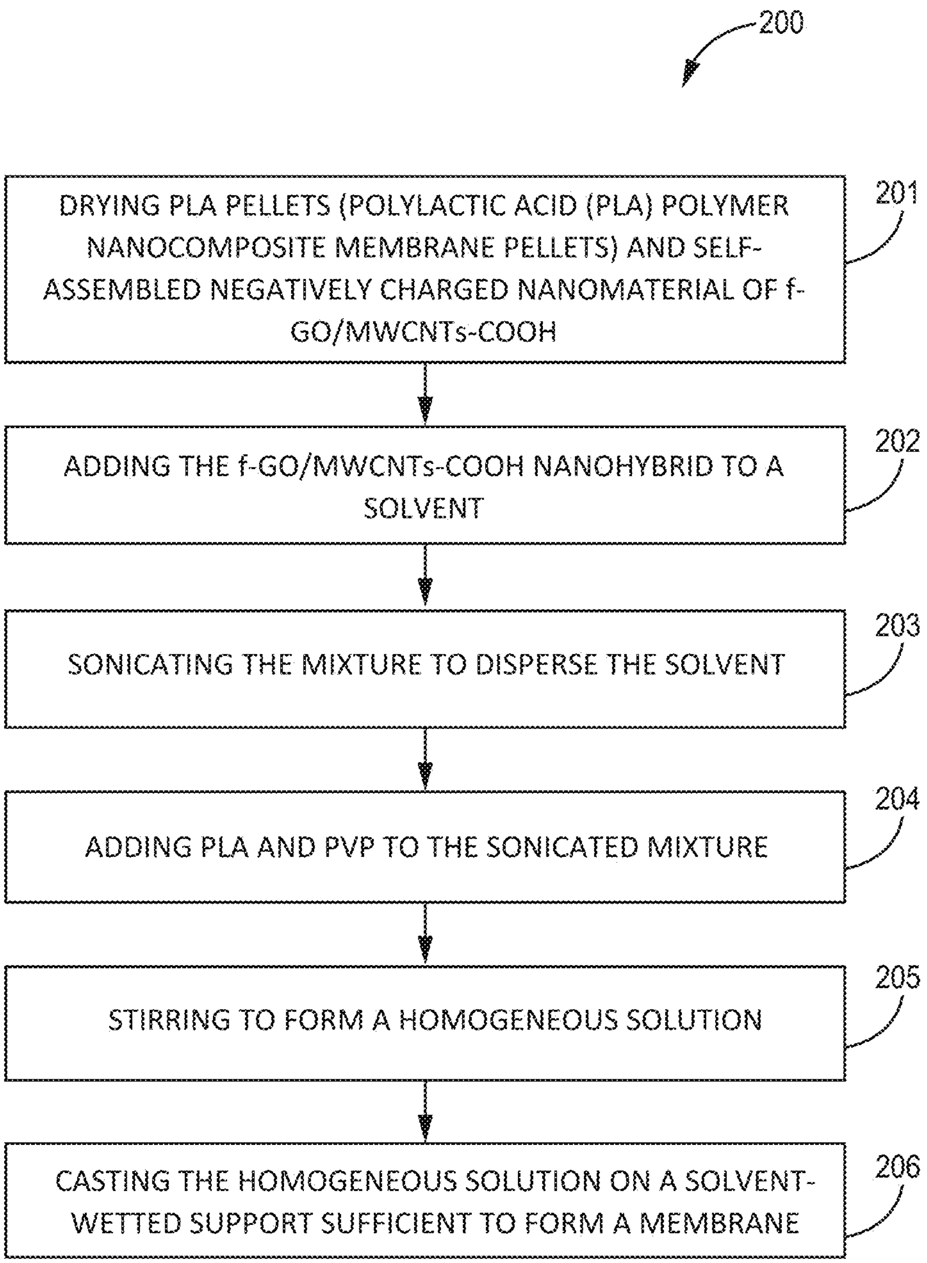
FIG. 3 is a flowchart illustrating the steps utilized in a method of synthesis of negatively charged self-assembled multi-walled f-GO/MWCNTS-COOH nanohybrid-based mixed matrix membrane, according to some embodiments.

Method of Synthesis of Negatively Charged Self-Assembled Functionalized Graphene Oxide Carboxylic Multi-Walled Carbon Nanotubes (F-GO/MWCNTS-COOH) Nanohybrid-Based Mixed Matrix Membrane FIG. 3 is a flowchart illustrating the steps utilized in method 200 of synthesis of a negatively charged self-assembled functionalized graphene oxide carboxylic multi-walled carbon nanotubes (f-GO/MWCNTs-COOH) nanohybrid-based mixed matrix membrane. As shown in FIG. 3, the method may comprise drying (201) PLA pellets and self-assembled negatively charged nanomaterial of f-GO and MWCNTs-COOH and adding (202) the f-GO/MWCNTs-COOH nanohybrid to a solvent. This is followed by sonicating (203) the mixture to disperse the solvent and adding (204) PLA and PVP to the sonicated mixture. This is followed by stirring (205) to form a homogeneous solution and casting (206) the solution on solvent-wetted support sufficient to form a membrane; wherein the fabrication of free-standing membranes was performed without support.

Step 201 includes drying PLA pellets and self-assembled negatively charged nanomaterial of f-GO/MWCNTs-COOH. PLA pellets were purchased from Nature Works LLC (Ingeo™ Biopolymer 4060D as indicated by the supplier) and dried in an oven at 60° C. for 12 h before use. PLA pellets and the self-assembled negatively charged nanomaterial of f-GO/MWCNTs-COOH were dried overnight in an oven at a temperature of 70° C. to ensure the removal of any moisture traces.

Figure 4A:
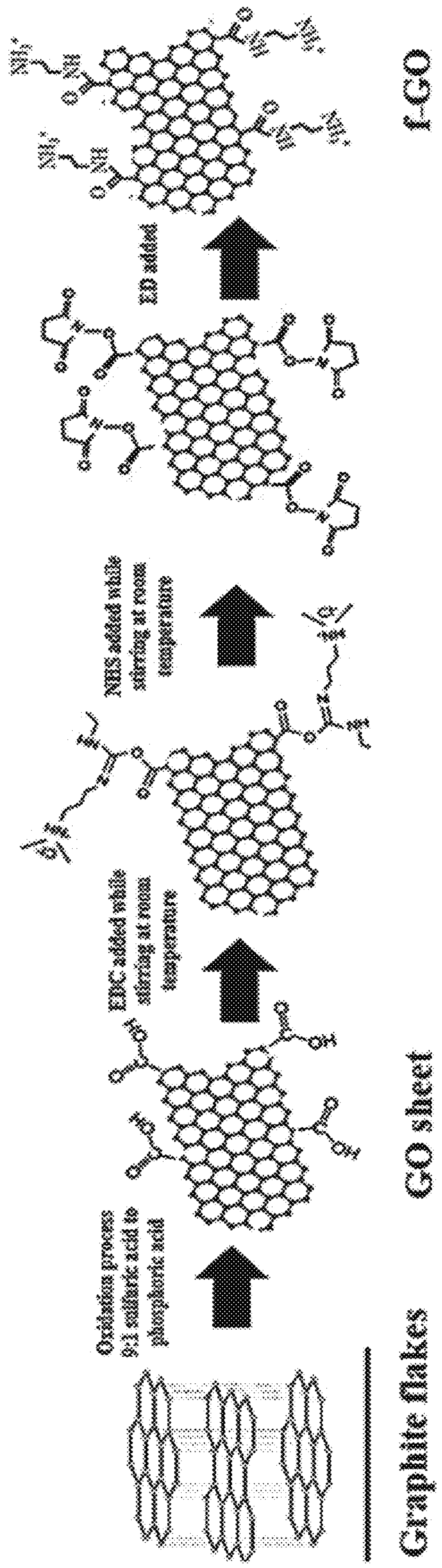
FIG. 4A is a schematic diagram illustrating the (a) synthesis of GO and f-GO nanosheets.
Figure 4B:
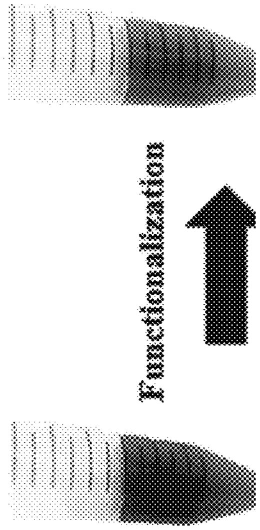
FIG. 4B shows the real photos of prepared GO and f-GO.

Step 202 includes adding the f-GO/MWCNTs-COOH nanohybrid to a solvent. The preparation of the amino-f-GO was carried out according to the literature, in which 0.01 mmol of EDC and 0.02 mmol of NHS were added at room temperature and left to stir for 4 h. Around 0.01 mmol of ED was added to the GO solution dropwise. The solution was alkaline; however, the reaction favors the acidic condition; therefore, HCl was added to ensure that the solution was acidic (pH-3) and kept stirring overnight. Then, the solution was washed and centrifuged at 8000 rpm for 30 min with DI water until it reached a neutral pH condition. The prepared f-GO has a concentration of 3.7 mg/mL. EDC/NHS acts as an intermediate crosslinker to accelerate the amidation reaction by creating bulky ester groups for the ED to easily react with the carboxyl groups (R—COOH) on the GO nanosheets as shown in FIG. 4A. The GO color changed from dark brown to light brown (FIG. 4B).

Figure 4C:
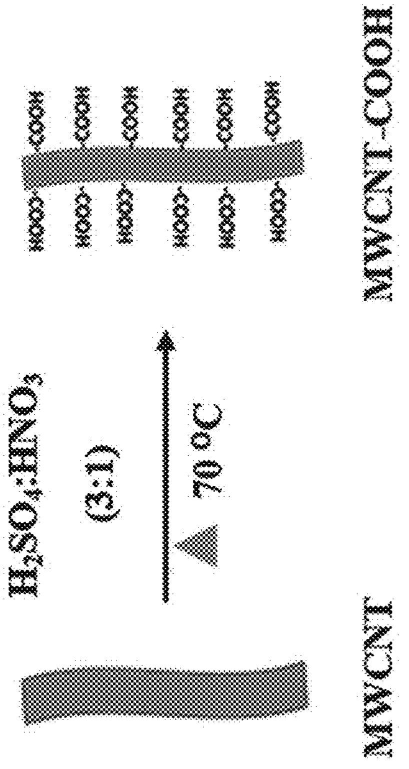
FIG. 4C shows the schematic diagram illustrating the synthesis of MWCNTs-COOH.

Negatively charged MWCNTs-COOH were fabricated as shown in FIG. 4C. Briefly, 2 g of pristine MWCNTs were treated with $H_2SO_4$ and $HNO_3$ with a volume ratio. The solution was maintained for 30 min at 25° C. under stirring, then the solution was slowly heated to a temperature of 70° C. in an oil bath for 3.5 h. To stop the reaction, the solution was allowed to cool and washed several times with DI water until the pH of the collected MWCNTs-COOH solution was almost neutral, the final concentration of the solution was about 8.5 mg/mL.

Figure 4D:
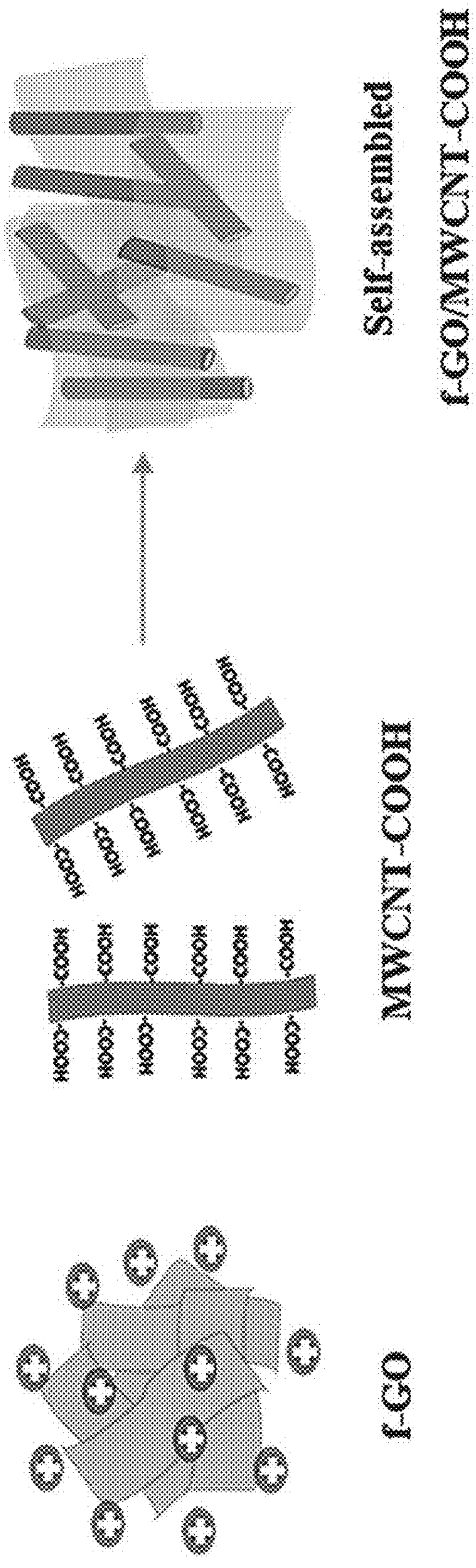
FIG. 4D is a schematic diagram illustrating the synthesis of self-assembled f-GO/MWCNTs-COOH nanohybrid, according to some embodiments.

Preparation of negatively charged f-GO/MWCNTs-COOH nanohybrid: The electrostatic co-precipitation approach was used to obtain the self-assembled negatively charged f-GO/MWCNTs-COOH nanohybrid. The nanohybrid was prepared by mixing different volume ratios of positively charged f-GO (e.g., 5.73 g/mol) and negatively charged MWCNTs-COOH (e.g., 8.5 g/mol) as shown in FIG. 4D. Both f-GO and MWCNTs-COOH were diluted to a concentration of 1.5 mg/mL by adding DI water and then sonicated for 30 min to get well-dispersed solutions. Under vigorous stirring, the f-GO solution was added dropwise to the MWCNTs-COOH solution to make self-assembled nanohybrids. The electrostatic attraction between positively charged f-GO and MWCNTs-COOH leads to self-assembly, and the solution starts to coagulate. The solution was left untouched for 2 days to precipitate the nanohybrids, then centrifuged (8000 rpm, 30 min) followed by freeze-drying for 3 days to obtain dried self-assembled nanohybrids. The ratio of f-GO and MWCNTs-COOH was altered to obtain differently charged nanohybrids.

Step 203 includes sonicating the mixture to disperse the solvent. The f-GO/MWCNTs-COOH nanohybrid with different concentrations (1.5, 3, and 6 wt. %) were added to the N, N-Dimethylacetamide (DMAc), then placed in Branson® Ultrasonic Bath for 2 h to assure dispersity in the solvent.

Step 204 includes adding PLA and PVP to the sonicated mixture and stirring (205) the mixture to form a homogeneous solution. To the sonicated mixture, known masses of PLA and PVP were then added and stirred for 24 h at 70° C. to form a homogeneous solution. In some embodiments, the PLA can be added as pellets and the PVP can be added as powder.

Step 206 includes casting the solution on solvent-wetted support sufficient to form a membrane; wherein the fabrication of free-standing membranes was performed without support. Before membrane casting, all solutions were sonicated for at least an hour, then placed in a vacuum oven at 70° C. for another hour and finally placed on the shelf for 30 min to achieve bubble-free solutions. The membranes were cast on DMAc-wetted support on the glass plate using a casting knife set with a thickness of 250 microns.

The wet membranes were then immediately immersed in a deionized (DI) water coagulation bath for 24 h, the membranes were again rinsed with DI water to remove any traces of DMAc and finally left to dry and stored at room temperature. Moreover, the fabrication of free-standing membranes was performed because some characterizations required the membranes to be without support.

Some embodiments of the present disclosure describe a method, wherein the f-GO/MWCNTs-COOH nanohybrid was added to the solvent in concentrations ranging from about 0.5 wt % to about 6 wt %, relative to an amount of PLA. Some embodiments of the present disclosure describe a method, wherein the f-GO/MWCNTs-COOH nanohybrid and the solvent comprise a dope solution. Some embodiments of the present disclosure describe a method, wherein the solvent in the dope solution is dimethylacetamide, dioxane, acetonitrile, chloroform, methylene chloride, 1,1,2-trichloroethane and dichloroacetic acid.

Some embodiments of the present disclosure describe a method, wherein the casting was done using a casting knife. Some embodiments of the present disclosure describe a method, wherein the casting knife was set with a thickness of 250 microns.

Some embodiments of the present disclosure describe a method, further comprising immersing the wet membranes in deionized (DI) water coagulation bath. Some embodiments of the present disclosure describe a method, further comprising rinsing the membranes again with DI water to remove any traces of solvent. Some embodiments of the present disclosure describe a method, further comprising drying and storing the resulting membrane at room temperature.

Certain embodiments of the present disclosure describe a method, wherein the negatively charged nanohybrid mixed matrix membrane comprises the positively charged Graphene Oxide and the negatively charged multi-walled CNT-COOH present in different ratios. In some embodiments, the negatively charged multi-walled CNT-COOH is present in a higher amount relative to the positively charged Graphene Oxide. Some embodiments of the present disclosure describe a method, wherein the positively charged Graphene Oxide and the negatively charged multi-walled CNT-COOH are present in the ratio (by weight) of about 40:60. Some embodiments of the present disclosure describe a method, wherein the positively charged Graphene Oxide and the negatively charged multi-walled CNT-COOH are present in the ratio of about 30:70. Some embodiments of the present disclosure describe a method, wherein the positively charged Graphene Oxide and the negatively charged multi-walled CNT-COOH are present in the ratio of about 20:80.

Some embodiments of the present disclosure describe a method, wherein the negatively charged nanohybrid mixed matrix membrane has a pore size ranging from 1.5 nm-5 nm. Some embodiments of the present disclosure describe a method, wherein the pore size increases with an increase in the amount of f-GO/MWCNT-COOH nanohybrid in the membrane.

Some embodiments of the present disclosure describe a method, wherein the negatively charged nanohybrid mixed matrix membrane is thermally stable up to about 50° C. Some embodiments of the present disclosure describe a method, wherein the negatively charged nanohybrid mixed matrix membrane has a semi-crystalline structure.

Some embodiments of the present disclosure describe a method of synthesize of a negatively charged nanohybrid mixed matrix membrane, wherein the f-GO/MWCNT-COOH nanohybrid loading in the PLA membrane matrix is between about 0.5 wt. % and about 6.0 wt. %, relative to the amount of PLA. Some embodiments of the present disclosure describe a method of synthesis of negatively charged nanohybrid mixed matrix membrane, wherein the f-GO/MWCNT-COOH nanohybrid loading in the PLA membrane matrix is about 1.5 wt. %. In some embodiments, the f-GO/MWCNT-COOH nanohybrid loading is about 3 wt. %, about 4 wt. %, about 5 wt. % or about 6 wt. %.

Some embodiments of the present disclosure describe a method, wherein the negatively charged nanohybrid mixed matrix membrane exhibits water permeability. Some embodiments of the present disclosure describe a method, wherein the water permeability ranges from 25 L/m 2 h to 100 L/m 2 h.

Yet other embodiments of the present disclosure describe a method, wherein the negatively charged nanohybrid mixed matrix membrane exhibits antifouling property.

The following Examples are intended to illustrate the above invention and should not be construed as to narrow its scope. One skilled in the art will readily recognize that the inventors suggest many other ways in which the invention could be practiced. It should be understood that numerous variations and modifications may be made while remaining within the scope of the invention.

EXAMPLES

Example 1: Positively Charged Multi-Walled Carbon Nanotube/Graphene Oxide (F-MWCNT/GO) Nanohybrid-Based Mixed Matrix Membrane Synthesis of self-assembled f-MWCNT/GO nanohybrid: The f-MWCNTs and GO nanosheets were prepared by similar methods reported in the literature (FIG. 2A, FIG. 2B). The self-assembled positively charged f-MWCNTs/GO nanohybrid (FIG. 2C) was prepared via the electrostatic co-precipitation approach. Briefly, the 80:20 f-MWCNT/GO preparation was as follows: 120 mL of GO solution (1.5 mg $mL^{-1}$) was ultrasonicated for 30 min to ensure exfoliation and homogeneous dispersion. In a separate beaker, 480 mL of f-MWCNTs solution (1.5 mg $mL^{-1}$) was added dropwise under vigorous stirring at room temperature to the GO solution. The mixture was left overnight to precipitate the self-assembled product and then collected by centrifugation (8000 rpm). The viscous mixture was freeze-dried for 72 h to obtain a dry powder.

Figure 5:
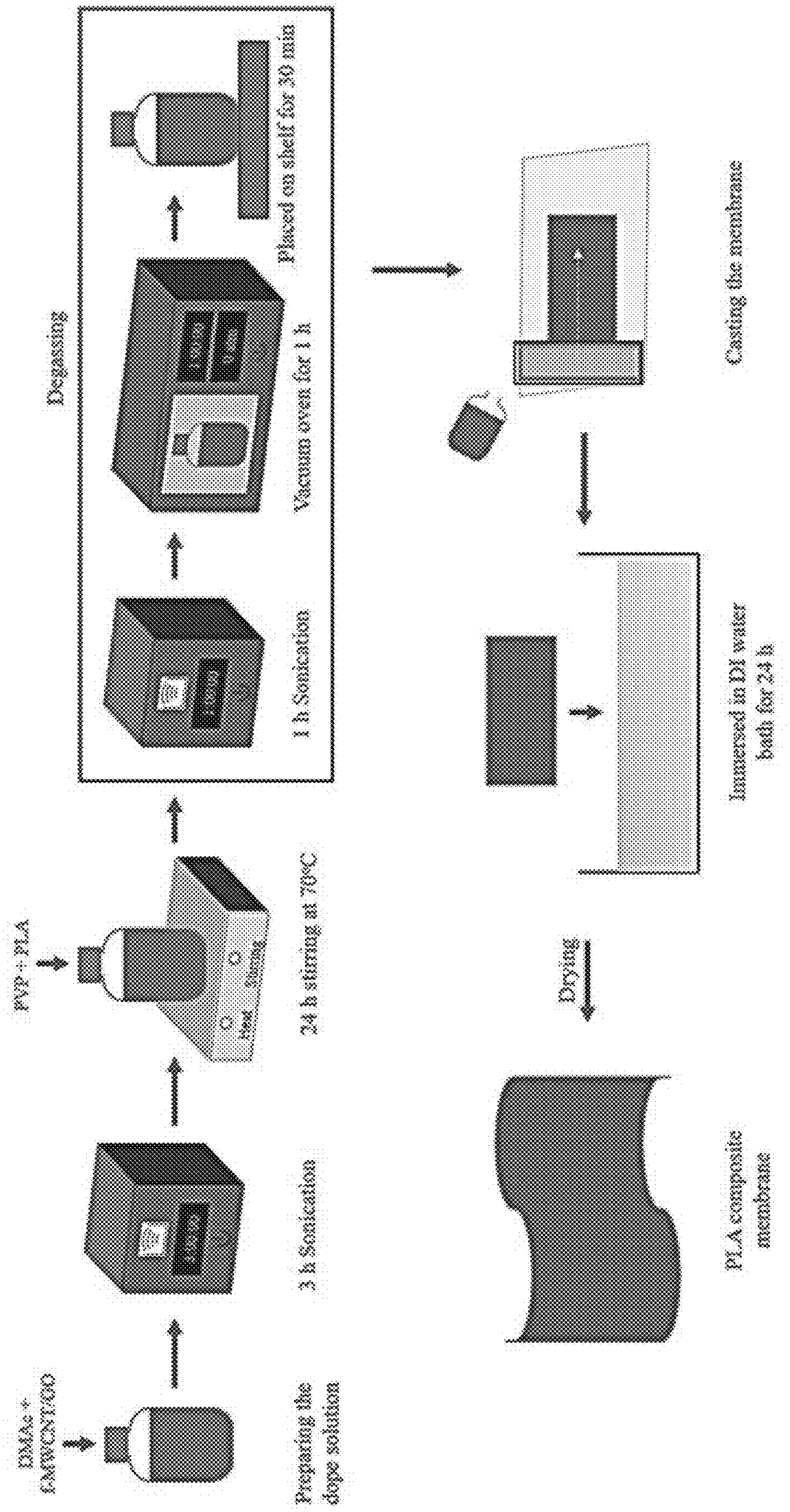
FIG. 5 is a schematic diagram of the membrane fabrication method, according to some embodiments.

Fabrication of pristine PLA and PLA/f-MWCNTs/GO composite membranes: All membranes were prepared using the non-solvent-induced phase inversion method (FIG. 5). Table 1 shows the compositions of the dope solutions, the nanomaterial content, and the amount of PLA used for the membrane fabrication. First, PLA pellets and the self-assembled positively charged nanomaterial of f-MWCNTs/GO were dried overnight in an oven at a temperature of 70° C. to ensure the removal of any moisture traces. The f-MWCNTs/GO nanohybrid with different concentrations (1.5, 3, and 6 wt. %) were added to the DMAc, then placed in Branson® Ultrasonic Bath for 3 h to assure dispersity in the solvent. In the previous solution, known masses of PLA and PVP were then added and stirred for 24 h at 70° C. to form a homogeneous solution.

TABLE 1

Compositions of dope solutions used in the fabrication of membranes.

| Label | PLA (wt. %) | PVP (wt. %) | f-MWCNT-GO (wt. %)* | DMAc (wt. %) |
|---|---|---|---|---|
| M0 | 20 | 2 | 0 | 78 |
| M1.5 | 20 | 2 | 1.5 | 78 |
| M3 | 20 | 2 | 3 | 78 |
| M6 | 20 | 2 | 6 | 78 |

*The weight percentage is with respect to the total weight of the PLA used.

Before membrane casting, all solutions were sonicated for at least an hour, then placed in a vacuum oven at 70° C. for another hour and finally placed on the shelf for 30 min to achieve bubble-free solutions. Lastly, the membranes were cast on DMAc-wetted support on the glass plate using a casting knife set with a thickness of 250 microns. The wet membranes were then immediately immersed in a deionized (DI) water coagulation bath for 24 h, the membranes were again rinsed with DI water to remove any traces of DMAc and finally left to dry and stored at room temperature. Moreover, the fabrication of free-standing membranes was performed because some characterizations required the membranes to be without support.

Example 2: f-MWCNTs/GO Nanohybrid Characterization

Figure 6A:
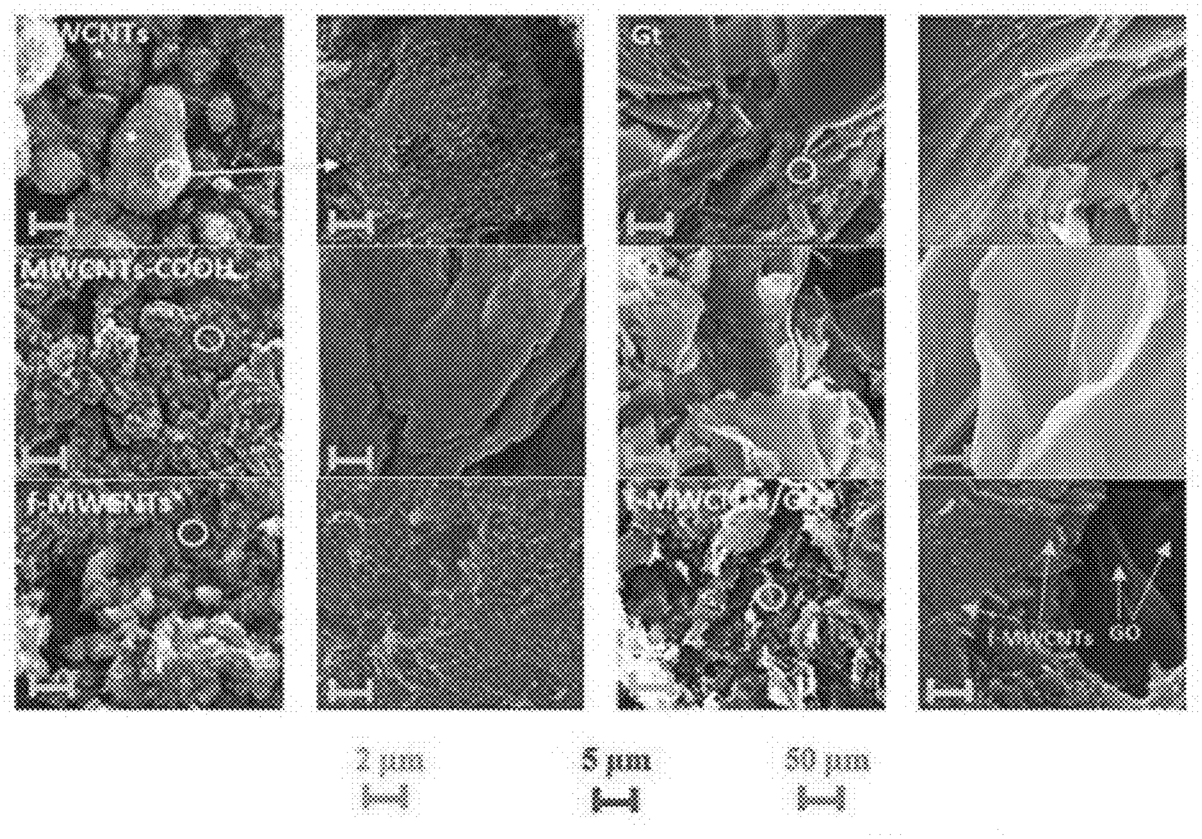
FIGS. 6A-6E show the nanomaterial characterization, according to some embodiments.
Figure 6B:
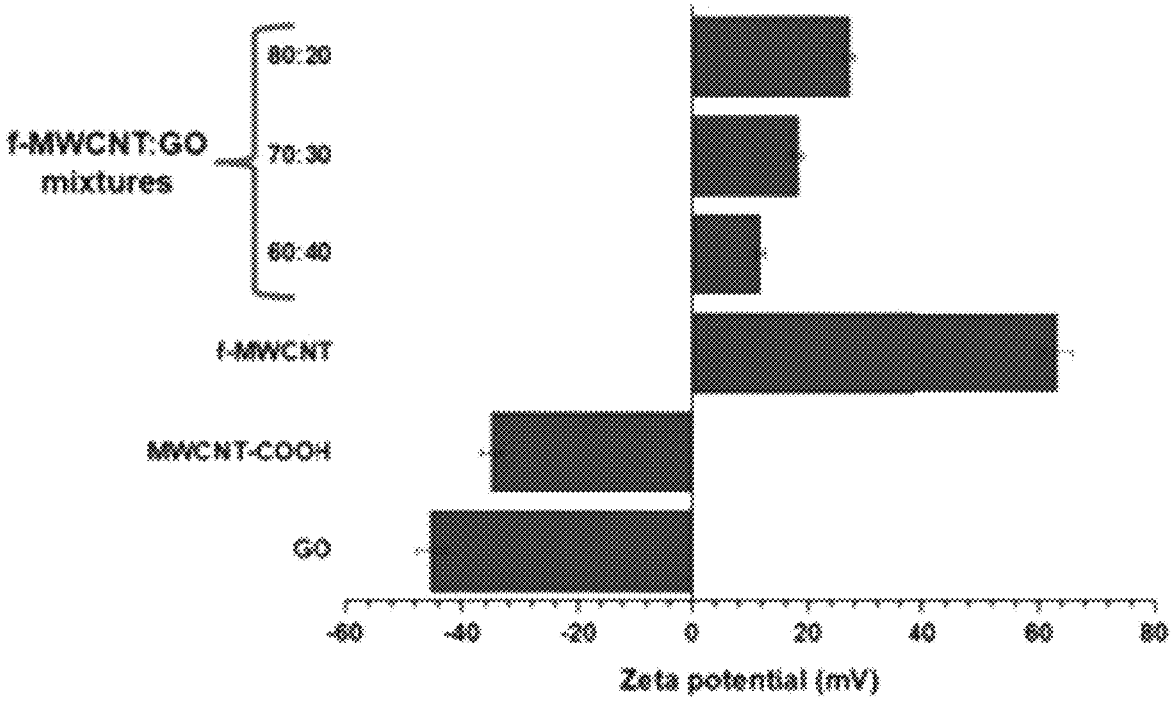

The SEM images of MWCNTs, MWCNTs-COOH, f-MWCNTs, graphite (Gt), GO nanosheets, and f-MWCNTs/GO nanohybrid are shown in FIG. 6A. It was observed that pristine MWCNTs were tangled with each other and displayed a high tendency to form bundles due to strong Van der Waals forces. Moreover, the surface is much smoother compared to the surface of MWCNTs-COOH and f-MWCNTs. Furthermore, the SEM images of MWCNTs-COOH and f-MWCNTs verified the presence of a more open small bundle and shorter tube length due to the strong acidic treatment and functionalization. As seen in FIG. 6A, the Gt sheets are compact lamellar structures composed of stacked alternating layers with well-defined sharp edges. However, the GO sheets displayed smooth crumpled wave-like surface morphology and the sheets are randomly arranged, which could be attributed to the increased interlayer d-spacing during the oxidation process. The XRD patterns of the pristine Gt and GO (FIG. 6E) further confirmed that the interlayer d-spacing became wider. The SEM image of the f-MWCNTs/GO nanohybrid shows that the f-MWCNTs and GO are stacked together due to the strong electrostatic interaction between positively functionalized f-MWCNTs and negative GO. Similar surface morphologies have also been reported in the literature. The oxidation of MWCNTs to MWCNTs-COOH displayed a negative Zeta potential of −35.1±1.9 mV due to the presence of C═O, —COC, —OH groups (FIG. 6B). Similar negative functional groups were also present in the GO nanosheets; which can be attributed to a negative net charge of −45.1±2.5 mV. Whereas after functionalization, the net charge on the f-MWCNTs changed to positive 63.2±2.7 mV, which further confirms the functionalization and protonation of $NH_3^+$.

Embodiments of the present disclosure describe the synthesis of multifunctional membranes as the targeted pollutants are charged oppositely. The polymer, PLA, used is highly negative, having a potential zeta potential value of ~−25 mV at a pH of 7. Therefore, a positively charged nanohybrid was required to increase the functionalities of the membranes. The positively charged self-assembled nanohybrids were synthesized using different ratios of f-MWCNTs and GO, including 60:40, 70:30, and 80:20, and tested for their zeta potential. The prepared ratio of 80:20 of f-MWCNTs to GO had the highest net positive charge of 27.1±1.0 mV (FIG. 1B); therefore, it was selected to be incorporated into the membranes.

Figure 6C:
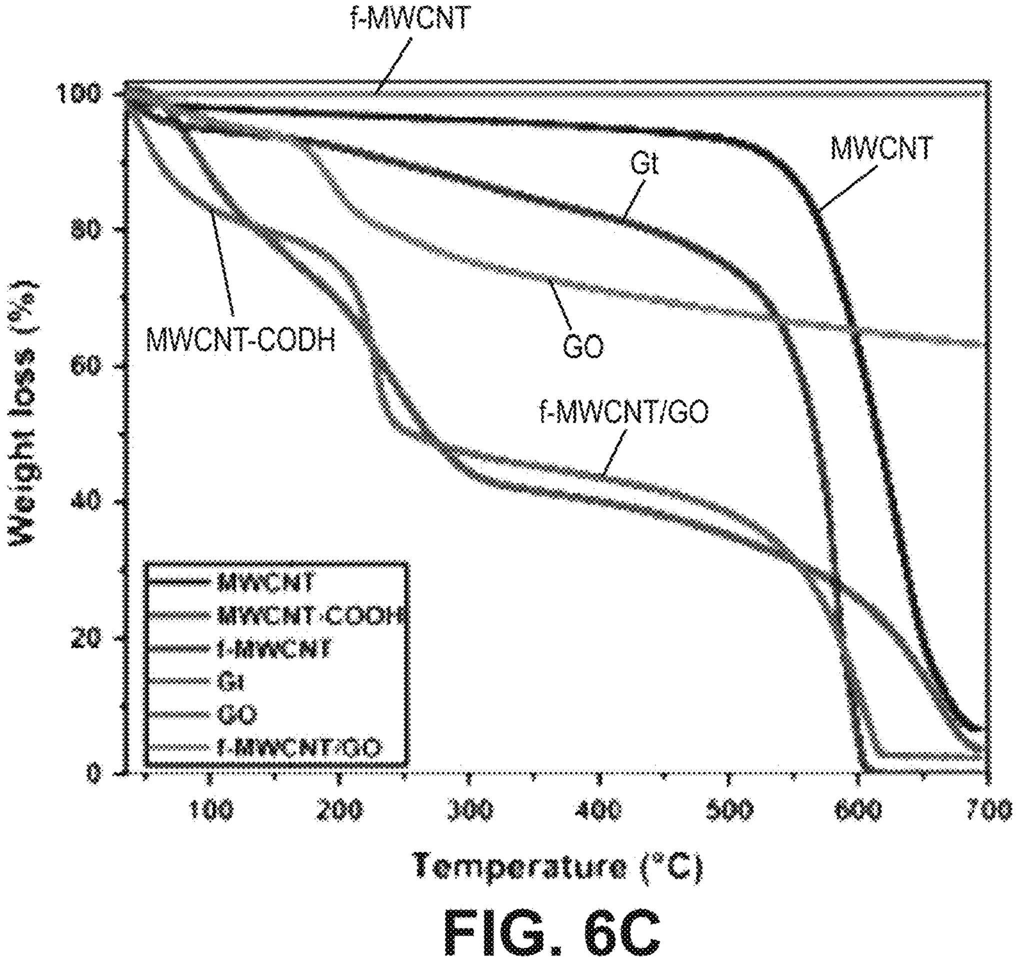

The TGA weight loss curves of the fabricated nanomaterials are shown in FIG. 6C. The pristine MWCNTs showed good thermal stability up to 550° C., with approximately 10% weight loss, related to the traces of carboxylic acid groups or moisture that was generated during purification. After further heating, the MWCNTs showed a sharp degradation to 700° C. with a final weight loss of 93%. The MWCNTs-COOH showed a three-step thermal decom-position due to the presence of carboxylic functional groups. The first major decomposition results in a 31% weight loss between 54 and 200° C., which is attributed to the loss of adsorbed moisture or solvent, followed by a second major decomposition between 200 and 300° C. (≈24% loss) due to the less thermally stable oxygen-containing functional groups. Lastly, an additional 36% weight loss between 400 and 700° C. was observed due to the combustion of the carbon skeleton. The functionalization of MWCNTs resulted in a more thermally stable structure than MWCNTs-COOH, losing only 25% of its weight up to 500° C., which is attributed to the presence of amino groups. For the thermal decomposition of GO, which occurred over three stages: the weight loss below 100° C. is attributable to the evaporation of any moisture or solvent (≈17% loss); from 140 to 242° C. which is due to the decomposition of oxygen groups and carbon oxidation (≈28% loss); and finally, the complete decomposition which is observed from 500 to 600° C. (≈35% loss). The pristine Gt exhibited 0% weight loss up to 700° C. The f-MWCNTs/GO nanohybrid displayed thermal stability and its thermal degradation occurred through two gradual decomposition stages, one over the temperature between 50 and 200° C. (≈15% loss) and another from 235° C. to 700° C., with only 17% weight loss.

Figure 6D:
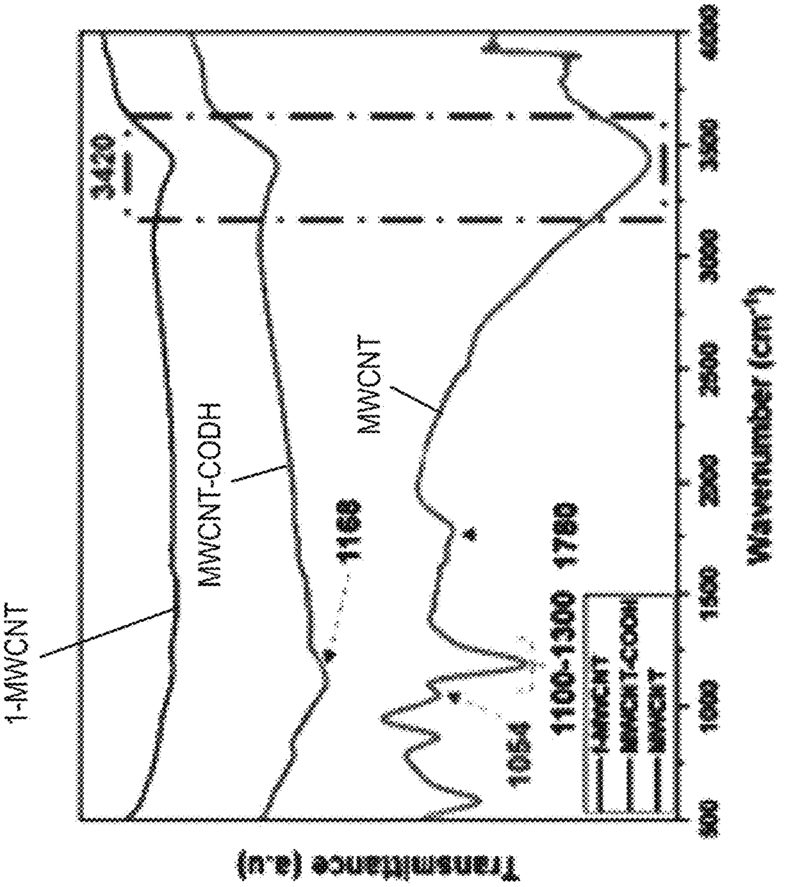
Figure 6D:
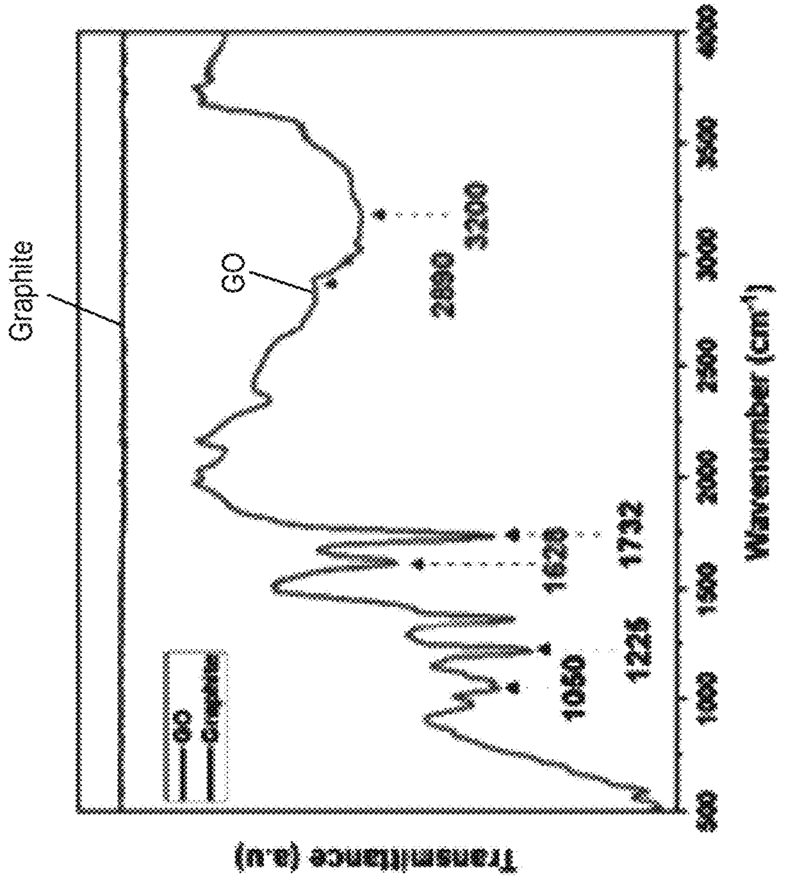
Figure 6E:
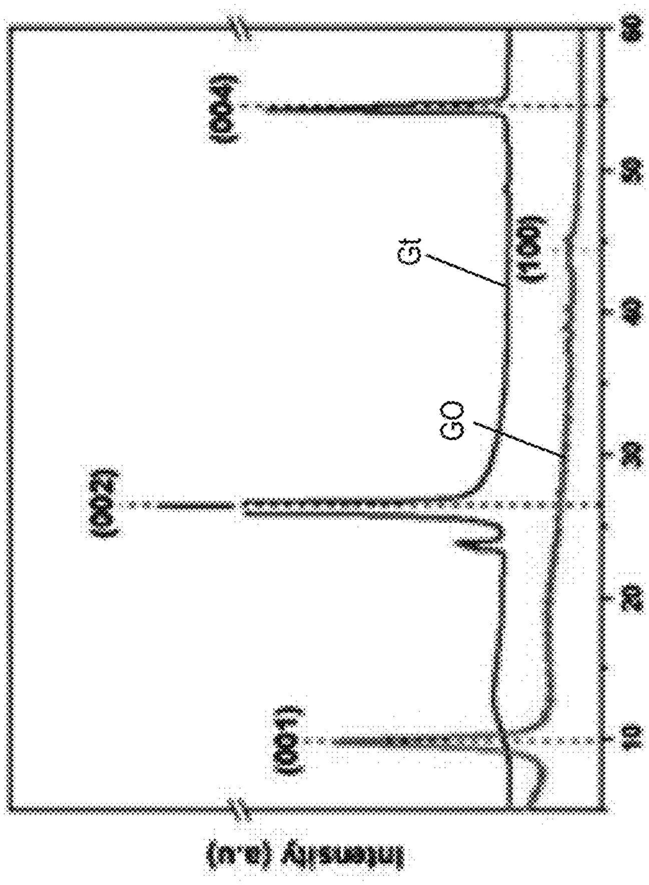
Figure 6D:
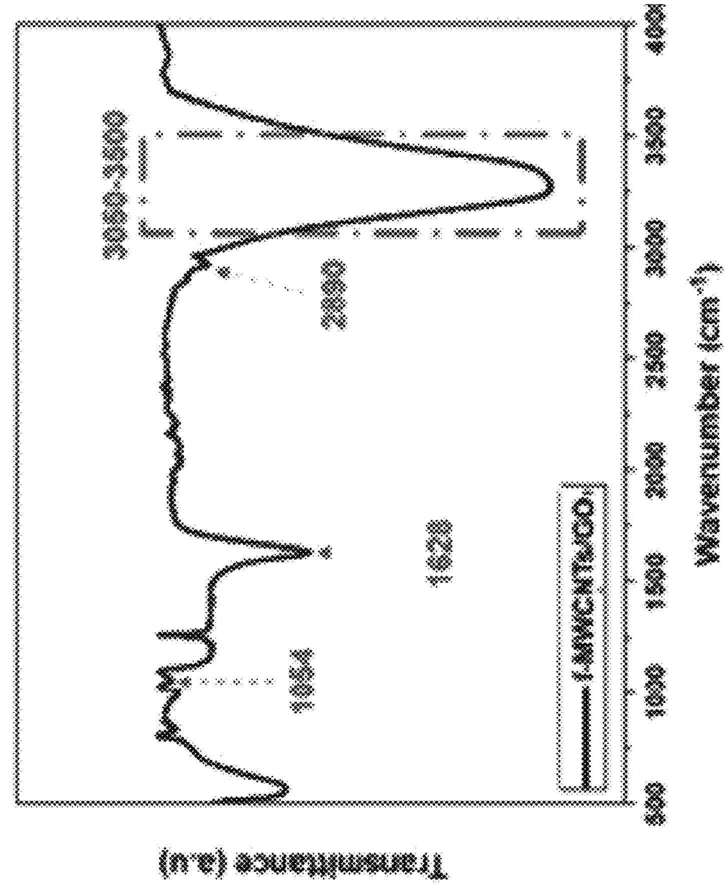
Figure 6E:
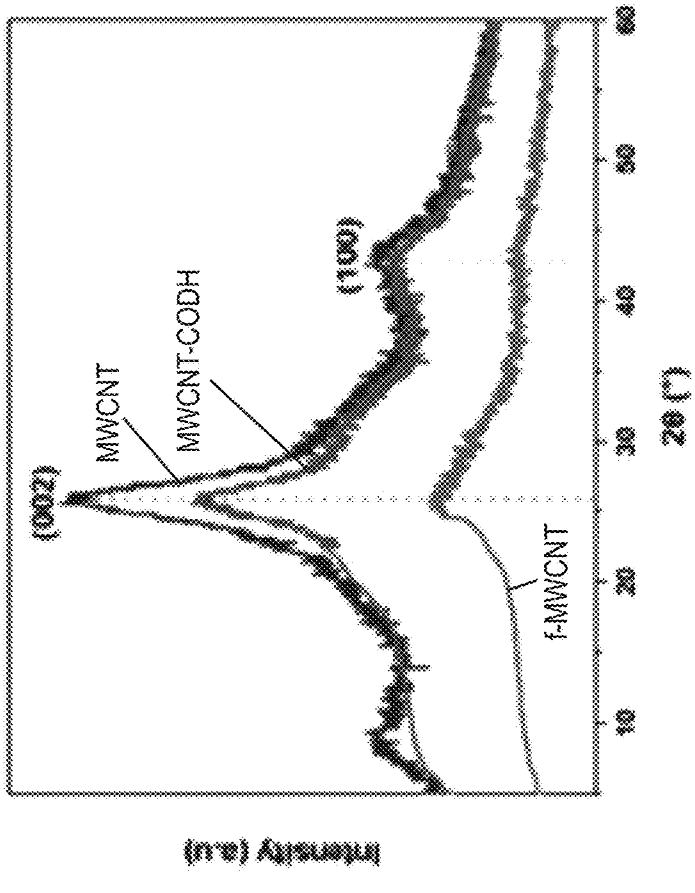
Figure 6E:
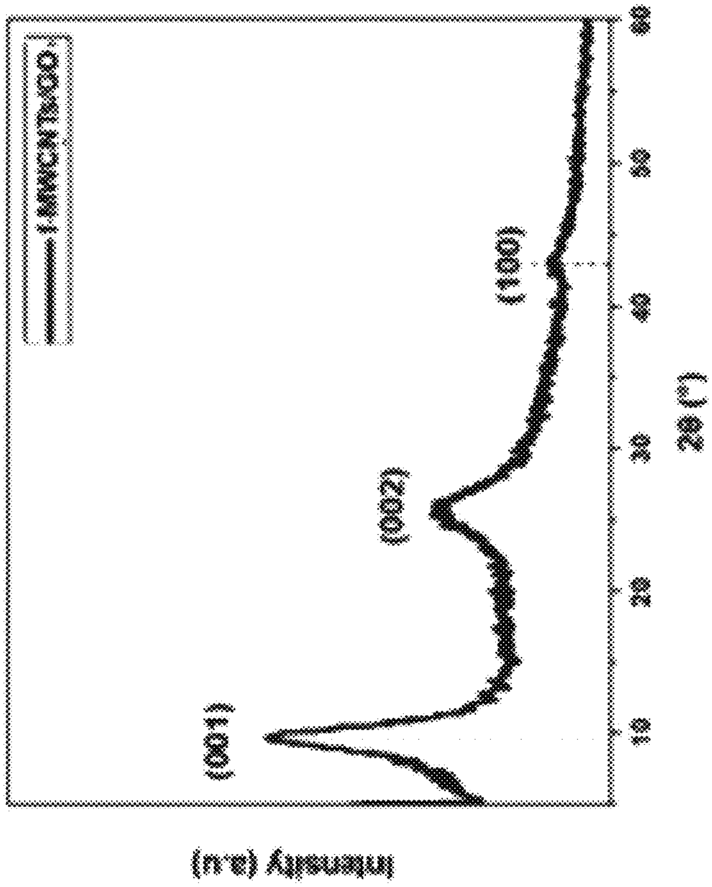

FTIR and XRD analyses were carried out to confirm the successful preparation and functionalization of nanomaterials as illustrated in (FIG. 6D, FIG. 6E). According to FIG. 6Di, no significant peaks were observed in the Gt spectrum, while the GO spectrum reveals several functional groups. The GO absorption peaks appeared at 1050, 1225, 1628, 1732, 2890, and 3200 $cm^{-1}$, which are attributed to the presence of C—O of the alkoxy group, C—O of the epoxy group, C═C, —C═O, symmetric and asymmetric —CH2- and —OH (in the —COOH group) stretching vibrations, respectively. These peaks confirmed the successful oxidation of Gt. FIG. 6Dii shows the FTIR spectra of MWCNTs, MWCNTs-COOH, and f-MWCNTs. The pristine MWCNTs showed a weak peak of —OH vibration at 3420 $cm^{-1}$, due to the partial oxidation of the MWCNTs during purification. Furthermore, the presence of a new peak at 1168 $cm^{-1}$, attributed to the stretching vibration of C—O, as well as the increased intensity of the —OH group after oxidation, proves the successful synthesis of MWCNTs-COOH. The spectrum of f-MWCNTs verified the successful functionalization of MWCNTs through the existence of new characteristic peaks, including 1054, 1100-1300, and 1780 $cm^{-1}$, corresponding to the stretching vibrations of C—N, C—H, and C═O. In addition, the broadband centered at 3420 $cm^{-1}$ represents the overlap of —OH and amino groups. Due to the introduction of all these groups on the surface of MWCNTs, oxidized and amino-functionalized MWCNTs would produce much higher sorption capacity and sites. Subsequently, the f-MWCNTs/GO nanohybrid exhibited peaks found in both f-MWCNTs and GO nanomaterials, which confirms the successful formation of a self-assembled nanohybrid.

XRD cellular units (d-spacing) were performed to identify the structure of the prepared nanohybrids. The XRD patterns of Gt and GO are demonstrated in FIG. 6Ei. The Gt shows two sharp and intense peaks at 2θ=26.5° and 54.5° for the planes (002) and (004) with d-spacing of 3.4 and 1.7 Å, respectively, indicating the typical crystal structure of Gt. The GO XRD pattern shows a diffraction characteristic peak (001) at 2θ=9.9° with the d-spacing of 8.9 Å between the nanosheets, confirming the successful synthesis of GO. The increase in d-spacing between the GO nanosheets is attributed to the presence of bulky oxygen functional groups. FIG. 6Eii illustrates the XRD patterns of the different MWCNTs, MWCNTs-COOH, and f-MWCNTs. The strong diffraction peak at 2θ=26° can be indexed as the (002) reflection of the hexagonal Gt structure with a d-spacing of 3.4 Å. The peak around 43° has a d-spacing of 2.1 Å and is due to the (100) graphitic planes. All three MWCNTs have the same diffraction peaks; however, the pristine MWCNTs have the highest intensity while the f-MWCNTs has the lowest, suggesting that the semicrystalline structure of pristine MWCNTs slightly changed corresponding to their oxidation and functionalization, respectively. Finally, FIG. 6Eiii shows the XRD patterns of the f-MWCNTs/GO nanohybrid with a diffraction peak at 9.5°. This could be derived from GO; however, it had a wider d-spacing of 9.3 Å, compared to the GO d-spacing of 8.9 Å. Furthermore, two additional peaks were observed at $2\theta=26°$ and 43°, which were derived from the Gt-like structure of MWCNTs. The XRD patterns suggest that the f-MWCNT/GO nanohybrid increases the structural heterogeneity and the interlayer distance compared to GO or f-MWCNT individually due to the formation of a self-assembled structure.

Example 3: Positively Charged Mixed Matrix Membranes Characterization

Multiple sorts of linkages may be attributed to the interaction between the f-MWCNTs/GO nanohybrid and the PLA membrane matrix. Since the f-MWCNTs/GO nanohybrid and the PLA polymer share the same hexatomic ring of carbon atoms, the π-π interactions stack them spontaneously. Furthermore, electro-static and/or ion-pair interactions occur between the positively charged f-MWCNTs/GO nanohybrid and the hydroxyl groups of PLA. Additionally, the PLA's —OH groups tend to create hydrogen bonds with the amide groups of f-MWCNTs' surface functional groups. These interactions increased the stability of the f-MWCNTs/GO nanohybrid in the composite membranes significantly. This was validated by a leaching experiment in which composite membranes were immersed in DI water for 72 h while being vigorously shaken. To calculate the percentage of leached nanomaterial, the mass difference before and after immersing the membrane was recorded. There was no leaching, which supports the long-term operation of PLA/f-MWCNTs/GO composite membranes due to their excellent characteristics.

EDS elemental mapping of the C, O, and N was carried out on the fabricated membranes to confirm the successful incorporation of the f-MWCNT/GO nanohybrid within their structure. The results demonstrated in FIG. 7A indicated that both PLA and the nanohybrids showed C and O in all samples; however, the presence of N in the nanocomposites was attributed to the incorporation of amine groups from the f-MWCNTs/GO nanohybrids. From both visual observation (FIG. 8) and the dispersion of N in the membranes, it can be concluded that the nanohybrid is evenly distributed in the composite membranes.

Figure 7A:
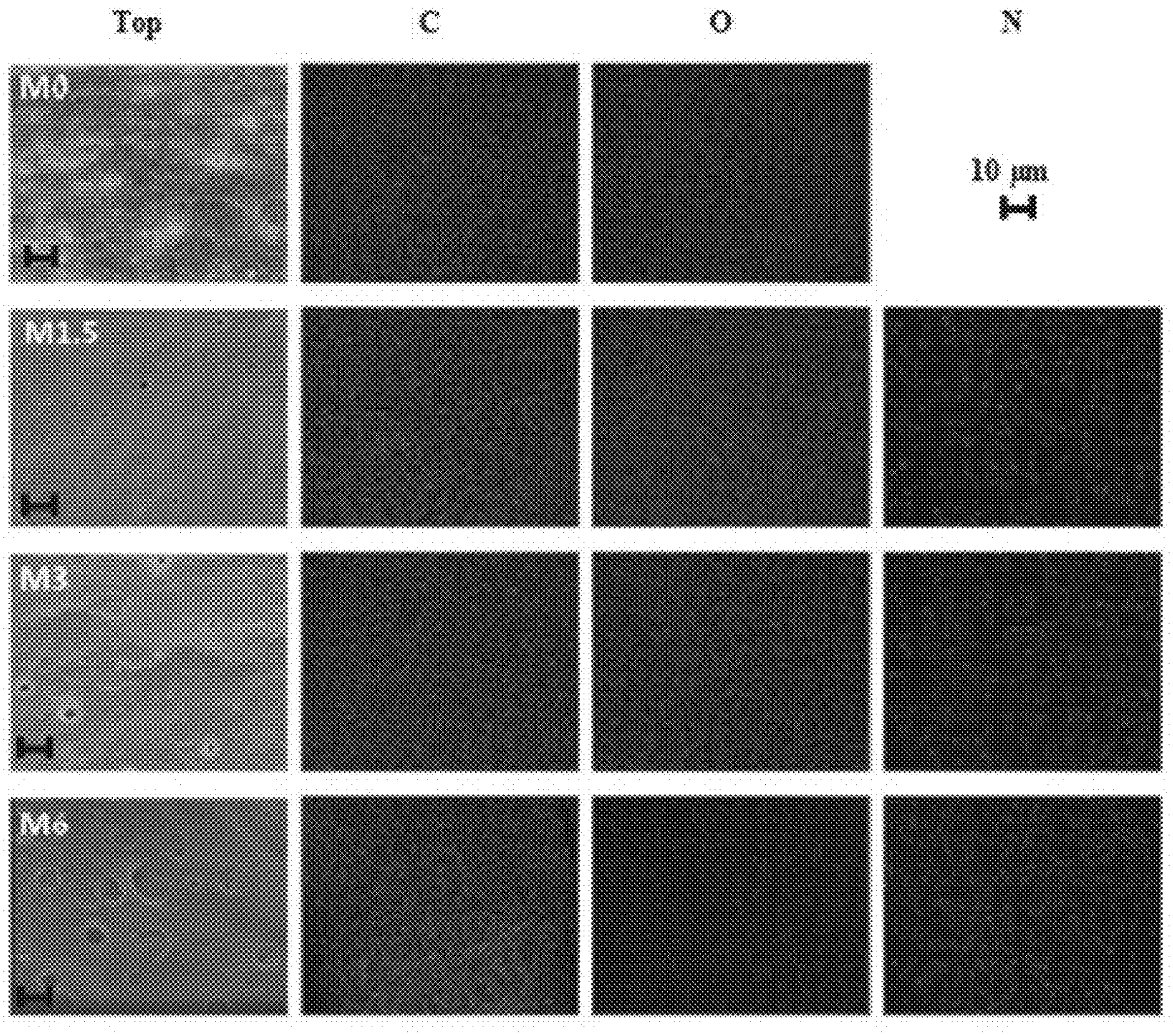
FIGS. 7A-7D show the nanocomposite membranes characterization.
Figure 7B:
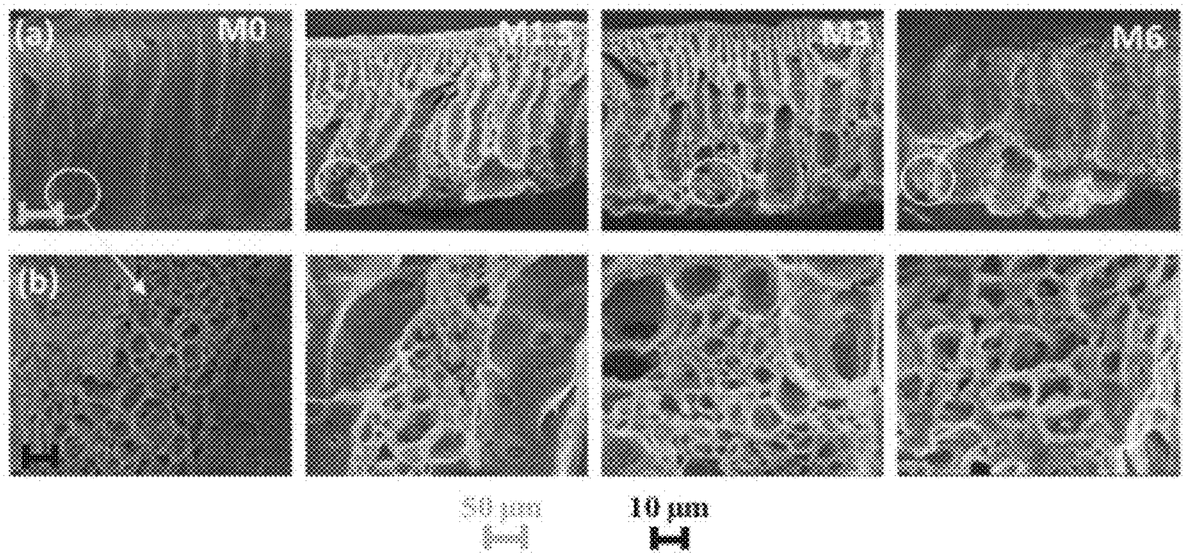
Figure 8:
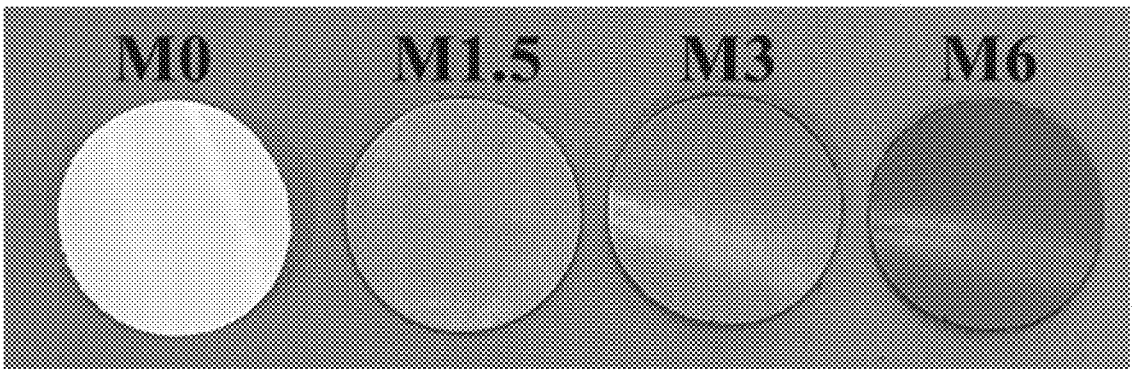
FIG. 8 shows the real images of the physical appearance of the pristine (M0) and nanocomposite membranes (M1.5, M3, and M6).

Surface SEM images of PLA membranes prepared with different f-MWCNTs/GO nanohybrid are shown in FIG. 7B. SEM images of all membranes showed a porous structure; however, as the amount of nanocomposite increases, the porosity decreases, the pore size increases, and the surface of the membrane becomes rough. Similar observations were also previously reported. The increase in pore size can be associated with the hydrophilic nature of the nanohybrid f-MWCNTs/GO, during the non-solvent induced phase separation (NIPS) process, the hydrophilic nanomaterials generate more water penetration sites into the membranes, hence creating an open structure membrane that is more porous. On the other hand, porosity decreased due to the increase in the dope solution's viscosity when the nanohybrid content increased, which affected the exchange rate between the non-solvent (DI water) and the N-Dimethylacetamide (DMAc) solvent and led to slower phase separation during the NIPS process. This resulted in the suppression of the finger-like sublayer and the formation of wider microvoids in the M6 membrane, compared to the pristine membranes (FIG. 7A). The hydrophilicity and viscosity nature of the dope solution controls the final membrane structure.

Figure 7C:
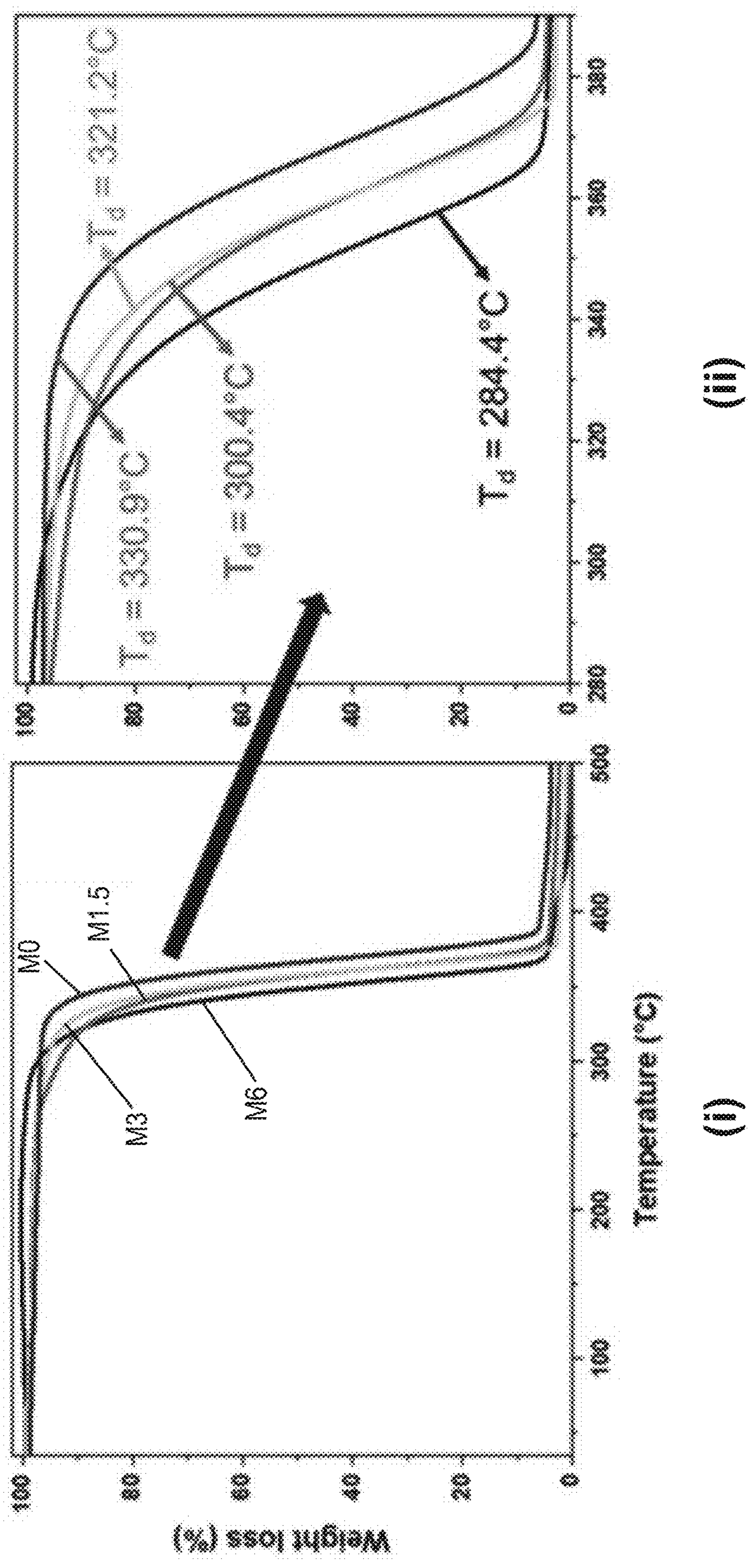

The presence of f-MWCNTs/GO nanohybrid in the PLA polymer matrix was verified via FTIR and TGA. First, the thermogravimetric analyzer (TGA) analysis was performed to examine the thermal stability of the membranes. It was found that as the content of f-MWCNT/GO nanohybrids increased, the thermal stability of the membranes also increased (FIG. 7Ci and FIG. 7Cii). The composite membranes M1.5, M3, and M6 demonstrated thermal degradation (Td) at almost 300, 321, and 331° C., respectively, which were all higher, compared to the pristine membrane degradation temperature of 284° C. This was due to the strong interactions between the PLA polymer chains and the nanohybrid. A similar trend was obtained in the literature, indicating that the addition of MWCNTs or GO within the PLA membrane matrix enhanced its thermal stability.

Figure 7D:
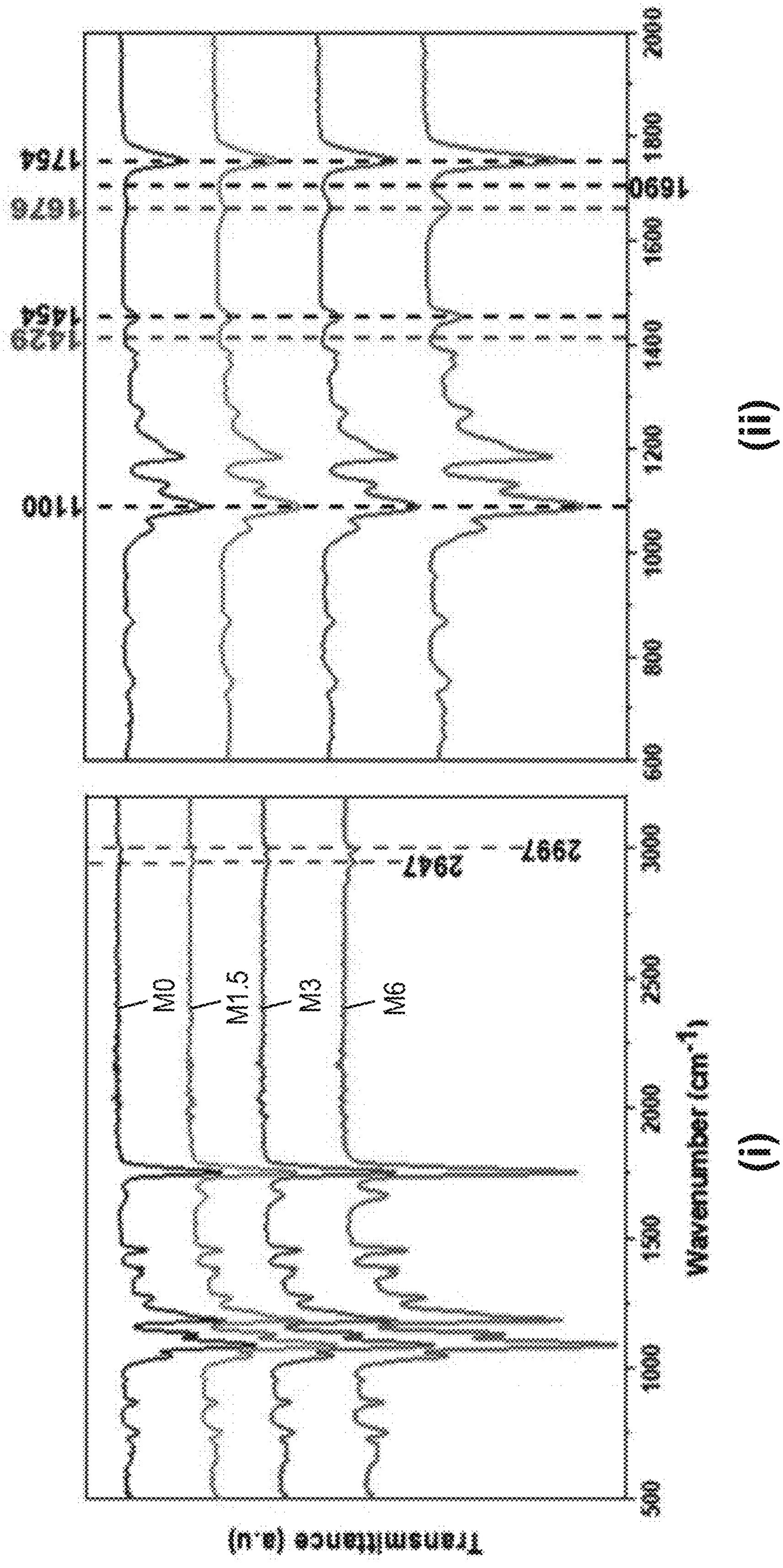

Lastly, FTIR analysis was carried out to investigate the surface functional groups of the pristine PLA and nanocomposite membranes (FIG. 7Di and FIG. 7Dii). PLA showed peaks at 1100, 1454, and 1754 $cm^{-1}$, which were related to the —C—O, C—H in $CH_3$ and —C═O, respectively. Additional PLA peaks were observed at 2947 and 2997 $cm^{-1}$, which corresponded to the C—H asymmetric stretching vibration, and 1690 cm-1 peak, which corresponded to the carbonyl absorption of PVP. Finally, the peaks that are attributed to the nanocomposite were observed at 1429 and 1676 $cm^{-1}$ and corresponded to the CO—NH— and C—N stretching vibrations, respectively. The intensity of these two peaks was noticed to increase and became sharper as the nanohybrid content increased in the composite membranes.

Example 4: Influence of f-MWCNTs/GO Nanohybrid on Membrane's Performance

Figure 9:
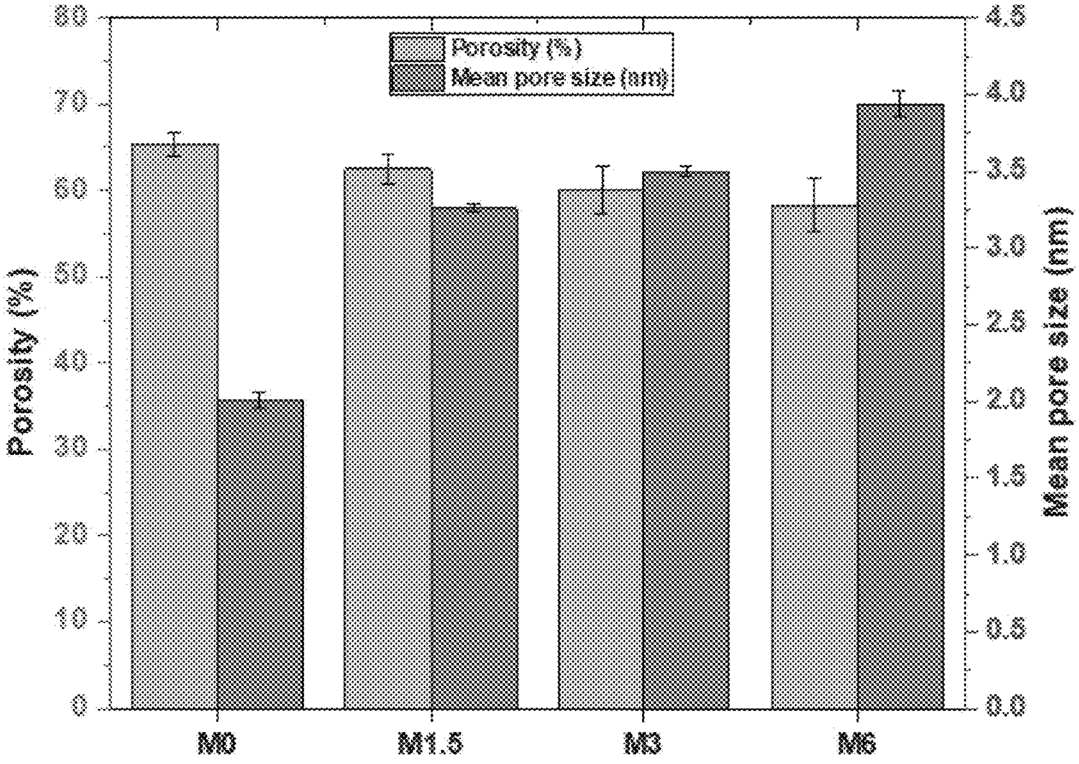
FIG. 9 shows the average porosity and mean pore size of the pristine and nanocomposite membranes (M1.5, M3, and M6).
Figure 10:
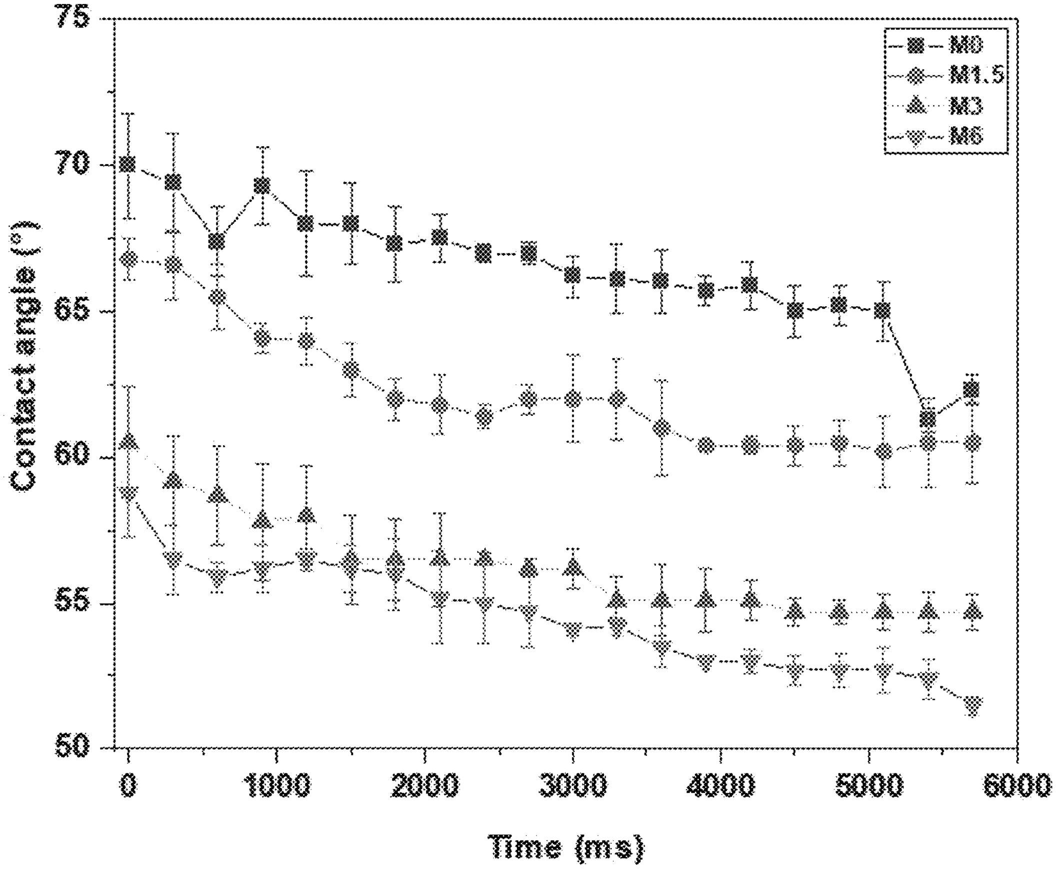
FIG. 10 shows the dynamic contact angle of the pristine (M0), and nanocomposite membranes (M1.5, M3, and M6).

The porosity and mean pore size were calculated (FIG. 9). In addition, the static (FIG. 11A) and dynamic (FIG. 10) DI water CAs of all membranes were measured to evaluate their hydrophilicity. The CAs of all membranes decreased with an increase in the nanohybrid loading over time. The pristine membrane had the highest CA value, while the M6 membrane had the lowest CA value of 70.2±2.1° and 58.8±2.1°, respectively. A similar CA value of the pristine PLA membrane was reported in the literature. The wettability of nanocomposite membranes was enhanced compared to that of pristine membranes, due to the presence of hydrophilic functional groups of GO and f-MWCNTs, such as —OH and carboxyl groups, in addition to amino groups in the f-MWCNTs74. Furthermore, the functionalization of MWCNTs leads to their hydrophilic moieties being highly distributed within the membrane polymer matrix.

Figure 11A:
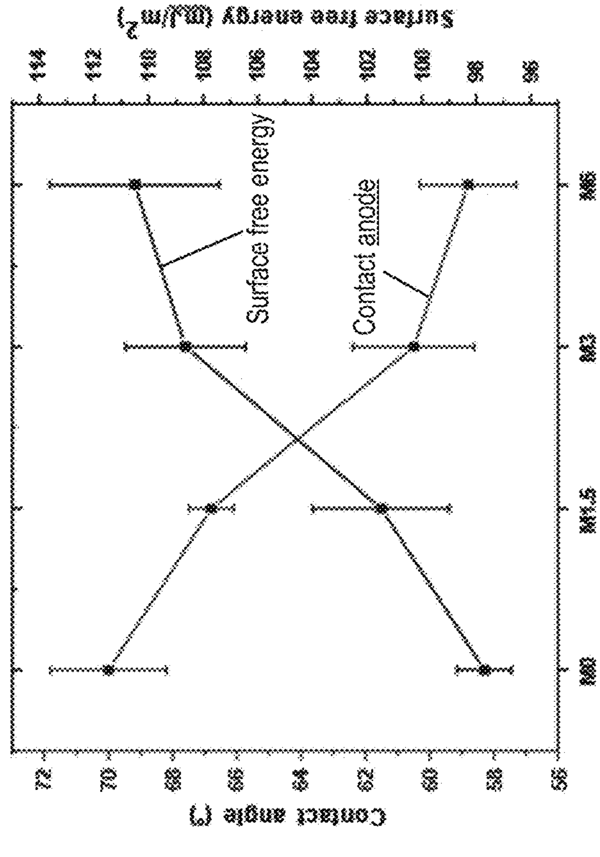
FIGS. 11A-11H show the performance of membranes.
Figure 11B:
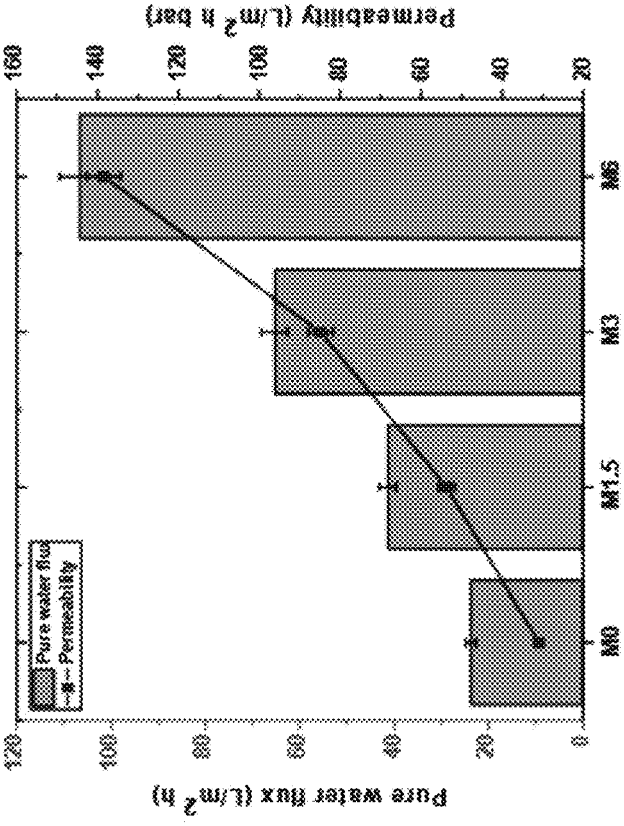

However, the surface free energy of the membranes, shown in FIG. 11A, followed an opposite trend to the static DI water CA. The surface free energy of the PLA membranes increased with the increase in the nanocomposite content. For example, the surface free energy of the membranes of P, M1.5, M3, and M6 was 97.7±1.1, 101.5±2.5, 108.7±2.1, and 110.5±3.1 $mJm^{-2}$, respectively. In general, both the CA and surface free energy results showed that the nanohybrid's addition improved the membranes' hydrophilicity. This improvement could be positively reflected in the water permeability of the nanocomposite membranes (FIG. 11B). The results revealed that the water permeability of the membranes increased with the increase of the nanohybrid loading. Therefore, the pristine membrane showed the lowest water flux with a value of 24.3±1.2 L $m^{-2}h^{-1}$ and increased tremendously to reach 106.7±4.2 L $m^{-2}h^{-1}$ for the M6 membrane, almost five times better than the pristine membrane. These results are consistent with the mean pore size, porosity (FIG. 9), and CA outcomes.

Example 5: Synthetic Wastewater Filtration

Figure 11C:
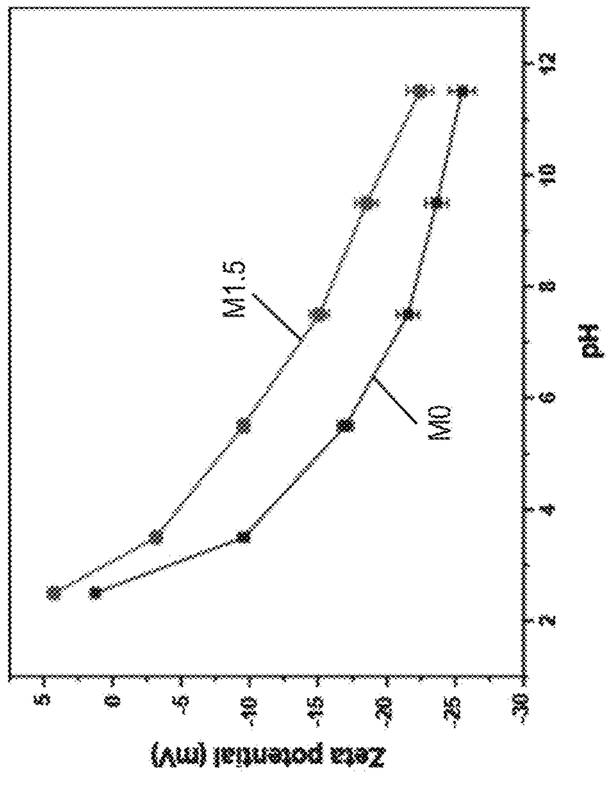
Figure 12:
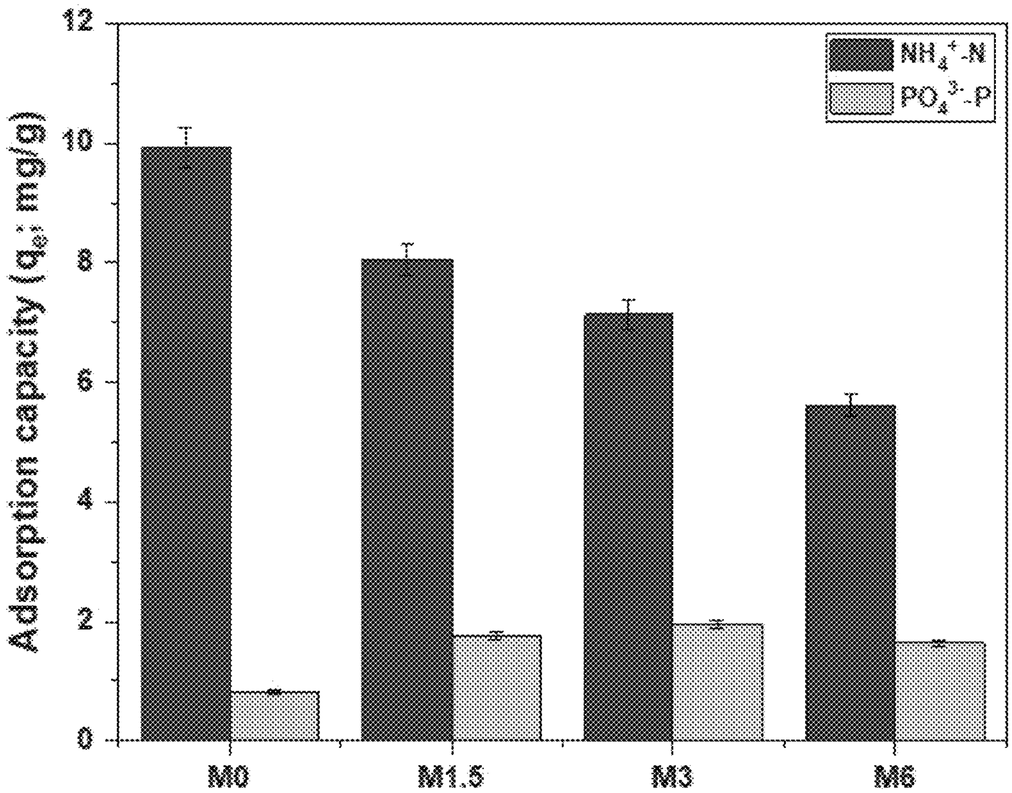
FIG. 12 shows the static nutrient ion adsorption of pristine (M0) and nanocomposite membranes (M1.5, M3, and M6).

The static adsorption of nutrient ions was investigated using fabricated membranes and synthetic wastewater (FIG. 12). The results revealed that the static adsorption of $NH_4^+$—N was higher than that of $PO_4^{3-}$—P for all membranes. To further understand the static results obtained, the ζ-potential was investigated at a wide range of pH, from 2.5 to 11.5 for the pristine and M1.5 membranes (FIG. 11C). The ζ-potential of the membranes was around −21 and −14 mV for pristine and M1.5 membranes, respectively, at pH=7, at which all the analyses in this study were carried out. Similar ζ-potential values of pristine PLA membranes were reported in the literature. As demonstrated, the ζ-potential was significantly affected by the addition of the nanohybrid, the M1.5 membrane's ζ-potential increased due to the positively charged nanohybrid added (FIGS. 2A and 2B).

Figure 14A:
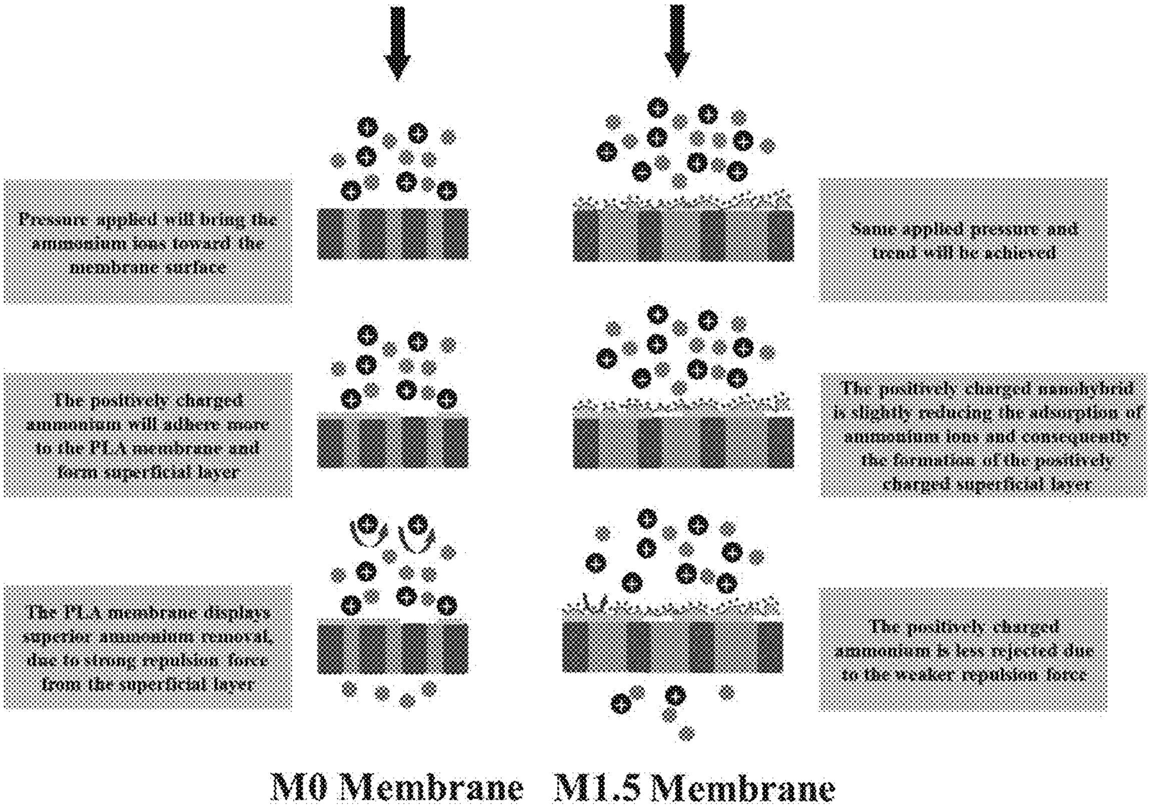
FIGS. 14A and 14B are schematics illustrating the removal mechanism of $NH_4^+$ and $PO_4^{3-}$ ions using M0 and M1.5 membranes, according to some embodiments.
Figure 14B:
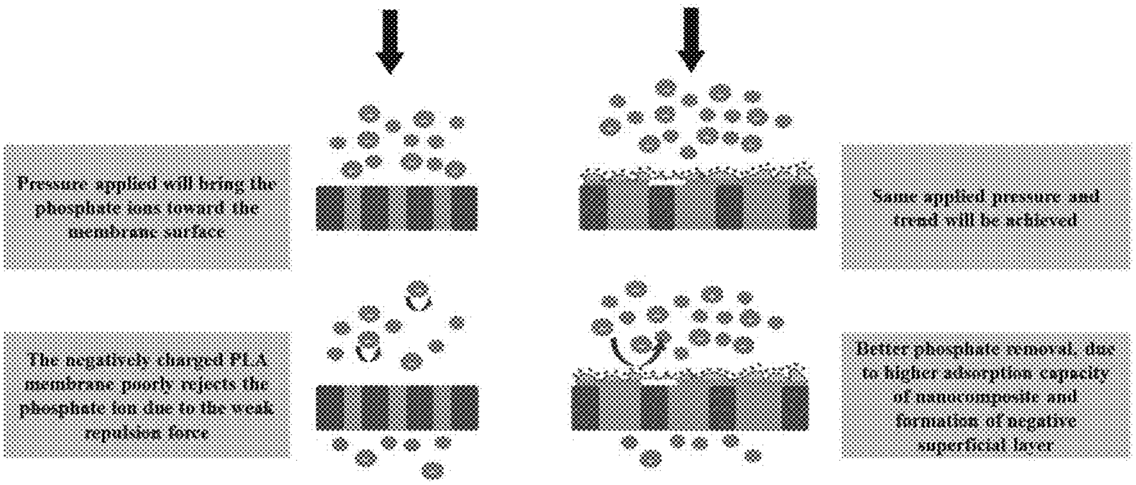
Figure 15:
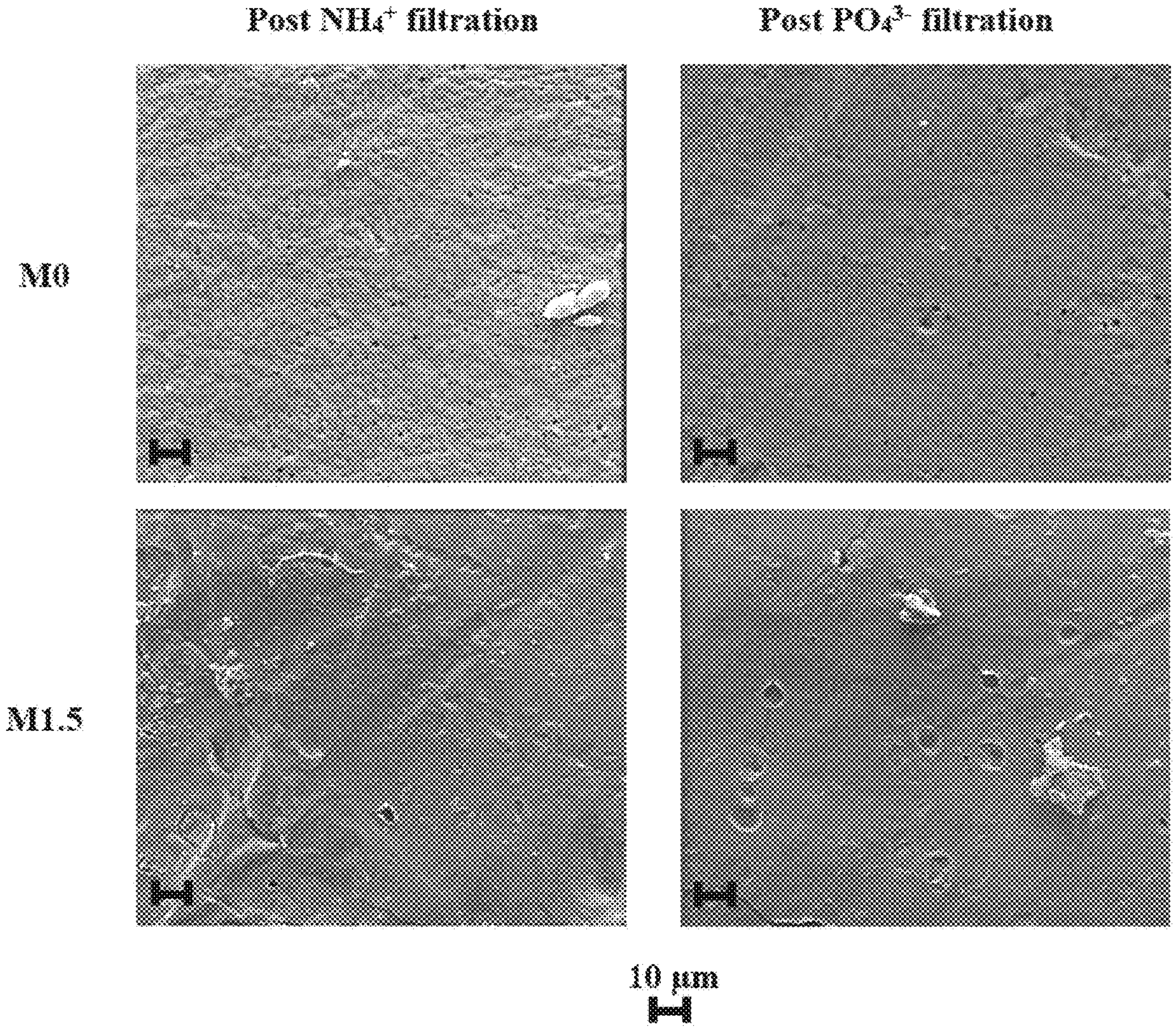
FIG. 15 shows the SEM images of the M0 and M1.5 membranes post-synthetic wastewater filtration.
Figure 16B:
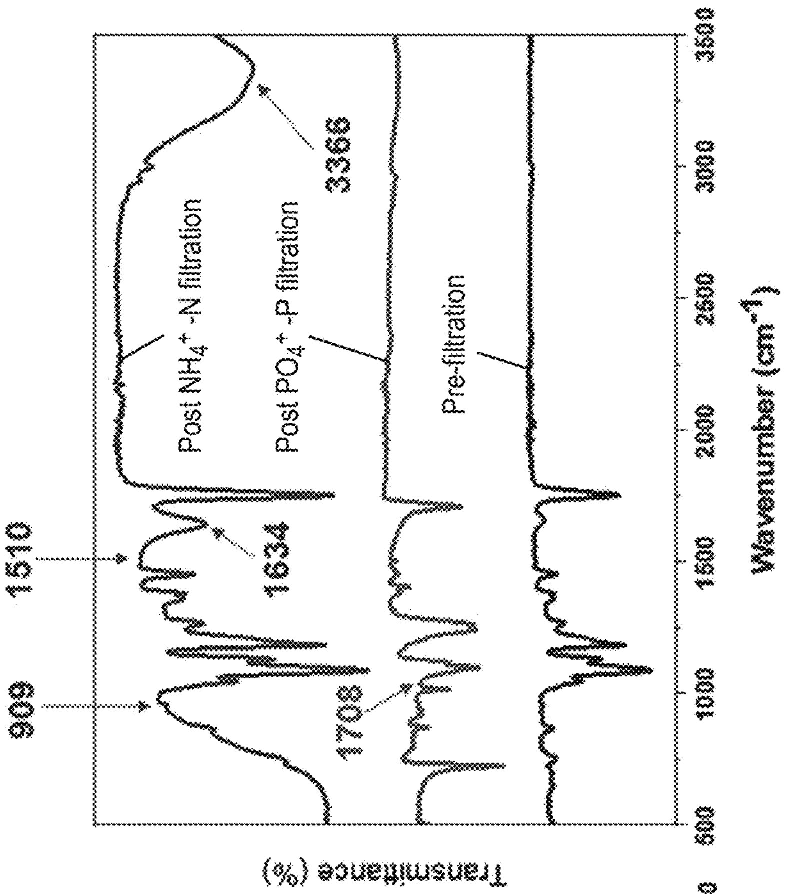
FIG. 16A and FIG. 16B shows the ATR-FTIR spectra of M0 (FIG. 16A), and M1.5 (FIG. 16B) membranes before and after filtration of synthetic wastewater.
Figure 16A:
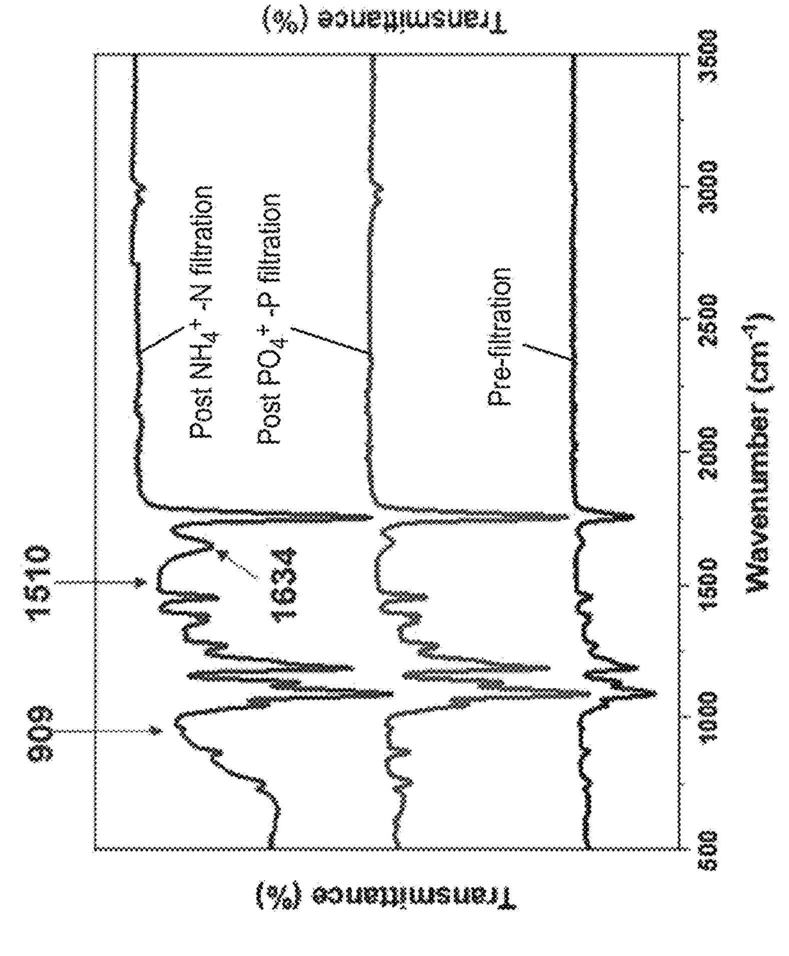

In addition, the dynamic filtration of nutrients removal rate was evaluated. After 30 min of filtration (FIG. 13), the dynamic nutrient removal outcomes were consistent with the static adsorption results. It was expected that the membrane with higher adsorption capacity will form a superficial layer of nutrients on its surface and this would positively reflect on the nutrient removal rate based on the repulsion mechanism described in FIGS. 14A and 14B. The pristine membrane exhibited the highest $NH_4^+$—N ion removal (91.2±5.1%) and decreased slightly with the addition of nanohybrid content. M1, M3, and M6 membranes rejected $NH_4^+$—N ions with rates of 81.3±4.2%, 68.1±3.1%, and 55.2±2.8%. Although $PO_4^{3-}$—P removal rates were enhanced with the addition of nanohybrid content, M1.5, M3, and M6 membranes showed higher rejection rates of 46.3±2.2%, 49.4±2.5%, and 42.2±2.1%, than the rejection rate of the pristine membrane. The main separation mechanisms of the NH 4+ and $PO_4^{3-}$ ions of the fabricated membranes are by adsorption/repulsion (see FIGS. 14A and 14B), which have been proved by the post-filtration characterization tests (FIG. 15 and FIGS. 16A, 16B).

In the case of the pristine membrane, $NH_4^+$ ions cannot pass through the pores of the membrane due to the positively charged superficial layer formed on the surface. This layer is formed when $NH_4^+$ ions are attached to the negatively charged surface of the membrane. This leads to the repulsion of $NH_4^+$ ions; thus, reducing the diffusion of $NH_4^+$ ions into the membrane phase. In nanocomposite membranes, the positively charged nanohybrid (FIG. 2B) slightly reduces the adsorption of $NH_4^+$ ions and consequently, the formation of a positively charged superficial layer. This explains the decrease in the removal of $NH_4^+$ ions as the nanohybrid content increased. This trend was observed in several literature studies. On the contrary, the nanocomposite membranes exhibited a higher rejection of $PO_4^{3-}$ ions than the pristine membrane, due to the higher $PO_4^{3-}$ ions adsorption capacity of the less negative nanocomposite membranes, and the formation of a negative superficial layer is greater. This can also be supported by the ζ-potential measurements (FIG. 11C). Based on the results, all nanocomposite membranes have higher flux, are more hydrophilic, and have better thermal stability than the pristine membrane. However, the most promising fabricated membrane is M1.5 because it has the highest nutrient removal rates among the other nanocomposite membranes and has double the flux of the pristine membrane. Therefore, M1.5 was compared to the pristine membrane in the analyses shown in FIGS. 14A and 14B.

Figure 11D:
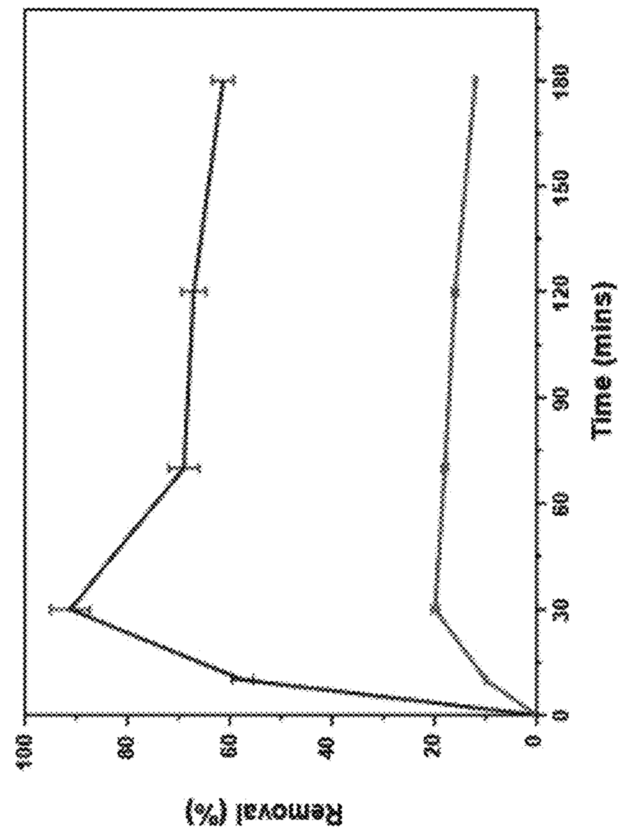
Figure 11F:
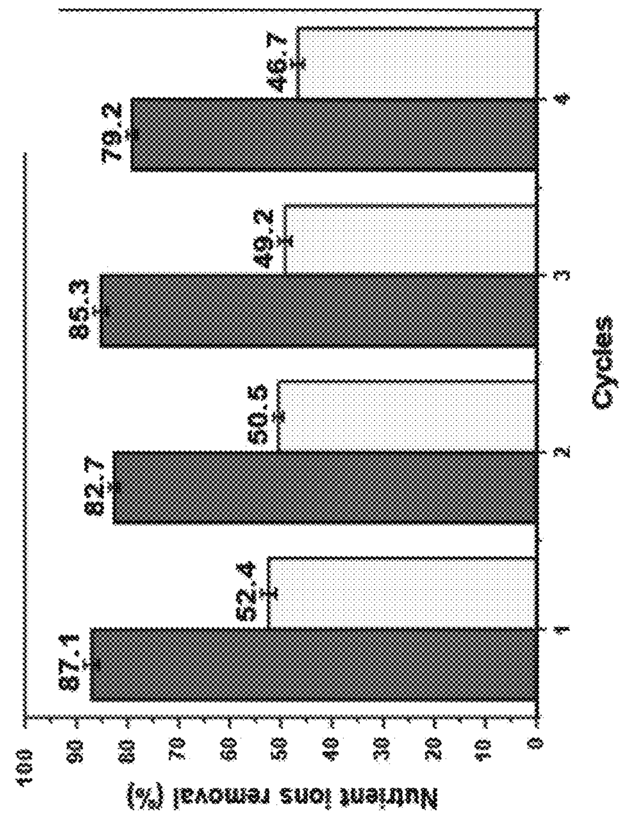
Figure 11E:
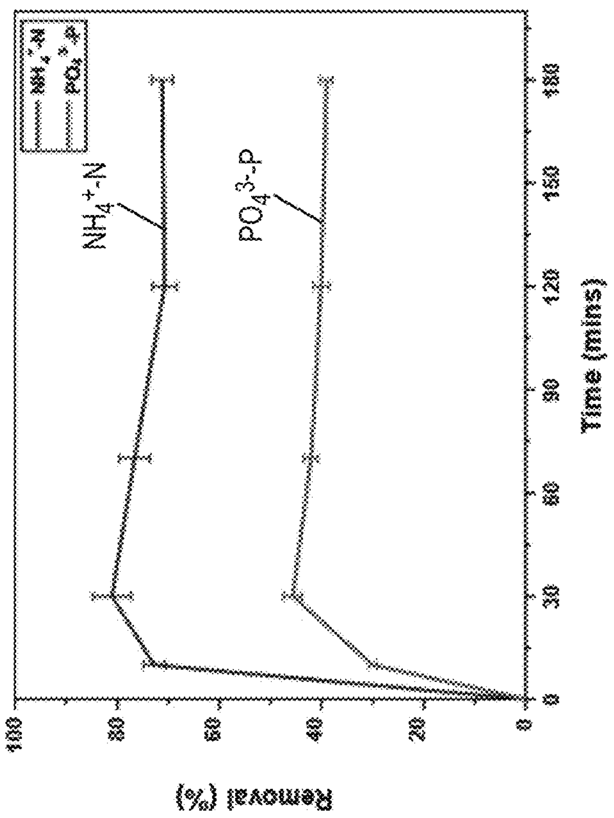

The performance of M0 and M1.5 membranes, in terms of nutrient ion removal, was assessed for a prolonged filtration experiment for 3 h (FIG. 11D and FIG. 11E). Permeate samples were collected at intervals of 10, 30, 70, 120, and 180 min for analysis. In the first 30 min, the pristine membrane showed higher rejection of $NH_4^+$—N; however, of 91.2±5.1% and then decreased to 61.2±2.1% after 180 min of operation, while the removal rate of $PO_4^{3-}$—P ions was 20.4±0.2% and reduced to 12.1±0.3% over the filtration time. On the other hand, the M1.5 membrane demonstrated a more stable nutrient removal profile. Therefore, its performance decreased only by ≈10 and ≈6% for NH 4+ and $PO_4^{3-}$ ions, respectively. Furthermore, the M1.5 membrane showed a higher rejection of $NH_4^+$—N in the first 10 min of 73.1±2.1%, compared to only 57.2±2.3% of the pristine membrane. This could be explained as follows: first, rapid adsorption of $NH_4^+$ ions occur on the exterior surface of the adsorbent until it reaches the saturation point, then $NH_4^+$ ions would start to be adsorbed at the interior surface of the adsorbent. At the start of the experiment, the availability of plenty of free readily adsorption sites lead to a fast diffusion and rapid equilibrium accomplishment; hence, the M1.5 membrane has more adsorption sites on its exterior surface than the pristine membrane, and it has greater prolonged complexation/adsorption of nutrients on its surface. However, the pristine membrane has less adsorption sites since it showed a higher $NH_4^+$—N rejection for only 30 min and then declined. Furthermore, the M1.5 membrane showed a higher overall $PO_4^{3-}$—P rejection of 46.3±2.2%, compared to only 20.1±20.8% when compared to the M0 membrane. Lastly, the slight reduction in nutrient removal after 30 min of filtration for both membranes is due to the saturation of the all-active sites in the membrane.

Example 6: Raw Municipal Wastewater Filtration

Figure 11H:
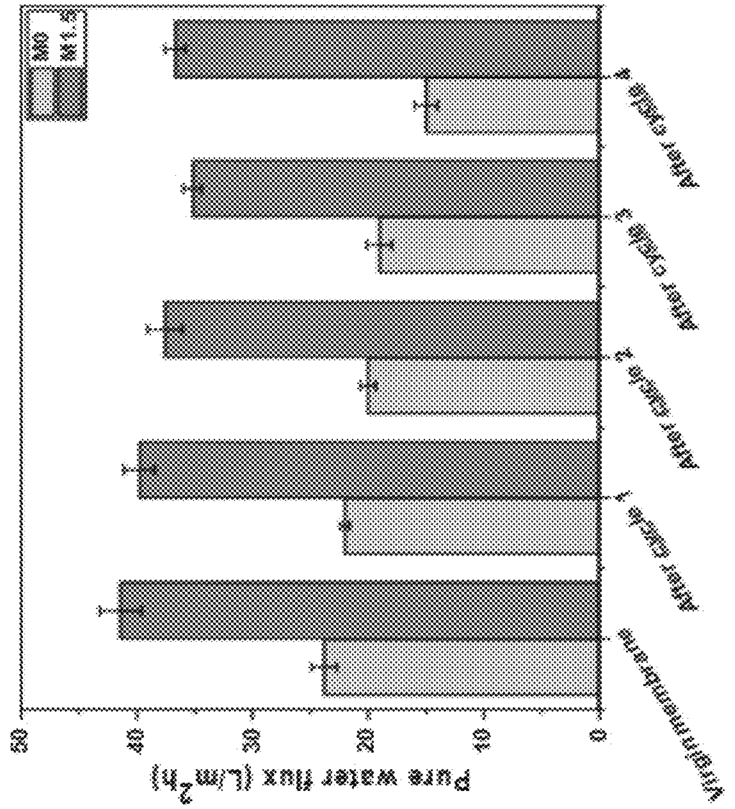
Figure 11G:
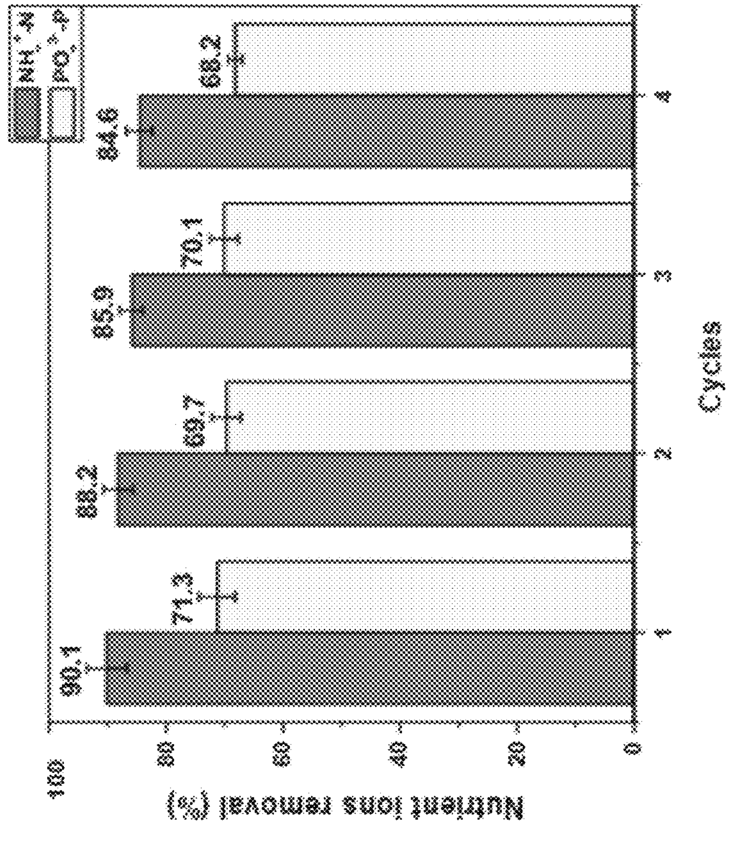
Figure 13:
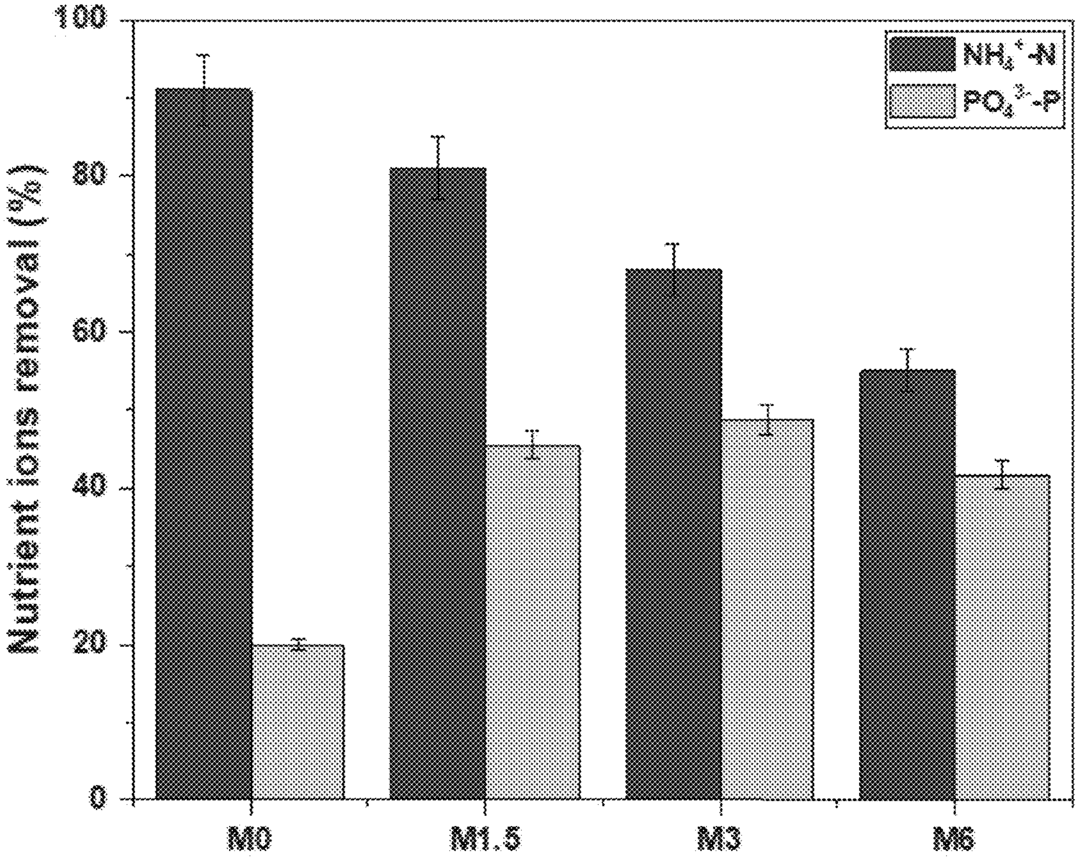
FIG. 13 shows the nutrient ion removal after 30 min of filtration operation using pristine (M0), and nanocomposite membranes (M1.5, M3, and M6).

The reusability of the pristine and M1.5 membranes was evaluated using raw municipal wastewater for four cycles of filtration operation (FIG. 11F and FIG. 11G). Furthermore, to investigate the durability of the membranes, cleaning with only water was performed after each cycle, and the permeate flux of the membranes was recorded (FIG. 11H). The results (FIG. 11F and FIG. 11G) showed that the performance of the M1.5 membrane enhanced using raw wastewater, compared to synthetic wastewater (FIG. 13). For example, the rejection of $NH_4^+$—N ions was 90.1±3.4% for M1.5 membrane, using raw wastewater, compared to 81.3±4.2% using synthetic wastewater. Similarly, the $PO_4^{3-}$—P rejection increased by 26% using raw wastewater. While in the case of the pristine membrane, the rejection of $NH_4^+$—N was 4% lower and the rejection of $PO_4^{3-}$—P was 32% higher using raw wastewater. Furthermore, the results indicated that the M1.5 membrane maintained higher removal of both nutrients after four cycles of operation. The overall removal of the $NH_4^+$—N and $PO_4^{3-}$—P dropped slightly from 90.1±3.1%, and 71.3±3.2% to 84.6±2.2%, and 68.2±1.3%, respectively. Although the pristine membrane rejection rates of the NH 4+ and $PO_4^{3-}$ ions decreased significantly from 87.1±1.4%, and 52.4±1.4% to 79.2±0.9%, and 46.7±1.1%, respectively. The decline in the rejection rate is related to the rapid saturation with nutrients, resulting in adsorption/leakage or incomplete desorption prior to cleaning the membranes. This was also reflected in the water flux measurements after each cycle (FIG. 11H). Therefore, the water flux of the pristine and M1.5 membranes dropped by ≈36%, and ≈11%, respectively, after four cycles of operation. The superior performance of the M1.5 membrane over the pristine membrane is mainly attributed to the existence of hydrophilic f-MWCNTs/GO nanohybrid, which greatly enhanced the surface morphology and the hydrophilicity of the nanocomposite membranes. This would mitigate the accumulation of contaminants and improve the cleaning process. From these results, it can be concluded that the fabricated f-MWCNTs/GO-based PLA nanocomposite membranes can be regenerated and reused with simple water cleaning while maintaining a high removal rate. The performance of the M1.5 membrane was further compared with that of other membranes targeting the same pollutants studied in the literature as shown in TABLE 2 and TABLE 3.

TABLE 2

Comparison of $NH_4^+$—N removal by different studies in the literature

| Membrane | Water permeability (LMH/bar) | $NH_4^+$—N concentration (mg/L) | $NH_4^+$—N removal (%) | Pressure used (bar) |
|---|---|---|---|---|
| M1.5 | 53.8 | 30[1]<br>28.9[2] | 81.3[1]<br>90.1[2] | 0.8 |
| PVDF | 1.4 | 1 | 79 | 8 |
| PVDF/Zeolite | 15.1 | | 50 | |
| PVDF/Gypsum | 18.4 | | 27 | |
| PSf/Z (80/20) | 40.8 | 10 | 99.1 | 1 |
| PSf/Z (70/30) | 40.8 | | 98.6 | |
| PSf/Z (60/40) | 13.2 | | 86.0 | |

[1]Using synthetic wastewater,
[2]Using raw wastewater.

TABLE 3

Comparison of $PO_4^{3-}$—P removal by different studies in the literature

| Mem. | Category | Water perme-ability ($L/m^2h$) | $PO_4^{3-}$—P conc. (mg/L) | $PO_4^{3-}$—P removal (%) | Pressure used (bar) |
|---|---|---|---|---|---|
| M1.5 | Ultrafiltration | 53.8 | 10[1]<br>3.3[2] | 46.3[1]<br>71.3[2] | 0.8 |
| NF90 | Nanofiltration | 6.4 | 7.7 | 84.2 | 3 |
| NF200 | | 9.4 | | 81.6 | |
| NF270 | | 15.0 | | 76.3 | |
| DK5 | | 2.0 | | 11.4 | |
| MPF34 | | 2.1 | | 6.1 | |
| PAN | Ultrafiltration | 206.7 | 1 | 45.2 | 3 |
| $PAN-NH_2$ | | 33.0 | | 95.8 | |
| $PAN-NH_2$-La0.3 | | 15.8 | | 96.1 | |

[1]Using synthetic wastewater,
[2]Using raw wastewater.

Example 7: Negatively Charged Graphene Oxide/Multi Walled Carbon Nanotube/(F-GO/MWCNT-COOH) Nanohybrid-Based Mixed Matrix Membrane The synthesis of f-GO and MWCNTs-COOH has been explained in the foregoing paragraphs. The electrostatic co-precipitation approach was used to obtain the self-assembled negative charged f-GO/MWCNTs-COOH nanohybrid. The nanohybrid was prepared by mixing a 20:80 volume ratio of positively charged f-GO (5.73 g/mol) and negatively charged MWCNTs-COOH (8.5 g/mol). Both f-GO and MWCNTs-COOH were diluted to a concentration of 1.5 mg/mL by adding DI water and then sonicated for 30 min to get well-dispersed solutions. Under vigorous stirring, the f-GO solution was added dropwise to the MWCNTs-COOH solution to make self-assembled nanohybrids. The electrostatic attraction between positively charged f-GO and MWCNTs-COOH leads to self-assembly, and the solution starts to coagulate. The solution was left untouched for 2 days to precipitate the nanohybrids, then centrifuged (8000 rpm, 30 min) followed by freeze-drying for 3 days to obtain dried self-assembled nanohybrids. The ratio of f-GO and MWCNTs-COOH was altered to obtain differently charged nanohybrids.

Figure 17:
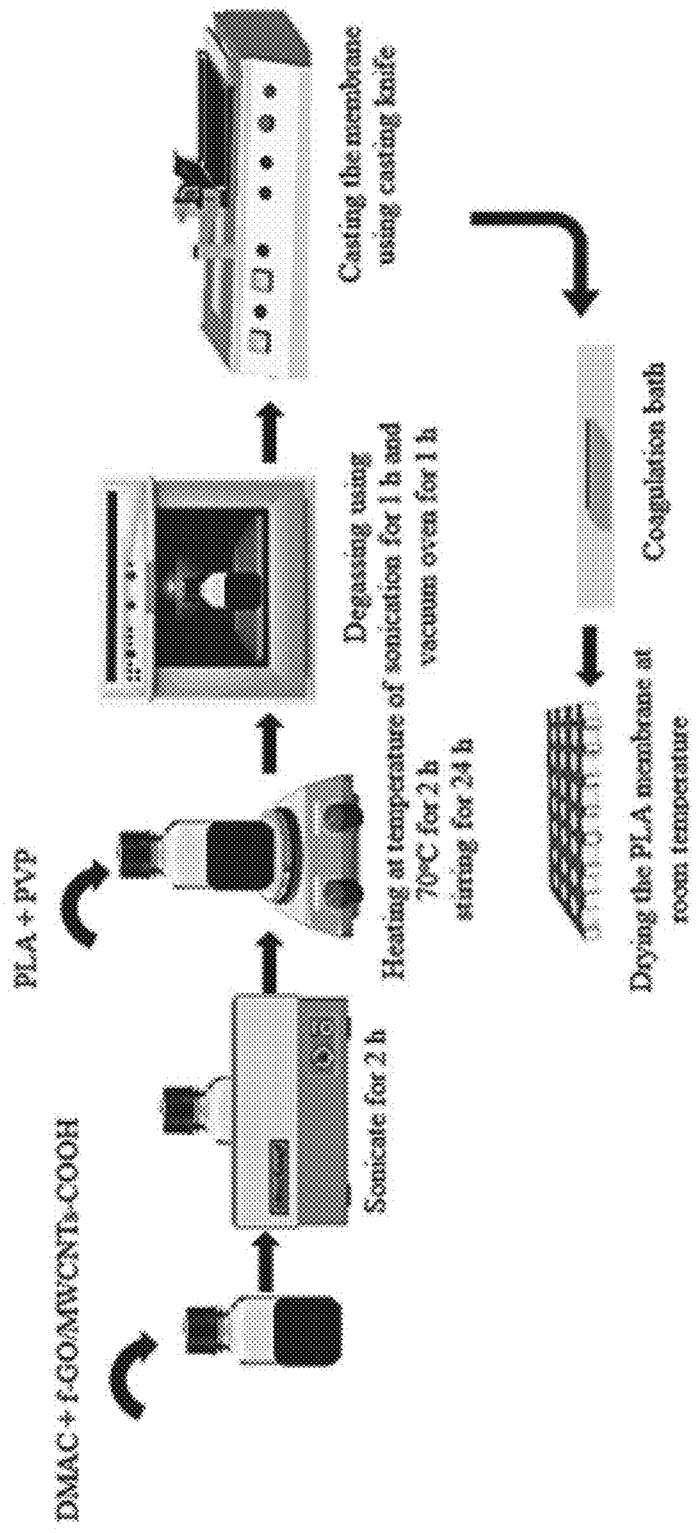
FIG. 17 shows the schematic diagram for fabricating membranes via the immersion precipitation technique, according to some embodiments.
Figure 18:
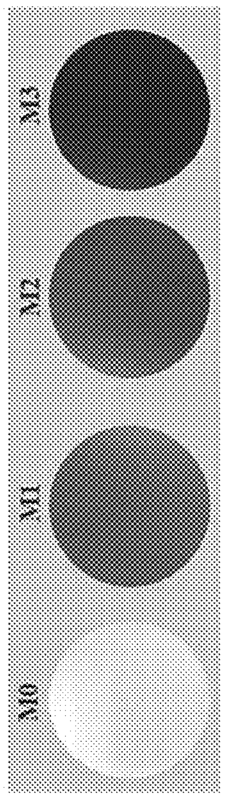
FIG. 18 shows the digital photos of the fabricated negatively charged mixed matrix membranes.

All f-GO/MWCNTs-COOH-based PLA nanohybrid mixed matrix membranes were synthesized using the immersion precipitation method. The nanohybrid with different contents was sonicated in DMAC solvent for 2 h, and then PLA and PVP were dissolved subsequently. Then, the prepared dope solutions were used to fabricate the membranes. The fabricated membranes were marked as M0, M1, M2, and M3. The concentrations of the fabricated membranes are presented in TABLE 4. FIG. 17 illustrates the procedures used to fabricate the membranes and FIG. 18 shows real photos of the fabricated mixed matrix membranes. They were cut into circular discs and secured with O-rings to match the dimensions of the UF batch-type cell. The active membrane surface area was approximately 12.56 $cm^2$.

TABLE 4

Concentrations of materials utilised to prepare the PLA membranes

| Label | M0 | M1 | M2 | M3 |
|---|---|---|---|---|
| PLA (wt %) | 20 | 20 | 20 | 20 |
| f-GO/MWCNTs-COOH (wt %)* | 0 | 1.5 | 3 | 6 |
| PVP (wt %) | 2 | 2 | 2 | 2 |
| DMAC (wt %) | 78 | 76.5 | 75 | 72 |

*The concentration percentage of f-GO/MWCNTs-COOH nanohybrid was calculated based on PLA concentration.

Example 8: Negatively Charged Mixed Matrix Membrane Characterization

SEM and EDS were utilized to study the morphological characteristics and surface chemical structure of the membranes by capturing surface and cross-sectional images of membranes. Before the analysis, a coating procedure was performed using platinum to form a 10 nm layer on the top of the membrane surface to enhance image quality. The surface functional groups of the produced mixed matrix membranes were assessed using FT-IR analysis. XRD was used to evaluate the crystallinity of the produced membranes. The prepared membranes' hydrophilicity was obtained by determining the WCA using a sessile drop technique utilizing a contact angle analyzer (Krüss, Germany) A 5 μL droplet of DI water was dropped onto the membrane surface using a micro-syringe to capture the image of the water droplet. To reduce experimental error, the average values of five contact angle measurements were obtained. The porosity of the membranes was measured using the dry/wet technique.

Figure 19:
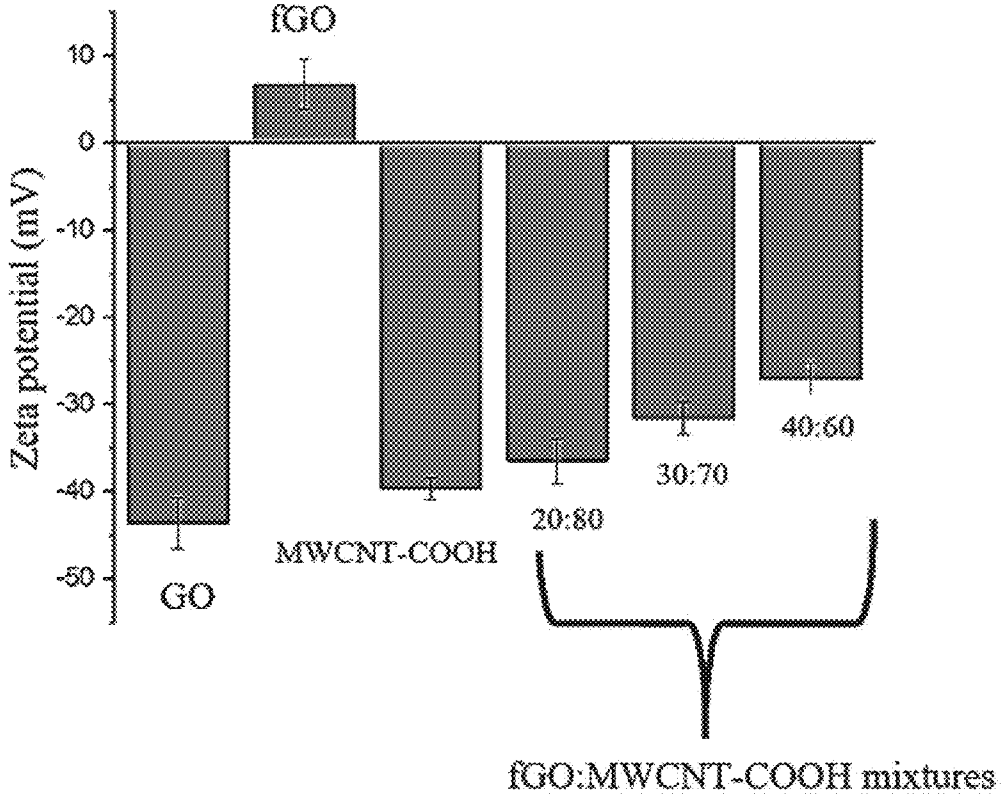
FIG. 19 shows the Zeta potential profiles of the synthesized negatively charged mixed matrix membranes, according to some embodiments.

For the characterization of f-GO/MWCNTs-COOH nanohybrid, the surface charge of the prepared nanohybrid was determined using a zeta potential analyzer as shown in FIG. 19. According to the obtained zeta potential values, mixing positively charged f-GO (6.8±2.6 mV) with negatively charged MWCNTs-COOH (−39.7±1.4 mV) in a ratio of 20:80 showed the highest negative charge zeta potential (−36.5±2.1 mV). Therefore, this ratio was selected to be integrated within the membrane-mixed matrix to enhance the membrane properties.

Figure 20C:
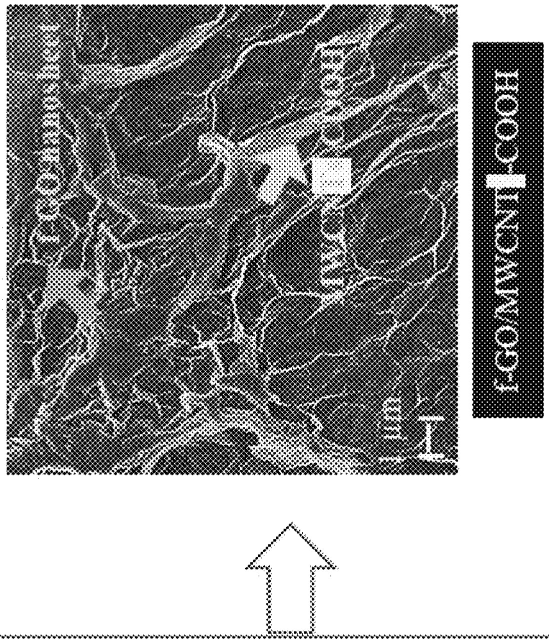
FIGS. 20A-20D show the SEM images of the prepared (FIG. 20A) MWCNTs and MWCNTs-COOH, (FIG. 20B) GO and f-GO, (FIG. 20C) f-GO/MWCNTs-COOH, and (FIG. 20D) EDS spectrum of f-GO/MWCNTs-COOH nanohybrid.
Figure 20B:
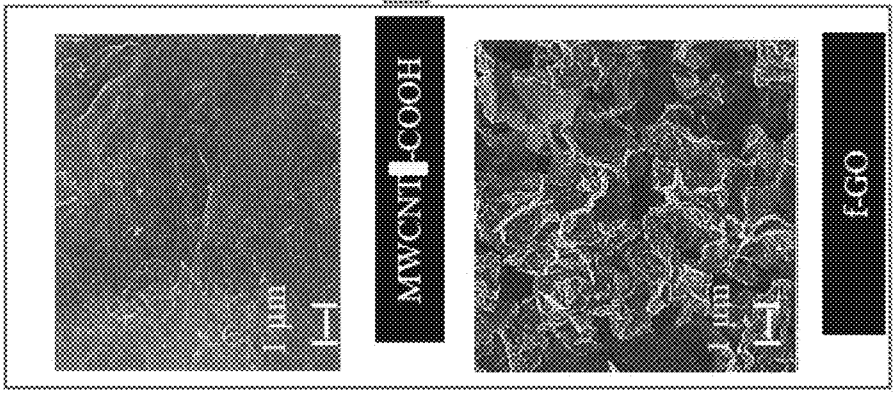
Figure 20A:
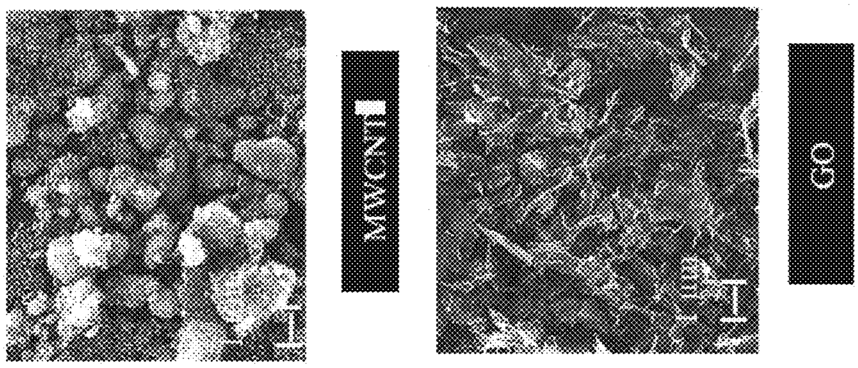
Figure 20D:
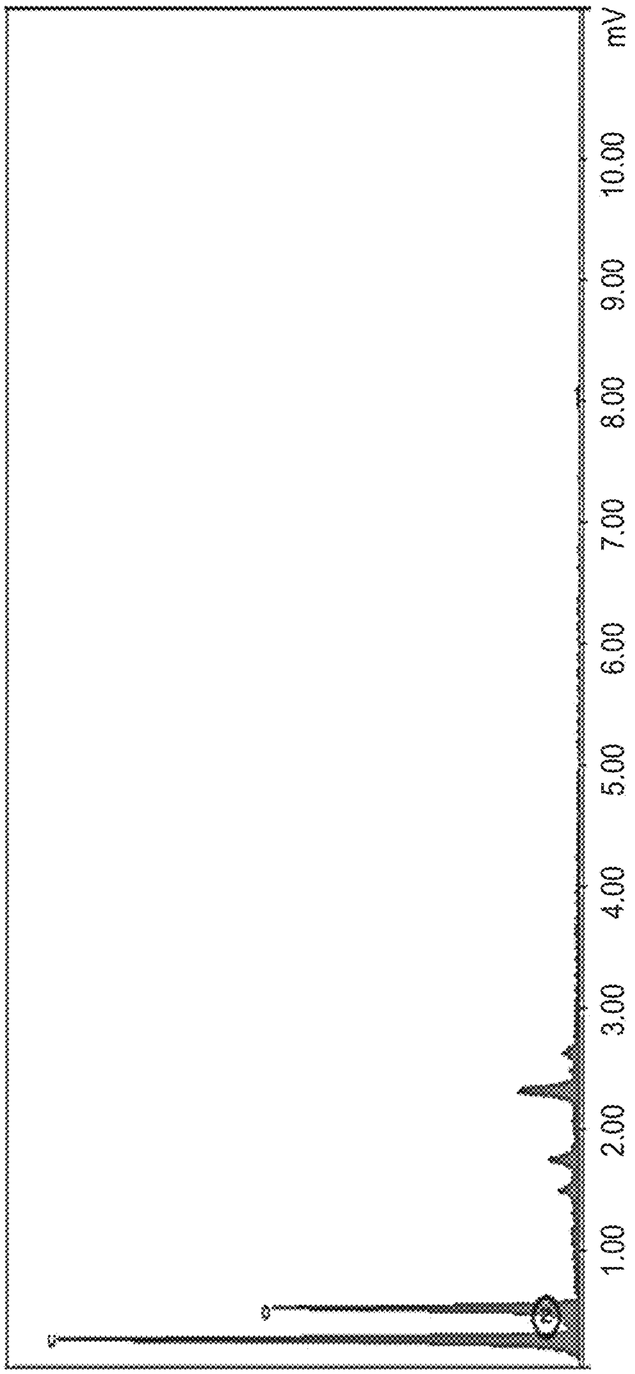

Typical microstructure SEM images of MWCNTs, MWCNTs-COOH, GO, f-GO and f-GO/MWCNTs-COOH are displayed in FIGS. 20A-20D. The control MWCNTs have the form of agglomerated bundles, which are fragmented into separate tubes due to aggressive acid treatment during the oxidation process to form MWCNTs-COOH (FIG. 20A). The GO nanosheets are shaped with wave-like surface morphology. Furthermore, the f-GO nanosheets have a huge surface area and show some agglomeration due to Vander Waals forces or π-π stacking as presented in FIG. 20B and FIG. 20C. This confirms that the negatively charged MWCNTs-COOHs have connected to the surface of amino f-GO nanosheets in hollow rod-like shaped bundles. This good arrangement could be attributed to the self-assembly interactions between two oppositely charged nanomaterials. FIG. 20D shows the elemental mapping of the nanohybrid. The presence of a nitrogen (N) atom verified the creation of multiple amide bonds and the existence of free amino groups on the f-GO/MWCNTs-COOH nanohybrid.

Figure 21B:
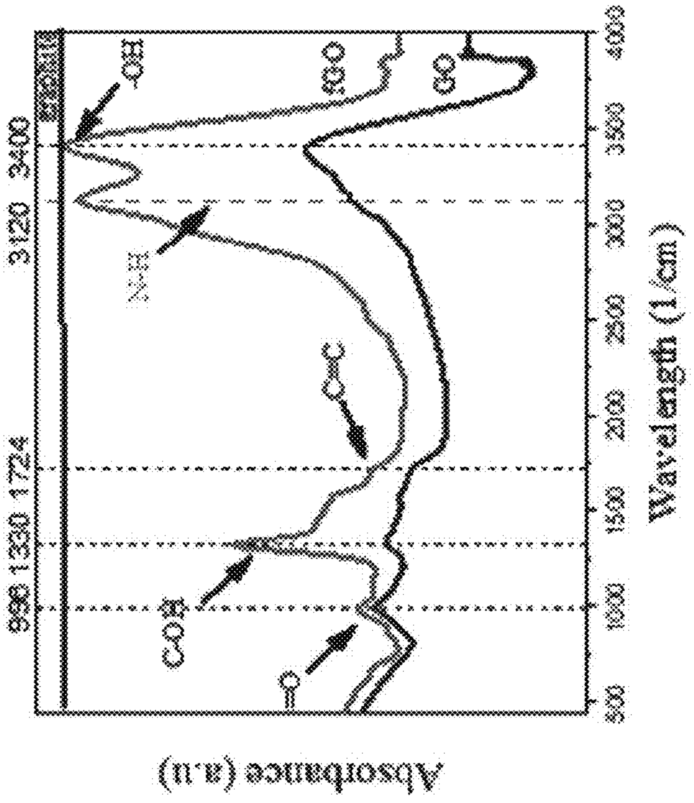
FIGS. 21A-21C show the FT-IR spectra of (FIG. 21A) MWCNTs and MWCNTs-COOH, (FIG. 21B) GO and f-GO, and (FIG. 21C) f-GO/MWCNTs-COOH.
Figure 21A:
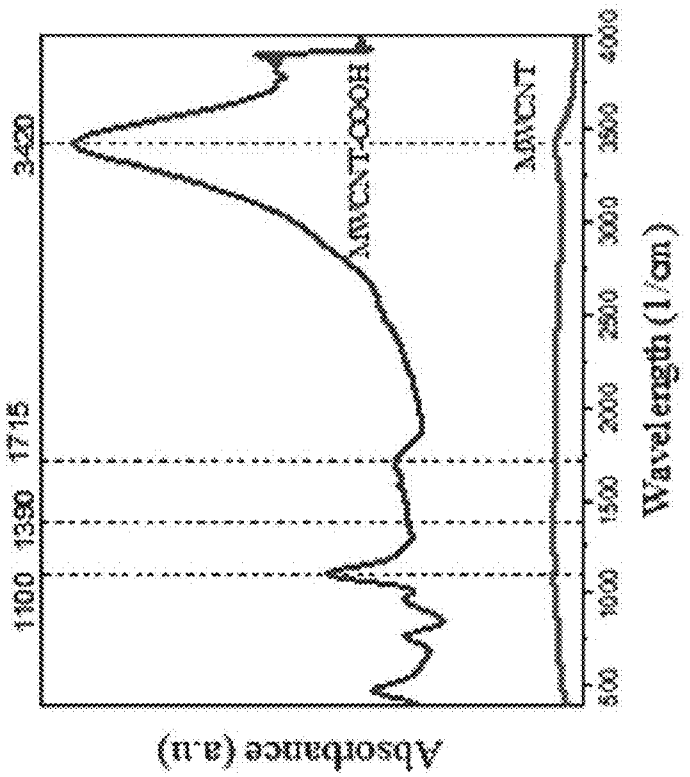
Figure 21C:
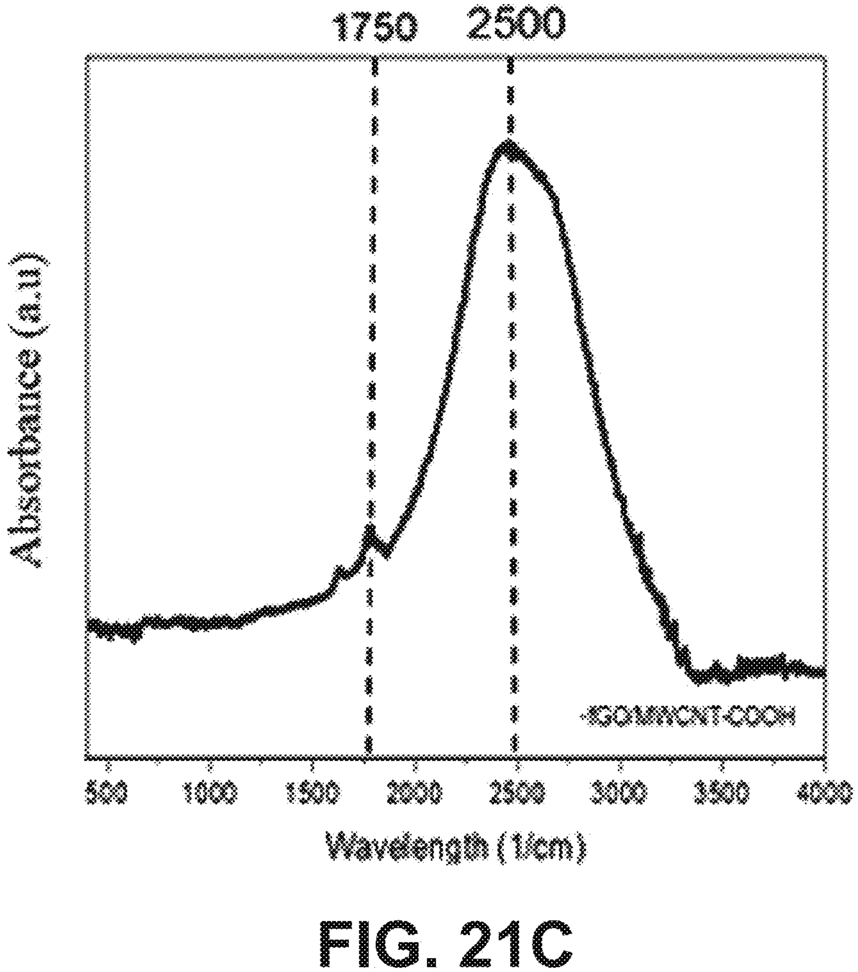

To confirm that MWCNTs-COOH had been successfully prepared, FT-IR analysis was carried out. As indicated in FIG. 21A, the pristine MWCNTs had a peak at 3420 $cm^{-1}$ in the measured range due to the hydroxyl groups at the edges, while new prominent peaks appeared at 1715, 1390, and 1100 $cm^{-1}$ after acid treatment, which related to the typical peaks of carboxyl groups, carbonyl groups, and C—O stretching vibration modes, respectively. The FT-IR spectra of graphite in FIG. 21B showed no significant peaks, while four distinct peaks were observed in the FT-IR spectra of the GO at 996, 1330, 1724, and 3400 $cm^{-1}$, which correspond to vibrations of ═O from carbonyl groups, C—OH of carboxyl groups, C═C, and O—H in water, respectively. The FTIR spectra of f-GO revealed a new peak at 3120 $cm^{-1}$, which confirmed the presence of N—H due to the amidation reaction (FIG. 21B). The FTIR of the nanohybrid showed a strong, wide peak in the region 2000-3500 $cm^{-1}$, which is characteristic of the stretching vibrations of secondary amide N—H combined with —OH groups, as shown in FIG. 21C.

Figure 22A:
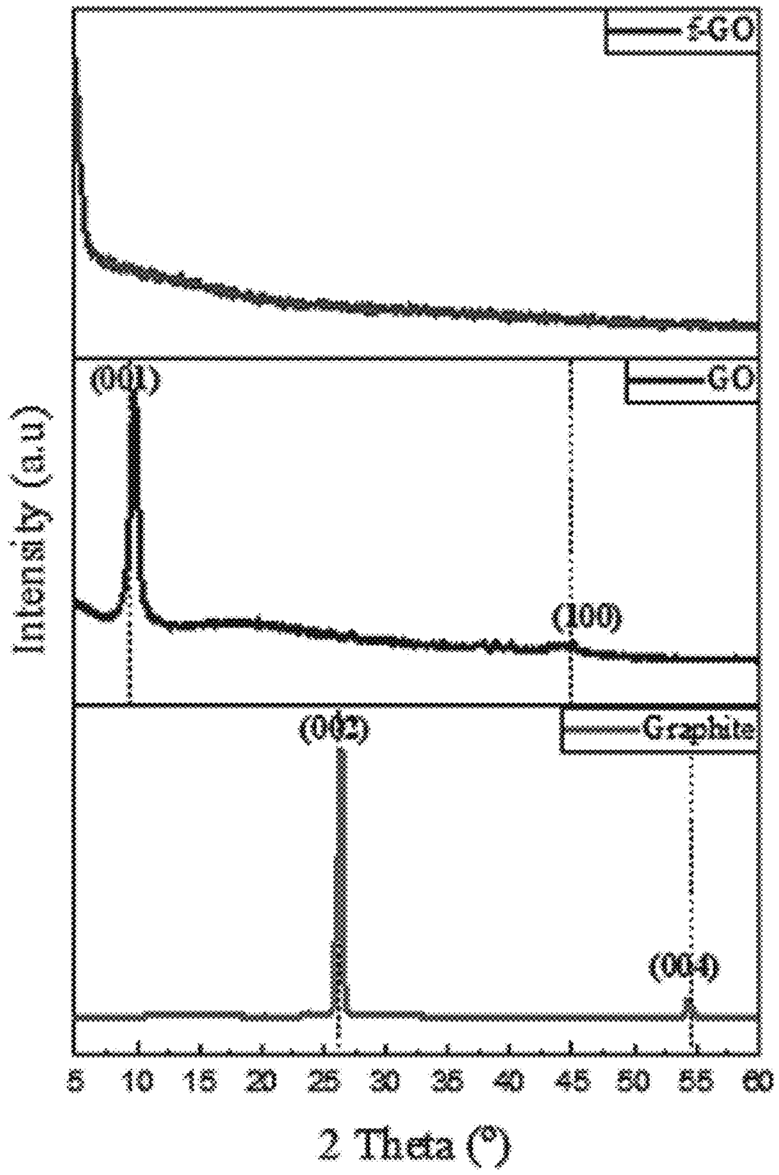
FIGS. 22A-22C show the XRD pattern of (FIG. 22A) GO and f-GO, (FIG. 22B) MWCNTs and MWCNTs-COOH, and (FIG. 22C) f-GO/MWCNTs-COOH.
Figure 22B:
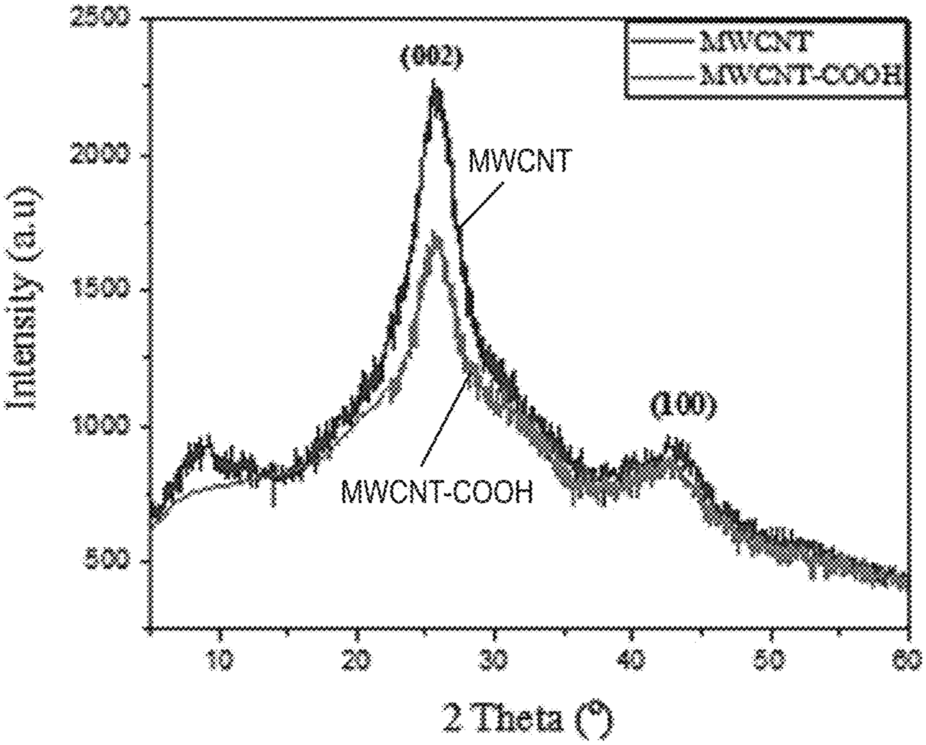
Figure 22C:
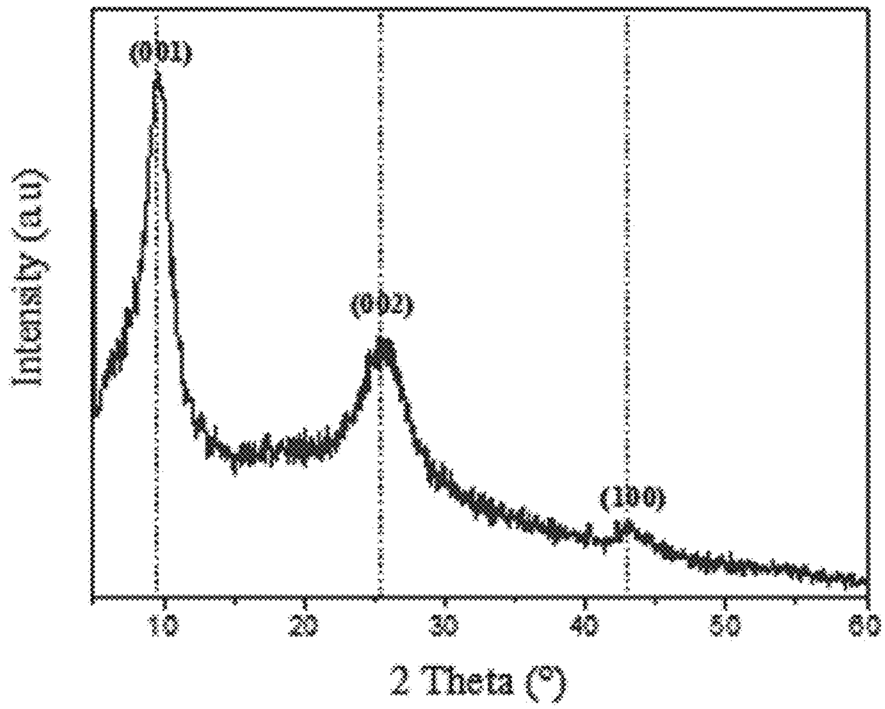

Peaks identified in the f-GO and MWCNTs-COOH nanomaterials were detected in the f-GO/MWCNTs-COOH nanohybrid, confirming the formation of a self-assembled nanohybrid, as shown in FIG. 22C. To validate the successful synthesis of f-GO and MWCNTs-COOH, XRD was employed to determine the structure of the cellular units (d-spacing). FIG. 22A illustrates the XRD pattern of graphite and GO. The graphite shows two distinct and sharp peaks (2θ=26.5° and 54.5°) specific to the (002) and (004) planes, with d-spacing of 3.2 and 1.5, respectively. The data depicts the normal graphite crystal structure. The GO exhibits a large diffraction peak at 2θ=9.8° (001) with a plane spacing of 8.7 and a (100) diffraction peak at 2θ=44.5° with a d-spacing of 2.0, indicating an effective GO synthesis.

The XRD patterns of MWCNTs and MWCNTs-COOH are presented in FIG. 22B. The (002) reflection of the hexagonal graphite structure with a d-spacing of 3.6 may be indexed as the strong diffraction peak at 2θ=26°. The (100) graphitic planes are responsible for the peak at 43°, which has a d-spacing of 2.3. The diffraction peaks of MWCNTs and MWCNTs-COOH are identical, yet pristine MWCNTs have the maximum intensity compared to MWCNT-COOH. As a result, it can be inferred that when MWCNTs were transformed into MWCNTs-COOH, the semi-crystalline structure of pristine MWCNTs was somewhat changed to an amorphous structure.

The XRD pattern of the f-GO/MWCNTs-COOH nanohybrid is shown in FIG. 22C. The diffraction peak at 9.5° was obtained from the GO; however, it had a broader d-spacing of 9.2 compared to the GO d-spacing of 8.7. Furthermore, two additional peaks were detected at 2θ=26° and 43°, which were obtained from the graphite-like structure of MWCNTs. XRD patterns showed that the f-GO/MWCNTs-COOH self-assembled nanohybrid enhanced structural heterogeneity and interlayer distance more than either f-GO or MWCNTs-COOH alone.

Figure 23:
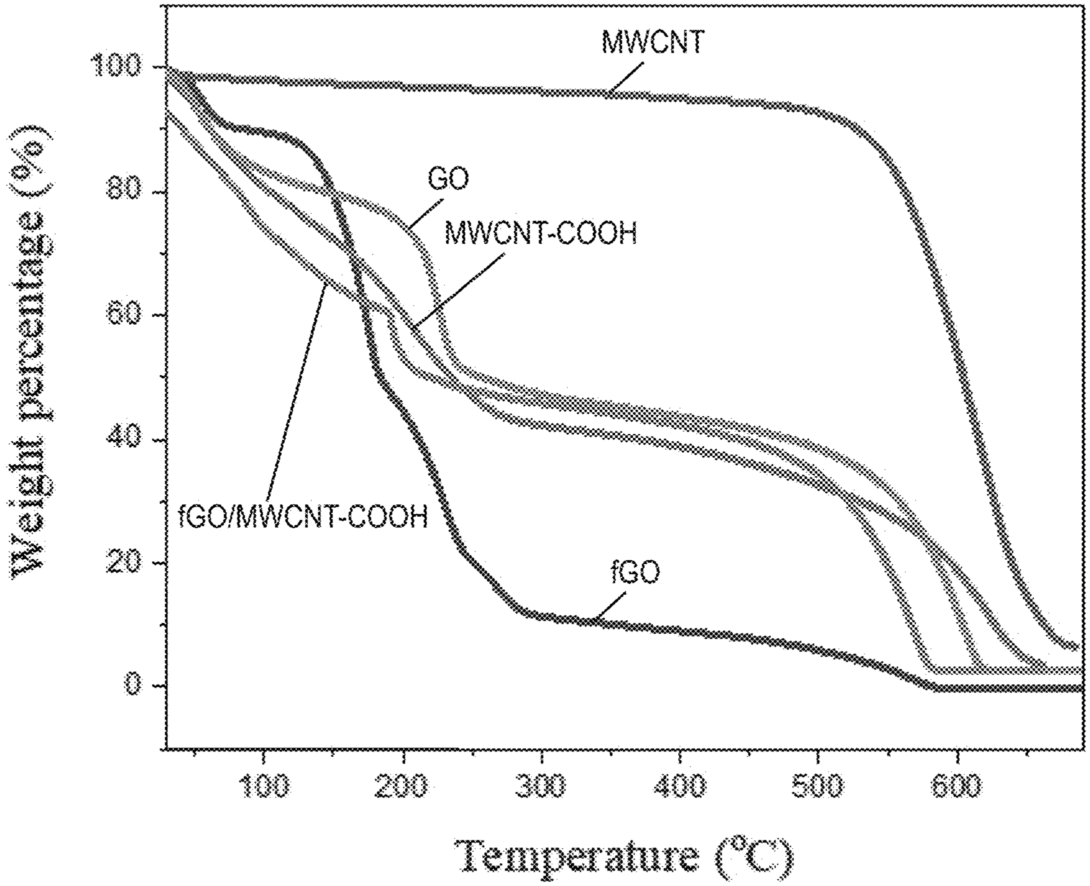
FIG. 23 shows the Thermogravimetric Analyzer (TGA) profiles of the nanoparticles.

The TGA results of MWCNTs, MWCNTs-COOH, GO, f-GO and f-GO/MWCNTs-COOH nanomaterials are shown in FIG. 23. Thermal degradation of GO with weight loss (~20%), occurred between 150 and 250° C., in which it is related to the removal of oxygen-related functional groups from the GO surface. f-GO has a similar thermal degradation trend between 100 and 300° C. due to the decomposition of oxygen and other functional groups. The pristine MWCNTs showed more thermal stability; therefore, they decomposed after 550° C., while the MWCNTs-COOH decomposed between 50 and 300° C. with weight loss (~55%). The synthesized nanohybrid displayed thermal stability, as it decomposed with weight loss (40%) at 400° C.

Effect of Nanohybrid on Negatively Charged Mixed Matrix Membrane Morphology

Figure 24A:
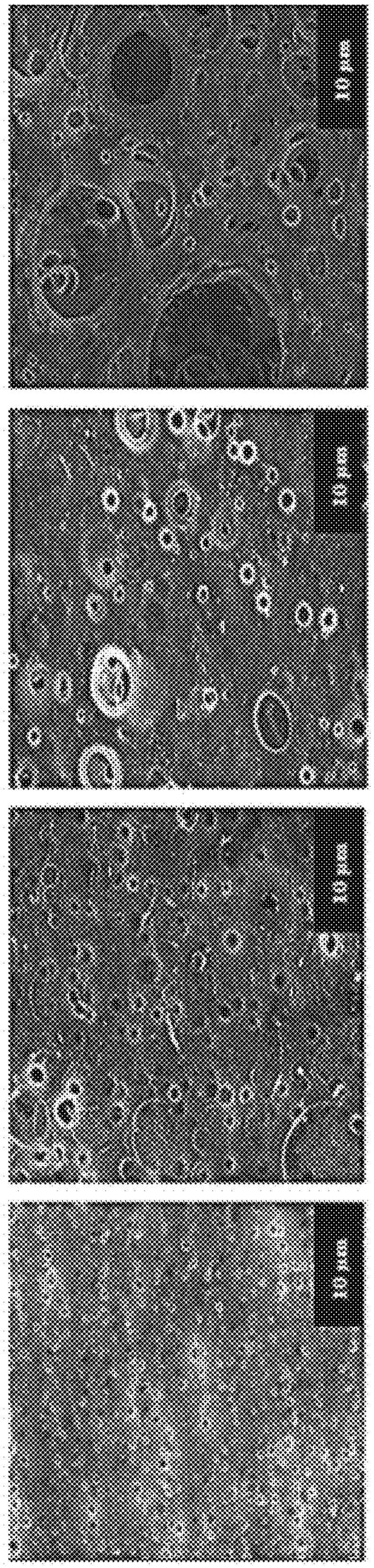
FIG. 24A and FIG. 24B show the (FIG. 24A) surface and (FIG. 24B) cross-sectional SEM images of the synthesized negatively charged mixed matrix membranes.
Figure 24B:
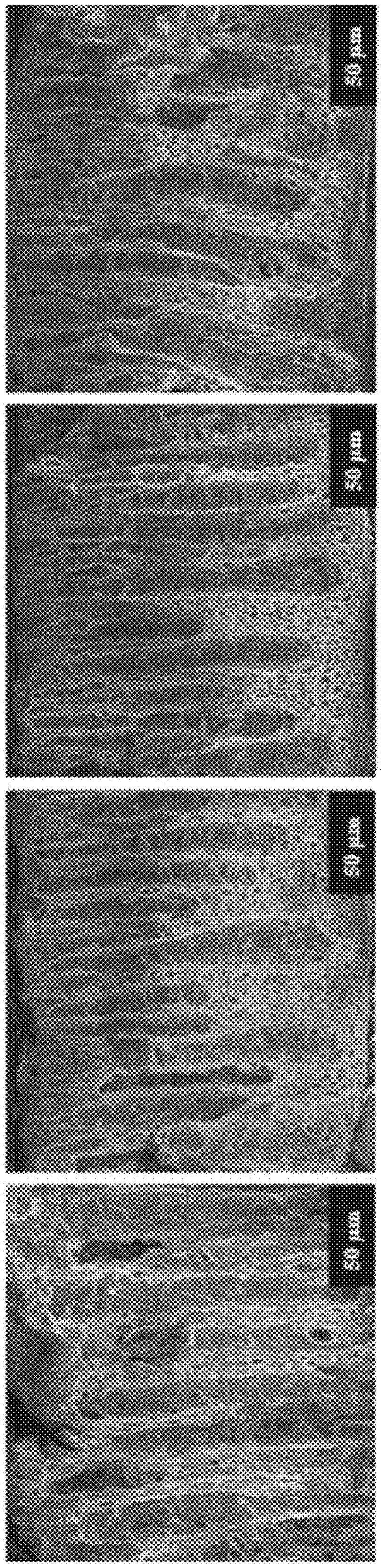

FIGS. 24A and 24B display the surface and cross-sectional SEM images of the pristine PLA and mixed matrix membranes with various nanohybrid loadings. Incorporating the f-GO/MWCNTs-COOH nanohybrid with the PLA improved the porous structure of the membranes by increasing the pore size compared to pristine PLA. The pores became wider as the f-GO/MWCNTs-COOH nanohybrid concentration increased in the membrane matrix from 1.5 to 6 wt. %, as shown in FIG. 24A. This could be attributed to the hydrophilic nature of the nanohybrid, which can lead to a high adsorption tendency, allowing more water penetration during the non-solvent induced phase separation process.

The high asymmetrical structure of the fabricated mixed matrix membranes, including the top dense layer and the finger-like/sponge cavities sublayer, was verified by SEM cross-sectional images as illustrated in FIG. 24B. The creation of finger-like and spongy macrovoid feature was expected because of the differential in solubility rate among the organic additives and PLA. The f-GO/MWCNTs-COOH mixed matrix membranes have a wider and longer finger-like sponge porous structure than the pristine PLA membrane, which has comparatively tiny finger-like pores. This has a favorable impact on the pure water flow during the filtration process.

Figure 25A:
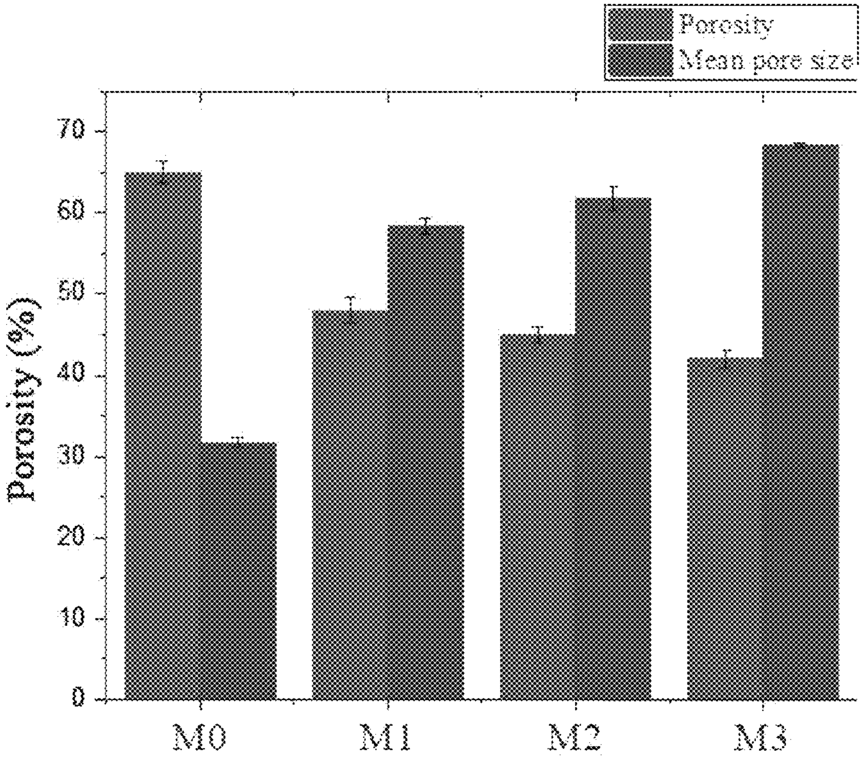
FIG. 25A shows the porosity and mean pore size profiles of the fabricated negatively charged mixed matrix membranes.
Figure 25B:
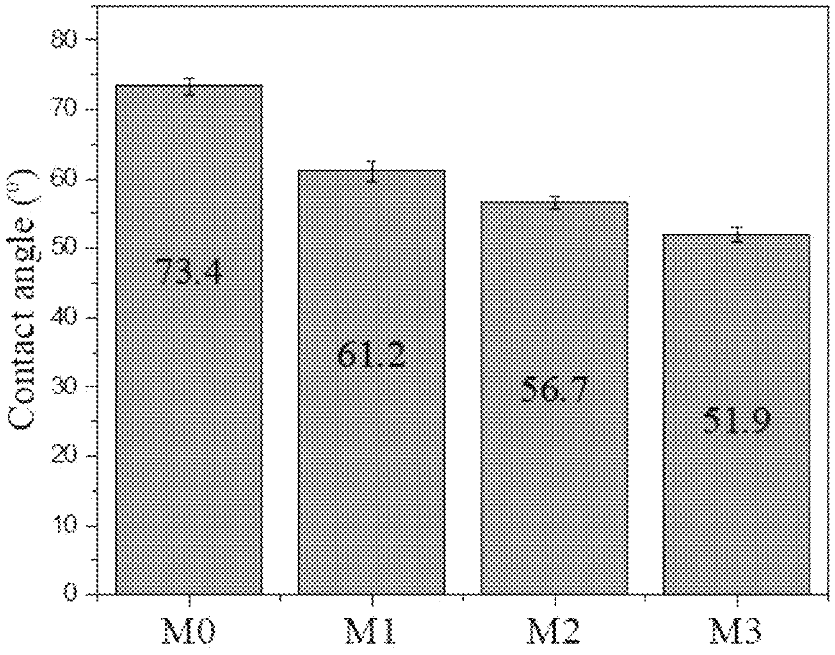
FIG. 25B shows the contact angles of the fabricated negatively charged mixed matrix membranes.

Pore Size, Porosity and Wettability Properties of Negatively Charged Mixed Matrix Membranes The mean pore size increased from 1.9±0.1 nm in M0 to 4.1±0.1 nm in M3. In contrast, the porosity of the fabricated membranes reduced from 65.2±1.2% in M0 to 56.1±1.2% in M3, which could be related to the enhancement in the viscosity of the dope solution as the nanohybrid content increased, causing a slower immersion precipitation (FIG. 25A). Water contact angle analysis was used to investigate membrane hydrophilicity. FIG. 25B shows the values obtained for the contact angles of the membranes. The results revealed that the hydrophilicity of the membranes increased as the loadings of f-GO/MWCNTs-COOH increased as the contact angle values decreased from 73.4±1.3° for the pristine membrane to 51.9±1.1° for the M3 membrane. This reduction in the contact angle values is due to the presence of hydrophilic functional groups (carboxyl, hydroxyl, and amine) in the self-assembled f-GO/MWCNTs-COOH nanohybrid.

Surface Chemistry of Negatively Charged Mixed Matrix Membranes

Figure 26B:
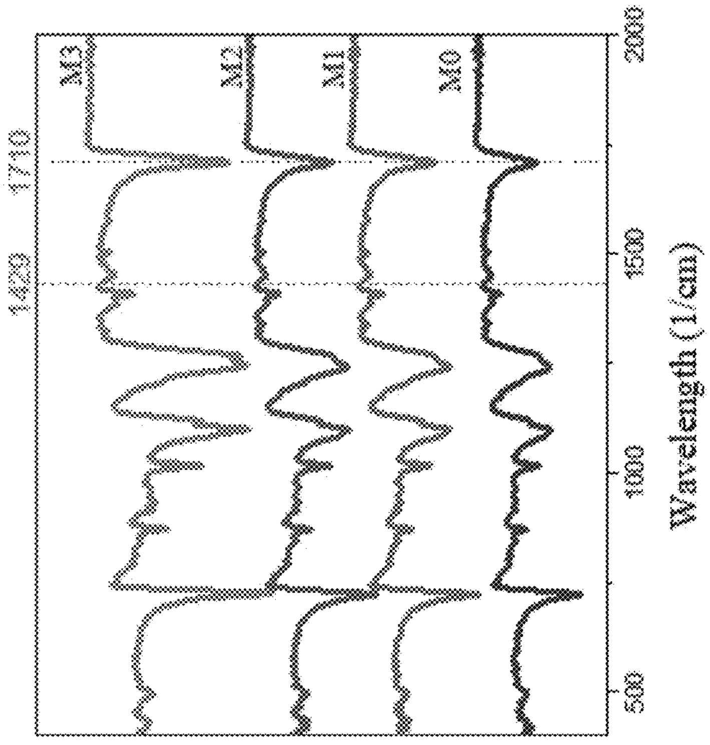
FIGS. 26A-26C show the (FIG. 26A) FT-IR spectrum, (FIG. 26B) magnified FTIR analyses, and (FIG. 26C) XRD analysis of the fabricated negatively charged mixed matrix membranes.
Figure 26A:
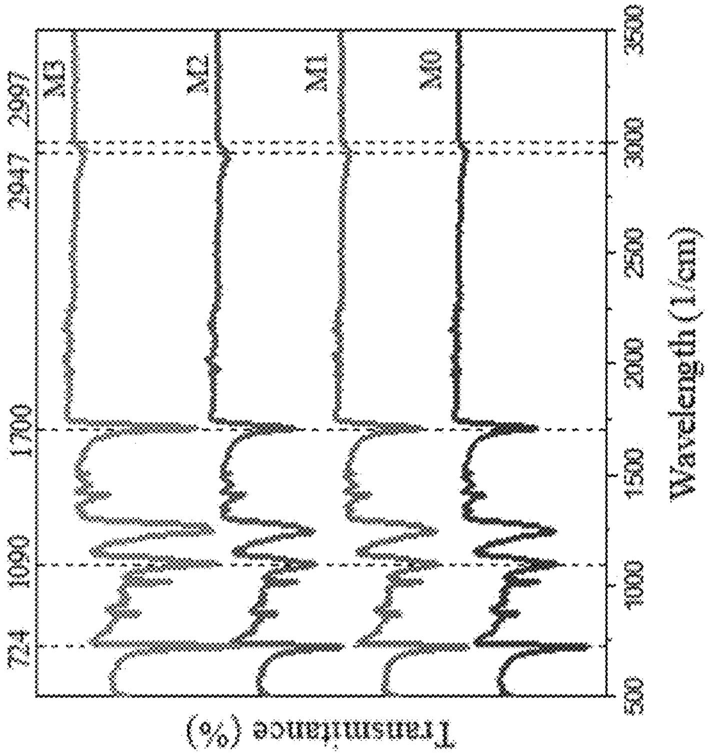
Figure 26C:
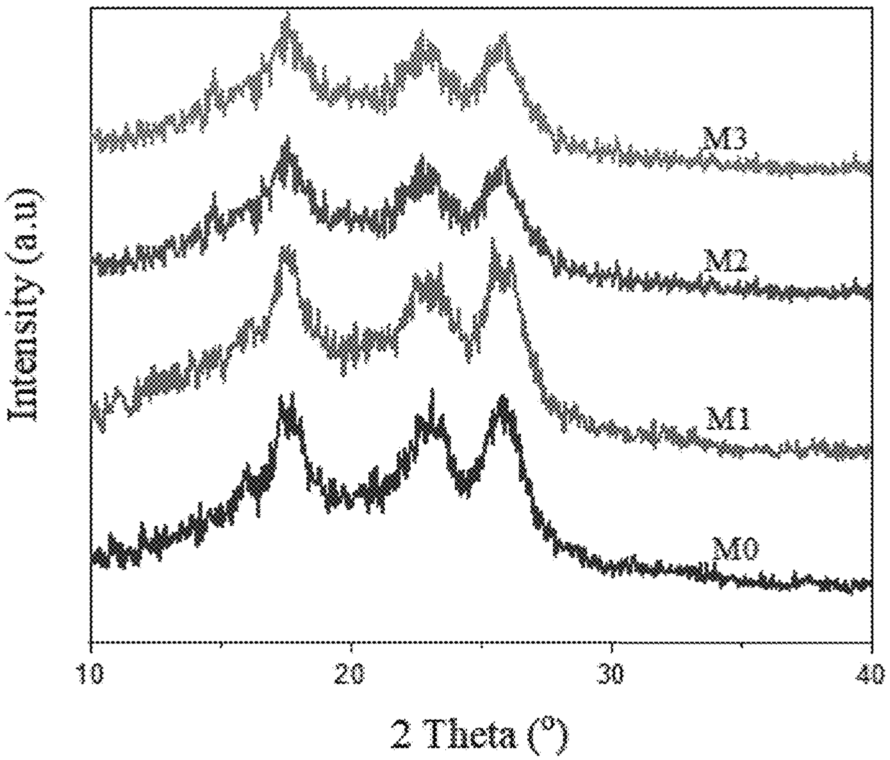

The surface chemistry of the created membranes was studied using FT-IR. FIGS. 26A and 26B show the FT-IR spectra of the membranes with various contents of f-GO/MWCNTs-COOH nanohybrid. The typical absorption peaks were discovered at 1700 $cm^{-1}$ for the stretching vibration of —C═O and 678 $cm^{-1}$ for the bending vibration of the $CH(CH_3)$ plane. Because PLA contains ester groups —C—O, the peak at 1090 $cm^{-1}$ was also obtained. Aside from the 724 $cm^{-1}$ band, which indicates the C—C stretching vibration. Additional PLA peaks were detected at 2947 and 2997 $cm^{-1}$, corresponding to the asymmetric stretching vibration. The carbonyl absorption of PVP is shown by the 1690 $cm^{-1}$ peak (FIG. 26A). Finally, the nanohybrid peaks at 1429 and 1710 $cm^{-1}$ correspond to CO—NH— and C—N asymmetric stretching, respectively, as illustrated in FIG. 26B. Confirmation of the successful production of PLA mixed matrix membranes was obtained, despite the membranes' identical broad-spectrum properties and slight variations in peak intensity. The strength of these two peaks grows and becomes sharper as the nanohybrid content of the composite membranes increases. XRD was performed to examine the structure of the pristine PLA and nanohybrid membranes, as presented in FIG. 26C. All membranes showed an intensity peak at 2θ=16°, 24°, and 27°, a similar pattern for PLA as described in the literature, indicating that PLA has a semi-crystalline structure and no significant changes occurred after the nanohybrid was mixed with the PLA membranes matrix.

Figure 27:
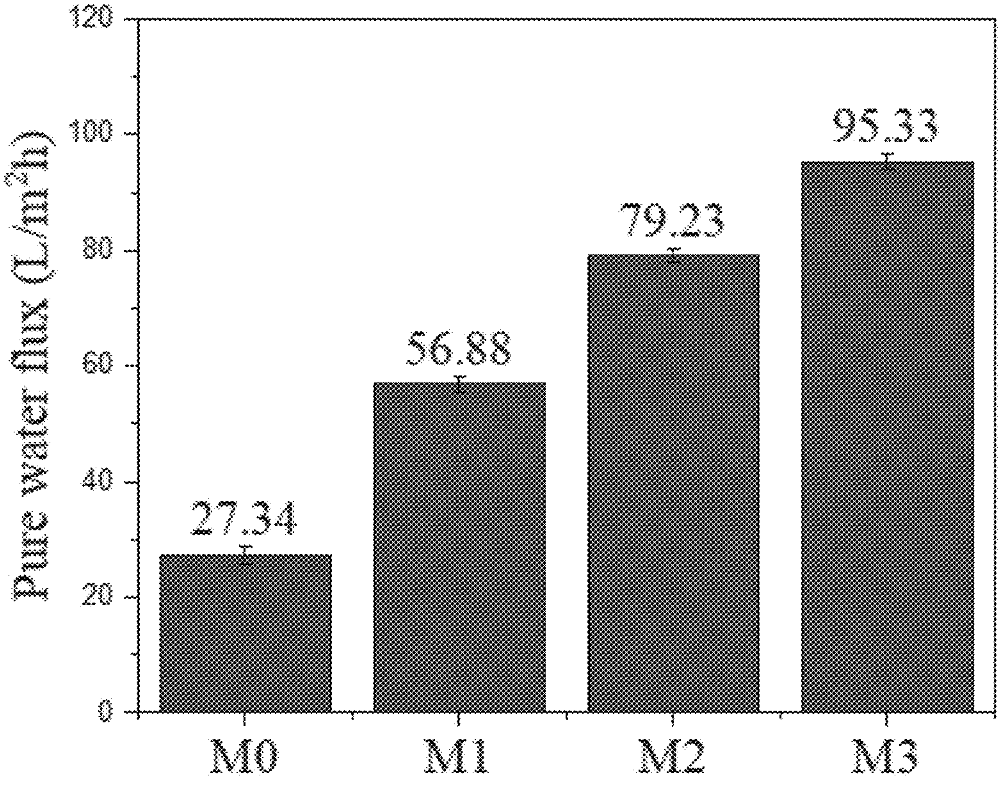
FIG. 27 shows the Pure water flux of the fabricated negatively charged mixed matrix membranes.
Figure 28A:
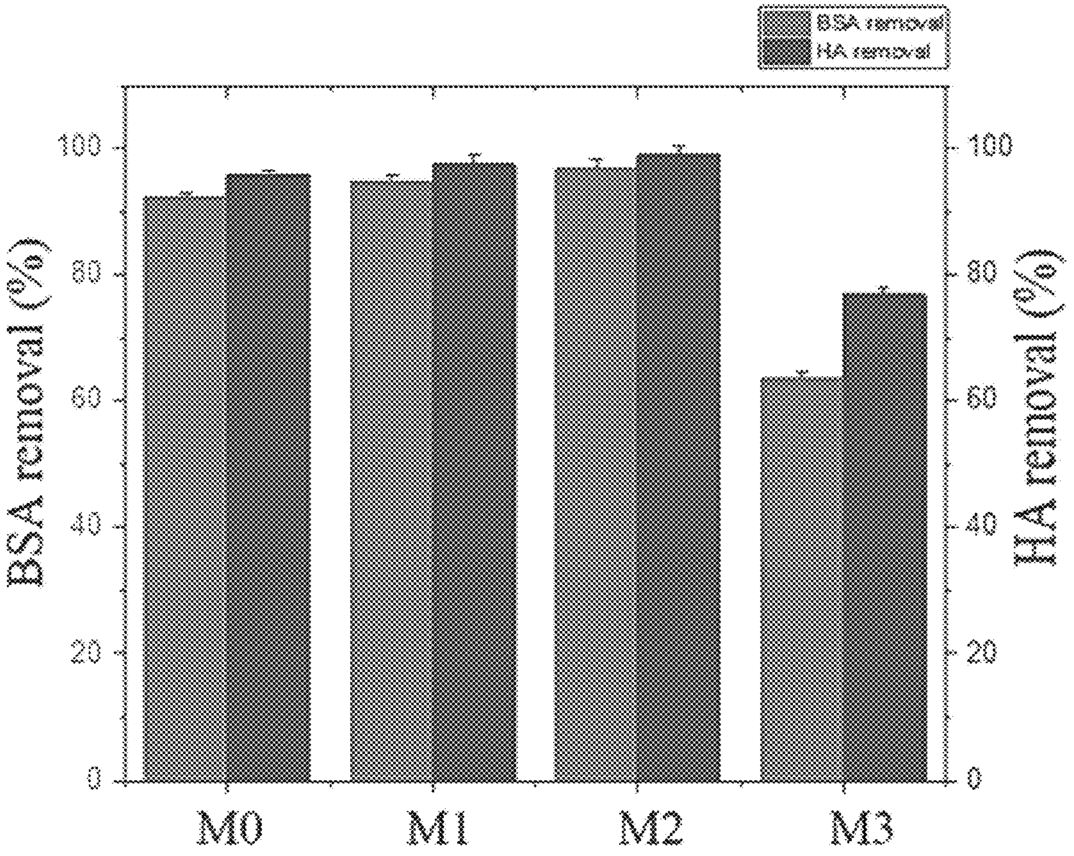
FIG. 28A shows the BSA and HA removal percentages.
Figure 28B:
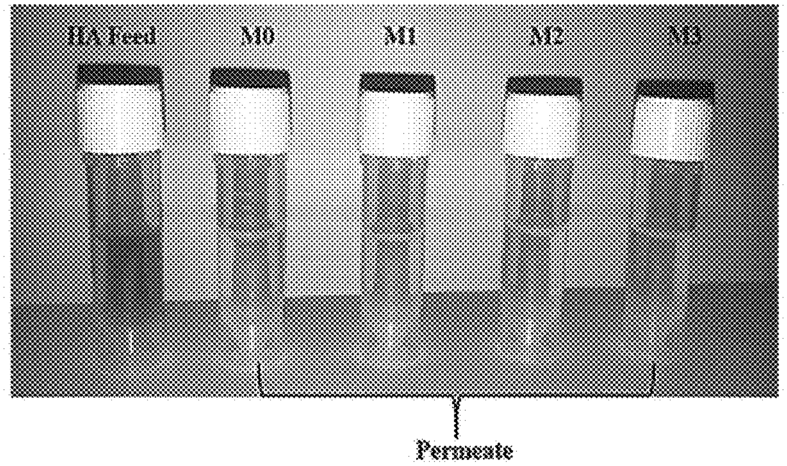
FIG. 28B shows the real photo of HA permeate after filtration using the fabricated negatively charged mixed matrix membranes.

Example 9: Performance of Negatively Charged Mixed Matrix Membranes Using Synthetic Wastewater The results revealed that the incorporation of the hydrophilic nanohybrid f-GO/MWCNTs-COOH with various concentrations from 1.5 to 6 wt % within the membrane matrix improved the water permeability of the fabricated membranes from 27.3±1.6 to 95.3±1.4 L/m 2 h for M0 and M3; respectively as shown in FIG. 27. These findings are consistent with the results of mean pore size, porosity, SEM, and contact angle trends. The addition of f-GO/MWCNTs-COOH nanohybrid up to 3 wt % into the nanohybrid membrane matrix slightly improved the removal of BSA and HA rejection and reached the threshold value. However, when the nanohybrids were incorporated at 6 wt %, the removal efficiency decreased because of the formation of larger pores, as shown in FIG. 28A. The M2 membrane achieved the highest percentages of BSA and HA removal (96% and 98%), due to its morphological feature and moderate pore size values relative to other membranes. M2 membranes' significant BSA and HA rejection might be explained by the charge steric effect and size-exclusion mechanisms, which were generated by the inclusion of a highly negative nanohybrid into the membrane matrix. The negative surface charge of the fabricated membranes augmented as the content of f-GO/MWCNTs-COOH increased. This improves the repulsion forces among the negative BSA/HA and the membrane surface. FIG. 28A shows the BSA and HA removal percentages, and FIG. 28B shows the real photo of HA permeate after filtration using fabricated membranes.

Example 10: Antifouling Characteristics of Negatively Charged Mixed Matrix Membranes Utilising Synthetic Wastewater The fouling potential of the prepared mixed matrix membranes was studied using BSA and HA solutions as organic foulants, as shown in TABLE 5. Several factors affect the antifouling properties of the membrane, including surface hydrophilicity, charge, porosity, and membrane pore size. The addition of the f-GO/MWCNTs-COOH nanohybrid increased the surface hydrophilicity of the mixed matrix membrane, which resulted in improved fouling resistance of the membranes as a hydration layer formed on the membrane surface that prevented the adhesion/accumulation of organic foulants.

TABLE 5

Membrane fouling resistance values using BSA and HA synthetic solutions

| | Membrane | $R_t$(%) | $R_r$(%) | $R_{ir}$(%) |
|---|---|---|---|---|
| BSA | M0 | 88 | 58 | 30 |
| | M1 | 62 | 53 | 21 |
| | M2 | 54 | 52 | 16 |
| | M3 | 53 | 51 | 14 |
| HA | M0 | 71 | 46 | 37 |
| | M1 | 55 | 42 | 25 |
| | M2 | 53 | 41 | 22 |
| | M3 | 49 | 35 | 17 |

The physical deposition of HA eventually resulted in the formation of a fouling layer on the top of the membrane surface, which was quickly removed by washing. However, BSA is more likely to adsorb on the membrane surface and/or inside the membrane pores because of hydrophobic interactions, resulting in more significant membrane fouling. The incorporation of f-GO/MWCNTs-COOH within the PLA membrane reduced the $R_t$, $R_r$ and $R_{ir}$ in values compared to the pristine PLA membrane. Based on the findings of fouling testing, it was noticed that mixed matrix membranes showed less fouling tendency, as the incorporation of nanohybrid mitigates the deposition/adsorption of foulants and the formation of a cake layer on the surface of the membrane or within its pores. Thus, the foulant can be easily washed out using DI water, resulting in superior antifouling performance for negatively charged mixed matrix membranes.

Figure 29:
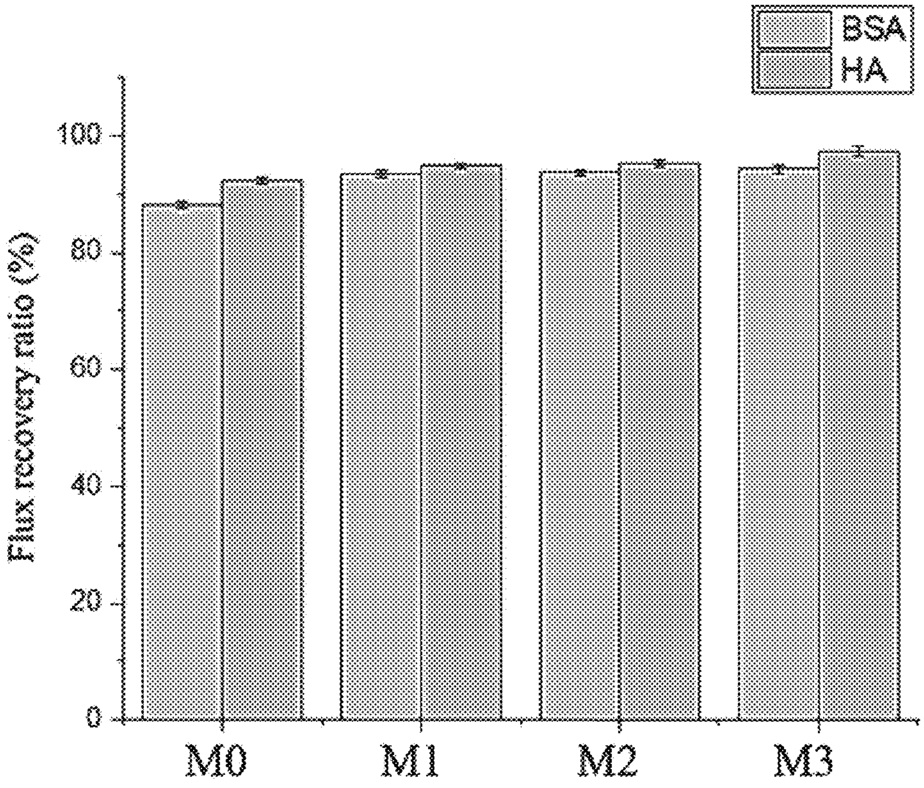
FIG. 29 shows the flux recovery ratio (FRR) of BSA and HA.
Figure 30:
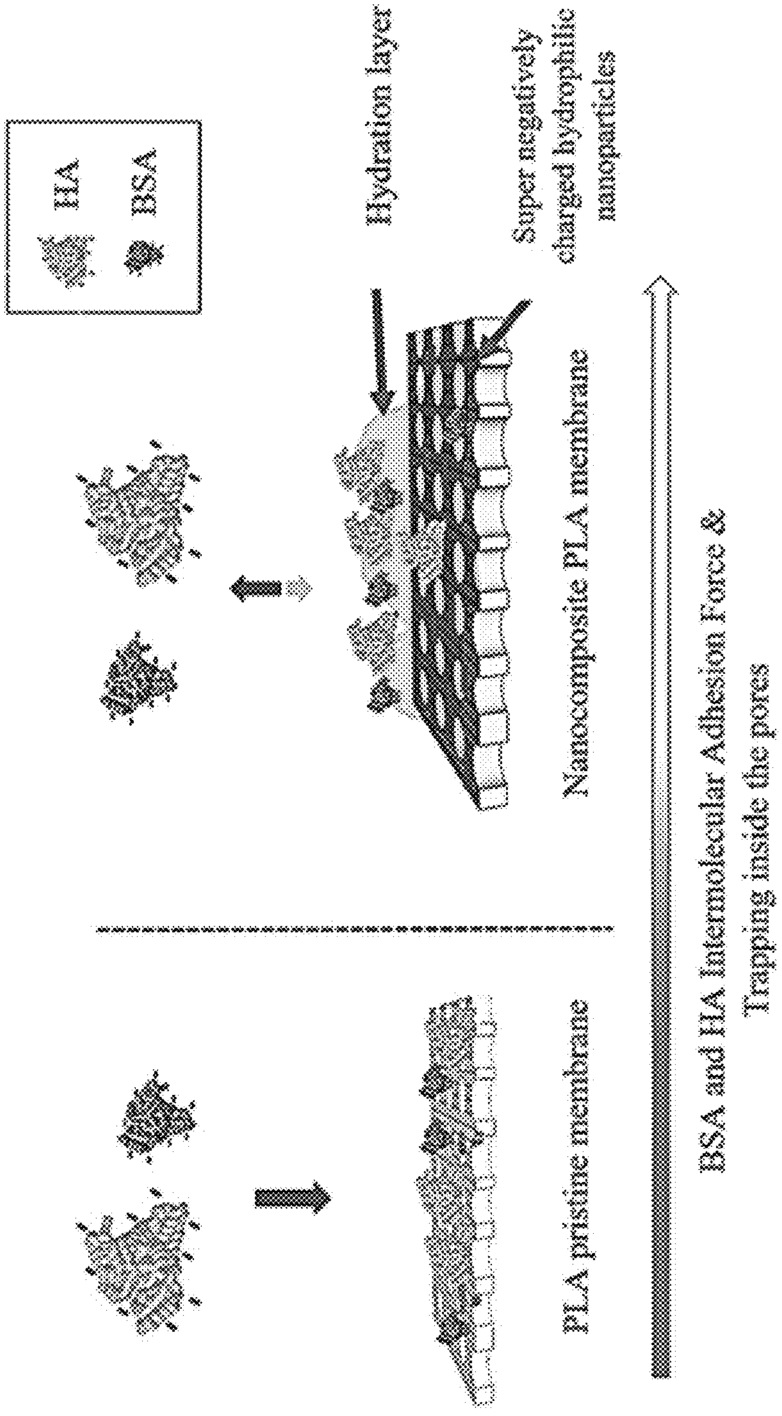
FIG. 30 shows the antifouling mechanisms of fabricated (negatively charged mixed matrix) membranes.

The flux recovery ratio (FRR) values of the prepared negatively charged mixed matrix membranes were calculated to reflect the ease of recovering the water permeation by washing the membrane after fouling. In FIG. 29, the FRR of the PLA membranes increased from 88% to 94% when nanohybrid concentration increased from 0 to 6 wt % using BSA solution as a foulant. This could be attributed to the enhancement of membrane hydrophilicity that mitigated the membrane fouling. A similar trend has been obtained using the HA solution. However, the FRR values of the mixed matrix membranes in the case of HA were better than those of the BSA solution. This could be ascribed to their different antifouling mechanisms as shown in FIG. 30. The removal and antifouling mechanisms of HA and BSA could include the size exclusion and the Donnan repulsion effect, due to the supernegatively charged surface of nanocomposite PLA membrane.

The static adsorption approach was used to evaluate the antifouling capacity of the pristine and mixed matrix membranes, as shown in TABLE 6. Increasing the nanohybrid concentration reduced the equilibrium adsorption quantity of foulants, which is highly related to their hydrophilicity, based on the predicted Q values. It was found that improving the surface hydrophilicity of the membrane reduces foulant adsorption.

TABLE 6

Equilibrium adsorption of foulants for different negatively charged mixed matrix membranes

| | Membrane | Q (μg/cm$^2$) |
|---|---|---|
| BSA | M0 | 51.05 |
| | M1 | 36.27 |
| | M2 | 31.33 |
| | M3 | 28.62 |
| HA | M0 | 49.31 |
| | M1 | 33.63 |
| | M2 | 28.46 |
| | M3 | 23.55 |

Figure 31A:
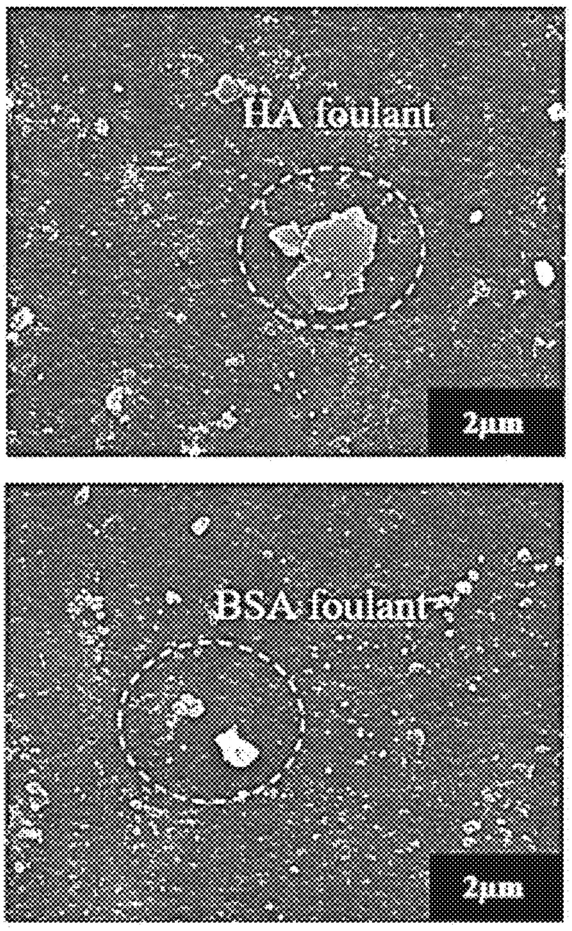
FIGS. 31A and 31B show the surface SEM images of the M2 (negatively charged mixed matrix) membranes (FIG. 31A) after BSA and HA filtration, and (FIG. 31B) after BSA and HA washing with DI water.
Figure 31B:
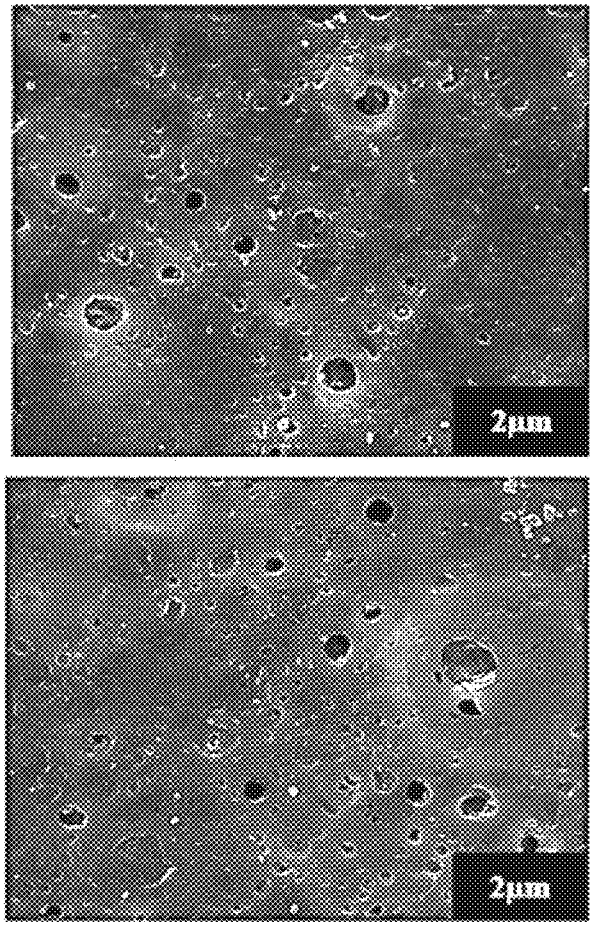
Figure 32:
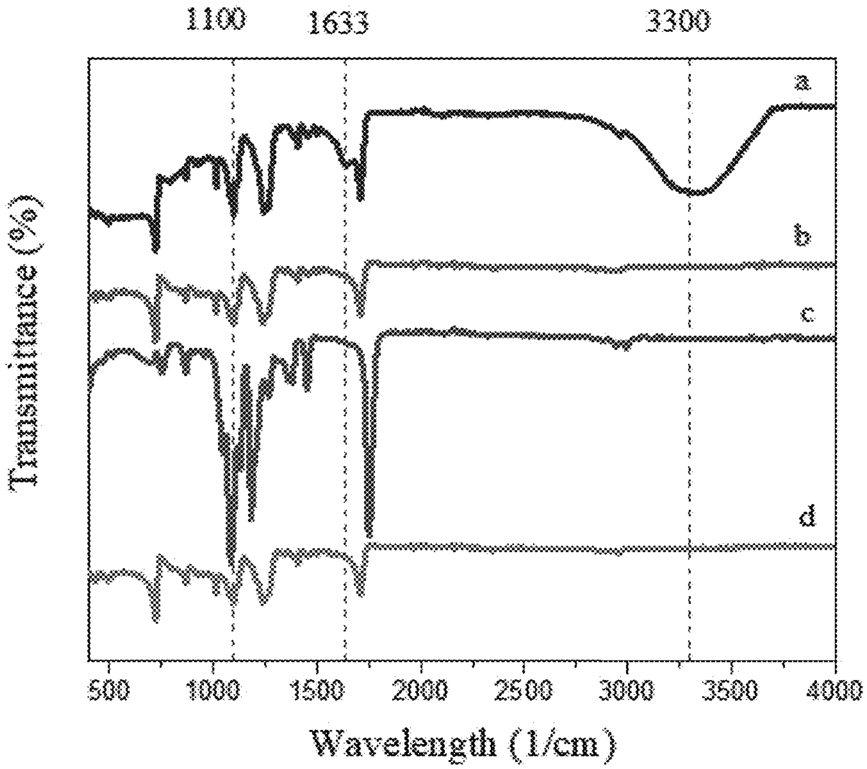
FIG. 32 shows the FT-IR spectra of the M2 (negatively charged mixed matrix) membrane after BSA filtration (a), after washing the membrane with DI water (b), after HA filtration (c) and after washing the membrane with DI water (d).

Example 11: Post-Filtration Characterization of Negatively Charged Mixed Matrix Membranes Using Synthetic Wastewater Further post-filtration characterizations were performed using the optimum M2 membrane. The surface SEM images of M2 membranes post BSA and HA filtration and after DI water washing are shown in FIGS. 31A and 31B. The images obtained from the fabricated M2 membranes revealed that HA accumulated on the surface of the membrane during filtration. The fouling layer formed because of physical deposition was quickly removed by washing (FIG. 31A). Due to hydrophobic interactions, The BSA is more likely to get adsorption on the membrane's surface or become stuck inside its pores, resulting in more severe membrane fouling (FIG. 31B). In addition, the membrane exhibited adsorption interactions among the BSA protein or HA and the membrane surface. In the FT-IR spectra after filtration, a further band shift of the amide group at 1633 cm$^{-1}$ (N—H stretch) was obtained, as shown in FIG. 32. The membranes were rinsed with DI water and FT-IR analysis was performed (FIG. 32). It was found that the BSA peak disappeared; the results confirmed that the washing procedure with water was efficient in eliminating BSA foulant. For the FT-IR spectra after HA filtration, the binding interactions between HA and the membrane surface were verified by observing the peak of humic acid at 1100 cm$^{-1}$ (C—O stretch or OH deformation of COOH). The disappearance of this peak after washing proves the water washing effectiveness with no need for chemical usage.

Figure 33:
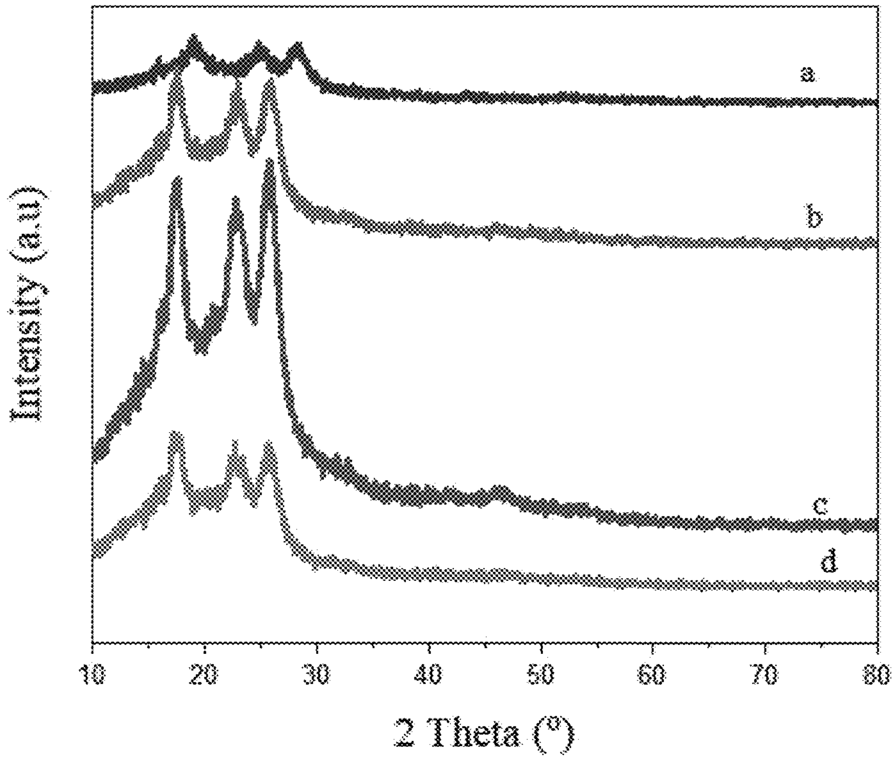
FIG. 33 shows the XRD spectra of the M2 (negatively charged mixed matrix) membrane after BSA filtration (a), after washing the membrane with DI water (b), after HA filtration (c) and after washing the membrane with DI water (d).
Figure 34:
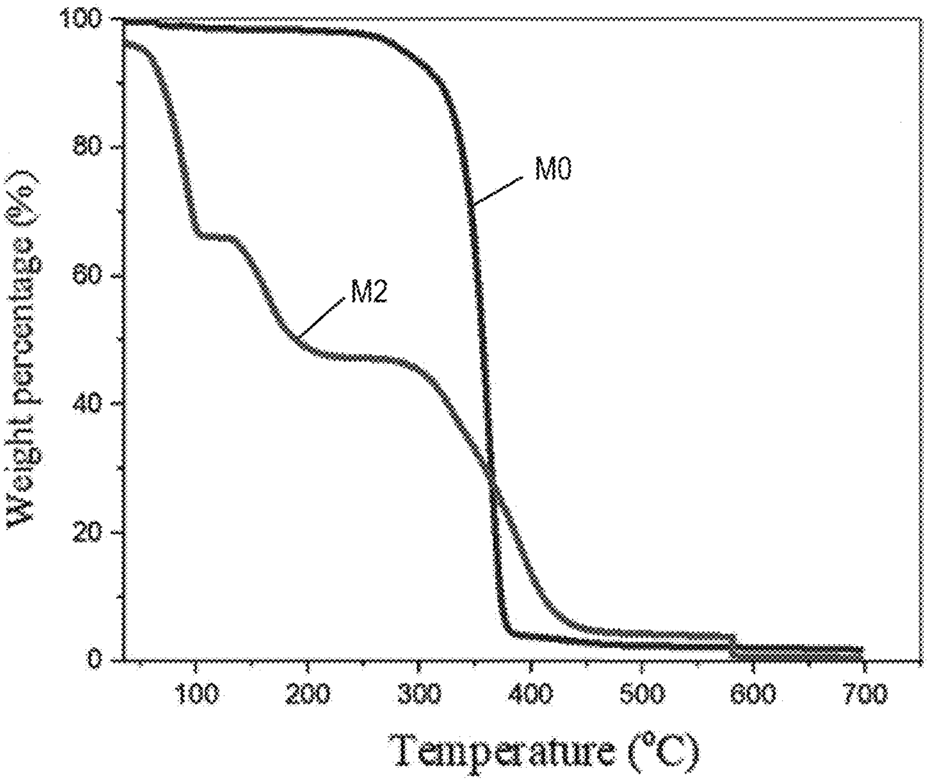
FIG. 34 shows the TGA curves of M0 and M2 fabricated (negatively charged mixed matrix) membranes.

The XRD spectra of the M2 membrane before and after washing the membrane after filtrating BSA and HA solutions are shown in FIG. 33. Based on the obtained spectra, the intensity of the peak changes due to the presence of BSA and HA (as shown in (b) and (c)). The peaks for (a) and (d) have intensities similar to those in FIG. 21C. This confirmed the high anti-fouling behaviour of the M2 membrane. TGA analysis was performed to investigate the thermal stability characteristics of pristine PLA and f-GO/MWCNTs-COOH-based PLA mixed matrix membranes to confirm the influence of nanohybrid on the polymer chain stiffness. TGA was utilized to evaluate the thermal stabilities as a function of weight (%) at a heating rate of 10° C./min. The M2 membrane exhibited thermal decomposition in three phases, including PLA dehydration, thermal fracture of the molecular chain, and thermal degradation of adjacent functional groups, as presented in FIG. 34. The M2 membrane exhibited high thermal stability and degraded at 400° C. compared to M0. Thus, the addition of the nanohybrid increased the membranes' thermal stability.

Figure 35:
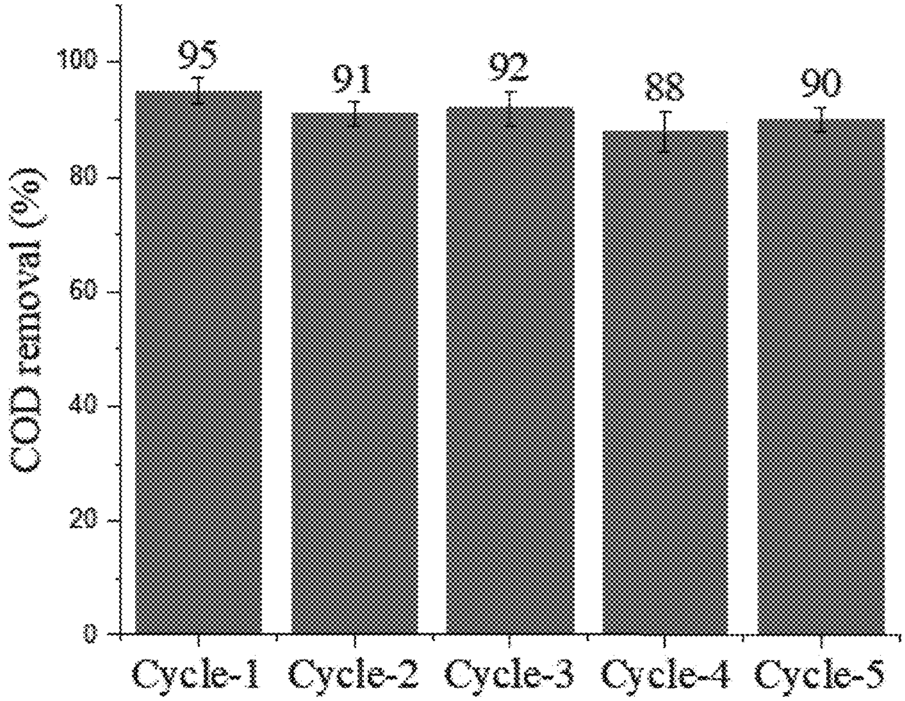
FIG. 35 shows the M2 (negatively charged mixed matrix) membrane COD elimination profile using raw wastewater.
Figure 36A:
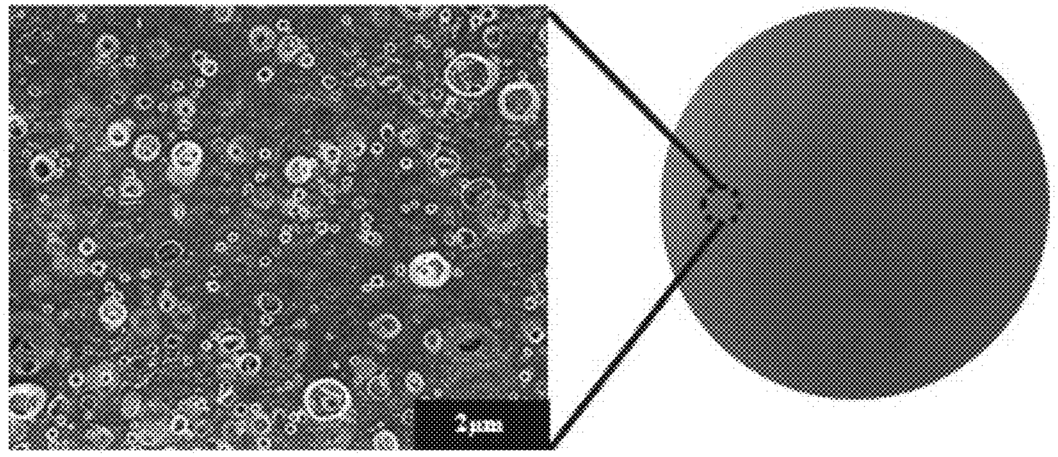
FIGS. 36A-36C show the real images for M2 (negatively charged mixed matrix) membrane (FIG. 36A) before raw wastewater filtration, (FIG. 36B) after raw wastewater filtration, and (FIG. 36C) after washing with DI water.
Figure 36B:
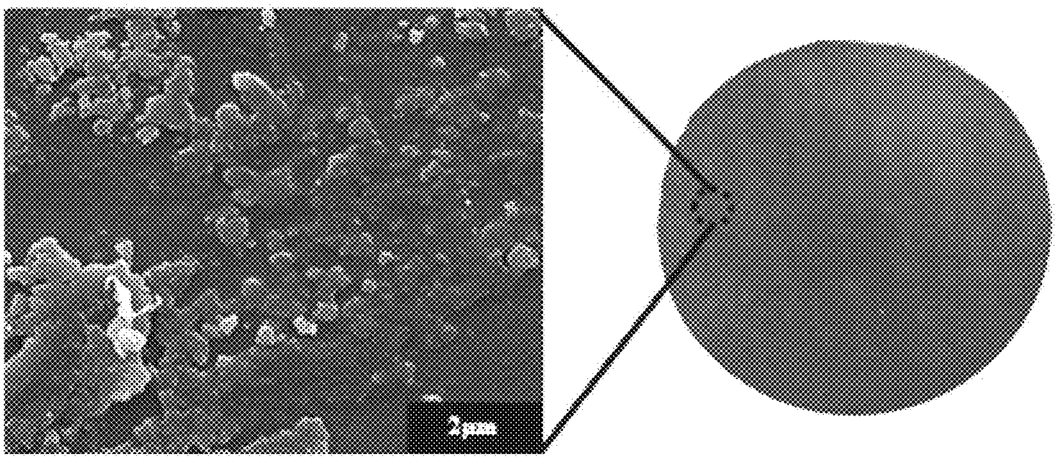
Figure 36C:
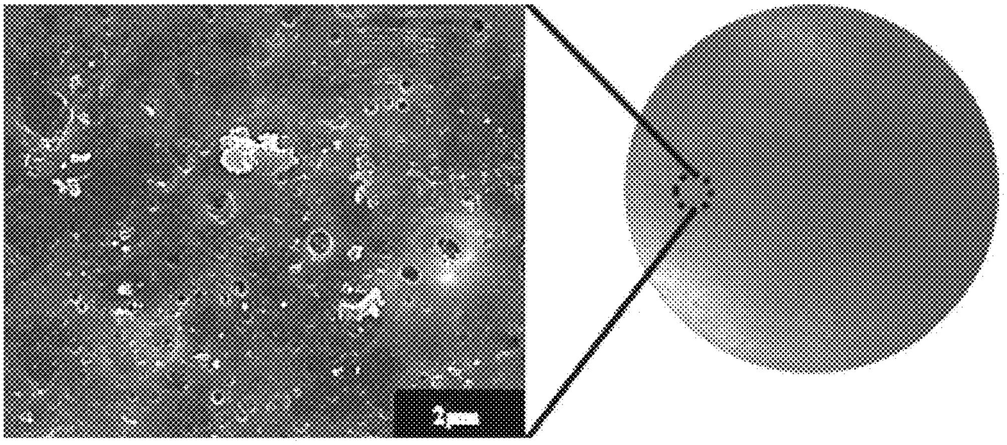

Example 12: Analyzing the Performance of the M2 (Negatively Charged Mixed Matrix) Membrane Using Raw Wastewater Municipal wastewater was taken from a local WWTP and utilised for five filtering cycles to test the M2 membrane's performance and fouling behaviour. At the end of each cycle, the tested membrane was cleaned with DI water physically, and the COD removal was measured as shown in FIG. 35. The COD removal percentages of the cycles were similar, indicating that the membrane had stable COD removal and functionality. The real images of the M2 membrane before raw wastewater filtration (FIG. 36A), after raw wastewater filtration (FIG. 36B) and after washing with DI water (FIG. 36C), demonstrate that the membrane surface was sufficiently physically cleaned with DI water.

To further assess the anti-fouling properties and reusability of the M2 (negatively charged mixed matrix) membrane, the FRR was studied. As shown in TABLE 7, the M2 membrane had a high FRR almost (92%) with just water washing in the first filtering cycle. This may be attributed to the development of a loose and unstable fouled layer on the membrane that can easily be removed. The results are consistent with the results of static BSA adsorption result, indicating that the presence of nanohybrids within the membrane matrix improved antifouling properties. The M2 membrane's hydrophilic character was confirmed by CA analysis due to the incorporation of the f-GO/MWCNTs-COOH nanohybrid. Furthermore, after the five filtration cycles, the FRR values of M2 decreased slightly from 92 to 71%, confirming the practical stability and high resistance to fouling. TABLE 8 shows a comparison of the findings from this study with the literature. The comparison with literature was used in order to clarify that the optimum membrane (M2) demonstrated superior pure water flux and HA and BSA removal concerning other modified polymeric membranes.

TABLE 7

Fouling resistance of M2 membrane utilising raw wastewater

| | $R_t$(%) | $R_r$(%) | $R_{ir}$(%) | FRR(%) |
|---|---|---|---|---|
| Cycle-1 | 78 | 33 | 9 | 92 |
| Cycle-2 | 70 | 41 | 15 | 90 |
| Cycle-3 | 63 | 43 | 16 | 87 |
| Cycle-4 | 73 | 26 | 28 | 83 |
| Cycle-5 | 76 | 30 | 35 | 71 |

TABLE 8

Comparison between literature and the present disclosure for the removal of BSA and HA

| Membrane ID | Pure water flux ($L/m^2h$) | BSA concentration (g/L) | HA concentration (g/L) | BSA removal (%) | HA removal (%) | Pressure used (bar) |
|---|---|---|---|---|---|---|
| M2 | 79.23 | 1 | 1 | 96 | 98 | 1.4 |
| CA-PVP-$TiO_2$ | 300 | 1 | NA | 96.8 | NA | 1 |
| PEI | 30 | 1 | 1 | 96 | 92 | 3.45 |
| PVDF | 75.5 | 1 | NA | 75.9 | NA | 1 |
| PVDF/MWCNT | 102.1 | | | 84.35 | | |
| PVDF/MWCNT/GO | 90.9 | | | 85.01 | | |
| PVDF/OMWCNT | 150.3 | | | 69.36 | | |
| PVDF/OMWCNT/GO | 125.6 | | | 79.03 | | |
| PVDF | 27 | 1 | 1 | 78.3 | 89.5 | 3.45 |
| PVDF/PD | 39.5 | | | 91.2 | 92.5 | |
| PVDF/PEG | 56.4 | | | 76 | 82.7 | |
| PVDF/PEG/PD | 118 | | | 90.5 | 95.4 | |
| PVDF | 25 | 1.5 | 1 | NA | 97 | 1.5 |

While the disclosure has been described with reference to an exemplary embodiment(s), it will be understood by those skilled in the art that various changes may be made, and equivalents may be substituted for elements thereof without departing from the scope of the embodiment(s). In addition, many modifications may be made to adapt a particular situation or material to the teachings of the embodiment(s) without departing from the essential scope thereof. Therefore, it is intended that the disclosure is not limited to the disclosed embodiment(s), but that the disclosure will include all embodiments falling within the scope of the appended claims. Various examples have been described. These and other examples are within the scope of the following claims. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above Thus, the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean “one and only one” unless explicitly so stated, but rather “one or more.” All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

Discussion of Possible Embodiments

The following are non-exclusive descriptions of possible embodiments of the present invention.

Embodiment 1. A positively charged multi-walled carbon nanotube/graphene oxide (f-MWCNT/GO) nanohybrid-based mixed matrix membrane for wastewater treatment, the positively charged mixed matrix membrane comprising:

a self-assembled multi-walled carbon nanotube and graphene oxide (f-MWCNT/GO) nanohybrid; and a polylactic acid (PLA) membrane matrix, wherein the f-MWCNT/GO nanohybrid is integrated into the PLA membrane matrix to form the positively charged mixed matrix membrane.

Embodiment 2. The positively charged mixed matrix membrane of embodiment 1, wherein the f-MWCNT/GO nanohybrid is between about 0.5 wt. % and about 6 wt. % of the mixed matrix membrane.

Embodiment 3. The positively charged mixed matrix membrane of embodiment 2, wherein the f-MWCNT/GO nanohybrid is between about 1.5 wt. % and about 6.0 wt. %.

Embodiment 4. The positively charged mixed matrix membrane of embodiment 2, wherein the f-MWCNT/GO nanohybrid is about 3.0 wt. %.

Embodiment 5. The positively charged mixed matrix membrane of embodiment 1, wherein the multi-walled carbon nanotube and graphene oxide are present in a solvent during formation of the mixed matrix membrane.

Embodiment 6. The positively charged mixed matrix membrane of embodiment 5, wherein the multiwalled carbon nanotube and graphene oxide present in the solvent comprise a dope solution.

Embodiment 7. The positively charged mixed matrix membrane of embodiment 5, wherein the solvent includes at least one of dimethylacetamide (DMac), dioxane, acetonitrile, chloroform, methylene chloride, 1,1,2-trichloroethane and dichloroacetic acid.

Embodiment 8. The positively charged mixed matrix membrane of embodiment 1, wherein the multi-walled carbon nanotube and graphene oxide are present in the nanohybrid in different ratios.

Embodiment 9. The positively charged mixed matrix membrane of embodiment 8, wherein a ratio (by weight) of multi-walled carbon nanotube to graphene oxide is about 60:40.

Embodiment 10. The positively charged mixed matrix membrane of embodiment 8, wherein a ratio (by weight) of multi-walled carbon nanotube to graphene oxide is about 70:30.

Embodiment 11. The positively charged mixed matrix membrane of embodiment 8, wherein a ratio (by weight) of multi-walled carbon nanotube to graphene oxide is about 80:20.

Embodiment 12. The positively charged mixed matrix membrane of embodiment 1, wherein the positively charged mixed matrix membrane is thermally stable up to about 280° C.

Embodiment 13. The positively charged mixed matrix membrane of embodiment 1, wherein the positively charged mixed matrix membrane has a semi-crystalline structure.

Embodiment 14. The positively charged mixed matrix membrane of embodiment 1, wherein the positively charged mixed matrix membrane is configured for removing nutrients comprising nitrogen and phosphorus.

Embodiment 15. The positively charged mixed matrix membrane of embodiment 1, wherein the nanohybrid in the positively charged mixed matrix membrane increases water flux from about 9 to about 140 $L/m^2 \cdot h \cdot bar$.

Embodiment 16. A method of synthesis of a positively charged multi-walled carbon nanotube/graphene oxide (f-MWCNT/GO) nanohybrid-based mixed matrix membrane, the method comprising:

- adding a self-assembled positively charged multi-walled carbon nanotube and graphene oxide (f-MWCNT/GO) nanohybrid to a solvent;
- dispersing the f-MWCNT/GO nanohybrid in the solvent to form a mixture;
- adding polylactic acid (PLA) and polyvinylpyrrolidone (PVP) to the mixture to form a homogeneous dope solution; and
- casting the homogeneous dope solution onto a support to form the positively charged mixed matrix membrane of the f-MWCNT/GO nanohybrid integrated into a PLA membrane matrix.

Embodiment 17. The method of embodiment 16, wherein the solvent is dimethylacetamide (DMAc).

Embodiment 18. The method of embodiment 16, wherein a concentration of the f-MWCNTs/GO nanohybrid in the homogeneous dope solution is between about 0.5 wt. % and about 6.0 wt. % relative to a concentration of PLA in the homogeneous dope solution.

Embodiment 19. The method of embodiment 18, wherein the concentration ranges from about 1.5 wt. % to about 6.0 wt. %.

Embodiment 20. The method of embodiment 16, wherein dispersing the f-MWCNT/GO nanohybrid in the solvent includes sonication.

Embodiment 21. The method of embodiment 16, wherein the self-assembled positively charged f-MWCNT/GO nanohybrid is formed by combining positively functionalized MWCNTs with negatively charged graphene oxide (GO) sheets to form the self-assembled positively charged f-MWCNT/GO nanohybrid.

Embodiment 22. The method of embodiment 21, wherein combining positively functionalized MWCNTs with negatively charged GO sheets includes using more (by weight) of MWCNTs than negatively charged GO sheets.

Embodiment 23. The method of embodiment 22, wherein a ratio of MWCNTs to GO sheets is between about 60:40 to about 80:20 by weight.

Embodiment 24. The method of embodiment 16, wherein adding PLA to the mixture includes adding PLA pellets.

Embodiment 25. The method of embodiment 16, wherein adding PVP to the mixture includes adding PVP powder.

Embodiment 26. The method of embodiment 16, wherein casting is performed using a casting knife.

Embodiment 27. The method of embodiment 16, further comprising immersing the wet membranes in deionized (DI) water coagulation bath after casting.

Embodiment 28. The method of embodiment 27, further comprising rinsing the membranes again with DI water to remove any traces of solvent after immersing.

Embodiment 29. The method of embodiment 28, further comprising drying and storing the resulting membrane at room temperature after rinsing.

Embodiment 30. The method of embodiment 16, wherein the support is a DMAc-wetted support.

Embodiment 31. A negatively charged multi-walled carbon nanotubes (f-GO/MWCNTs-COOH) nanohybrid-based mixed matrix membrane for wastewater treatment, the negatively charged mixed matrix membrane comprising:

- a positively charged Graphene Oxide and negatively charged multi-walled carbon nanotube-COOH (f-GO/MWCNTs-COOH) nanohybrid; and
- a polylactic acid (PLA) membrane matrix,
- wherein the f-GO/MWCNTs-COOH nanohybrid is integrated into the PLA membrane matrix to form the negatively charged mixed matrix membrane.

Embodiment 32. The negatively charged mixed matrix membrane of embodiment 31, wherein the f-GO/MWCNTs-COOH nanohybrid is between about 0.5 wt. % and about 6 wt. % of the mixed matrix membrane.

Embodiment 33. The negatively charged mixed matrix membrane of embodiment 32, wherein the f-GO/MWCNTs-COOH nanohybrid is between about 1.5 wt. % and about 6.0 wt. %.

Embodiment 34. The negatively charged mixed matrix membrane of embodiment 32, wherein the f-GO/MWCNTs-COOH nanohybrid is about 3.0 wt. %.

Embodiment 35. The negatively charged mixed matrix membrane of embodiment 31, wherein a ratio (by weight) of positively charged graphene oxide to negatively charged MWCNT-COOH in the nanohybrid is between about 40:60 to about 20:80.

Embodiment 36. The negatively charged mixed matrix membrane of embodiment 31, wherein the membrane has a pore size ranging from 1.5 nm-5 nm.

Embodiment 37. The negatively charged mixed matrix membrane of embodiment 31, wherein the pore size increases as the amount of f-GO/MWCNT-COOH nanohybrid in the membrane increases.

Embodiment 38. The negatively charged mixed matrix membrane of embodiment 31, wherein the membrane has a semi-crystalline structure.

Embodiment 39. The negatively charged mixed matrix membrane of embodiment 31, wherein the membrane exhibits its water permeability ranging from 25 L/m 2 h to 100 L/m 2 h.

Embodiment 40. The negatively charged mixed matrix membrane of embodiment 31, wherein the membrane is configured for removing organic foulants.

Embodiment 41. The negatively charged mixed matrix membrane of embodiment 31, wherein the f-GO/MWCNTs-COOH nanohybrid is present in a solvent to form a homogeneous dope solution.

Embodiment 42. The negatively charged mixed matrix membrane of embodiment 41, wherein the homogeneous dope solution includes dimethylacetamide (DMAc).

Embodiment 43. The negatively charged mixed matrix membrane of embodiment 31, wherein the negatively charged mixed matrix membrane is thermally stable up to about 50° C.

Embodiment 44. A method of synthesis of a negatively charged self-assembled functionalized graphene oxide carboxylic multi walled carbon nanotubes (f-GO/MWCNTs-COOH) nanohybrid-based mixed matrix membrane, the method comprising:

adding a self-assembled negatively charged f-GO/MWCNTs-COOH nanohybrid to a solvent;

dispersing the f-GO/MWCNTs-COOH nanohybrid in the solvent to form a mixture;

adding polylactic acid (PLA) and polyvinylpyrrolidone (PVP) to the mixture to form a homogeneous dope solution; and casting the homogeneous dope solution onto a support to form the negatively charged mixed matrix membrane of the f-GO/MWCNTs-COOH nanohybrid integrated into a PLA membrane matrix.

Embodiment 45. The method of embodiment 44, wherein the solvent is dimethylacetamide (DMAc).

Embodiment 46. The method of embodiment 44, wherein a concentration of the f-GO/MWCNTs-COOH nanohybrid in the homogeneous dope solution is between about 0.5 wt. % and about 6.0 wt. % relative to a concentration of PLA in the homogeneous dope solution.

Embodiment 47. The method of embodiment 46, wherein the concentration ranges from about 1.5 wt. % to about 6.0 wt. %.

Embodiment 48. The method of embodiment 46, wherein the concentration ranges from about 3.0 wt. % to about 6.0 wt. %.

Embodiment 49. The method of embodiment 44, wherein the self-assembled negatively charged f-GO/MWCNTs-COOH nanohybrid is formed by combining a positively charged functionalized graphene oxide (f-GO) with negatively charged MWCNTs-COOH to form the self-assembled negatively charged f-GO/MWCNTs-COOH nanohybrid.

Embodiment 50. The method of embodiment 49, wherein combining the positively charged f-GO with a negatively charged MWCNTs-COOH includes adding an f-GO solution to a solution containing the negatively charged MWCNT-COOH.

Embodiment 51. The method of embodiment 50, further comprising forming the negatively charged MWCNT-COOH by treating MWCNTs with sulfuric acid ($H_2SO_4$) and nitric acid ($HNO_3$).

Embodiment 52. The method of embodiment 49, wherein combining the positively charged f-GO with negatively charged MWCNTs-COOH includes more (by weight) of MWCNTs-COOH than positively charged f-GO.

Embodiment 53. The method of embodiment 52, wherein a ratio of positively charged f-GO to negatively charged MWCNT-COOH is between about 20:80 to about 40:60 by weight.

Embodiment 54. The method of embodiment 44, wherein adding PLA to the mixture includes adding PLA pellets.

Embodiment 55. The method of embodiment 44, wherein adding PVP to the mixture includes adding PVP powder.

Embodiment 56. The method of embodiment 44, wherein casting is performed using a casting knife.

Embodiment 57. The method of embodiment 44, further comprising immersing the wet membranes in a deionized (DI) water coagulation bath after casting.

Embodiment 58. The method of embodiment 57, further comprising drying and storing the resulting membrane at room temperature after immersing.

Embodiment 59. The method of embodiment 44, wherein the negatively charged nanohybrid mixed matrix membrane has a pore size ranging from about 1.5 nm to about 5 nm.

Various examples have been described. These and other examples are within the scope of the following claims.

What is claimed is:

1. A positively charged multi-walled carbon nanotube/graphene oxide (f-MWCNT/GO) nanohybrid-based mixed matrix membrane for wastewater treatment, the positively charged mixed matrix membrane comprising:

a self-assembled multi-walled carbon nanotube and graphene oxide (f-MWCNT/GO) nanohybrid formed by the combination of positively functionalized MWCNTs with negatively charged graphene oxide sheets; and a polylactic acid (PLA) membrane matrix, wherein the f-MWCNT/GO nanohybrid is integrated into the PLA membrane matrix to form the positively charged mixed matrix membrane.

2. The positively charged mixed matrix membrane of claim 1, wherein the f-MWCNT/GO nanohybrid is between about 0.5 wt. % and about 6 wt. % of the mixed matrix membrane.

3. The positively charged mixed matrix membrane of claim 1, wherein the multi-walled carbon nanotube and graphene oxide are present in a solvent during formation of the mixed matrix membrane.

4. The positively charged mixed matrix membrane of claim 3, wherein the solvent includes at least one of dimethylacetamide (DMAC), dioxane, acetonitrile, chloroform, methylene chloride, 1,1,2-trichloroethane and dichloroacetic acid.

5. The positively charged mixed matrix membrane of claim 1, wherein the multi-walled carbon nanotube and graphene oxide are present in the nanohybrid in different ratios.

6. The positively charged mixed matrix membrane of claim 5, wherein a ratio (by weight) of multi-walled carbon nanotube to graphene oxide is about 60:40.

7. The positively charged mixed matrix membrane of claim 5, wherein a ratio (by weight) of multi-walled carbon nanotube to graphene oxide is about 70:30.

8. A method of synthesis of a positively charged multi-walled carbon nanotube/graphene oxide (f-MWCNT/GO) nanohybrid-based mixed matrix membrane, the method comprising:

forming a self-assembled positively charged multi-walled carbon nanotube and graphene oxide (f-MWCNT/GO) nanohybrid by electrostatic co-precipitation of positively functionalized MWCNTs with negatively charged graphene oxide sheets;

adding the self-assembled positively charged f-MWCNT/GO nanohybrid to a solvent;

dispersing the f-MWCNT/GO nanohybrid in the solvent to form a mixture;

adding polylactic acid (PLA) and polyvinylpyrrolidone (PVP) to the mixture to form a homogeneous dope solution; and casting the homogeneous dope solution onto a support to form the positively charged mixed matrix membrane of the f-MWCNT/GO nanohybrid integrated into a PLA membrane matrix.

9. The method of claim 8, wherein the solvent is dimethylacetamide (DMAC).

10. The method of claim 8, wherein a concentration of the f-MWCNTs/GO nanohybrid in the homogeneous dope solution is between about 0.5 wt. % and about 6.0 wt. %, relative to a concentration of PLA in the homogeneous dope solution.

11. The method of claim 10, wherein the concentration ranges from about 1.5 wt. % to about 6.0 wt. %.

12. The method of claim 8, wherein the self-assembled positively charged f-MWCNT/GO nanohybrid is formed by combining positively functionalized MWCNTs with negatively charged graphene oxide (GO) sheets to form the self-assembled positively charged f-MWCNT/GO nanohybrid.

13. The method of claim 12, wherein combining positively functionalized MWCNTs with negatively charged GO sheets includes using more (by weight) of MWCNTs than negatively charged GO sheets.

14. The method of claim 13, wherein a ratio of MWCNTs to GO sheets is between about 60:40 to about 80:20 by weight.

15. A negatively charged multi-walled carbon nanotubes (f-GO/MWCNTs-COOH) nanohybrid-based mixed matrix membrane for wastewater treatment, the negatively charged mixed matrix membrane comprising:

a self-assembled positively charged Graphene Oxide and negatively charged multi-walled carbon nanotube-COOH (f-GO/MWCNTs-COOH) nanohybrid formed by electrostatic co-precipitation; and a polylactic acid (PLA) membrane matrix, wherein the f-GO/MWCNTs-COOH nanohybrid is integrated into the PLA membrane matrix to form the negatively charged mixed matrix membrane.

16. The negatively charged mixed matrix membrane of claim 15, wherein the f-GO/MWCNTs-COOH nanohybrid is between about 0.5 wt. % and about 6 wt. % of the mixed matrix membrane.

17. The negatively charged mixed matrix membrane of claim 15, wherein a ratio (by weight) of positively charged graphene oxide to negatively charged MWCNT-COOH in the nanohybrid is between about 40:60 to about 20:80.

18. The positively charged mixed matrix membrane of claim 1, wherein the combination of positively functionalized MWCNTs with negatively charged graphene oxide sheets is formed by electrostatic co-precipitation.

19. The positively charged mixed matrix membrane of claim 18, wherein the self-assembled f-MWCNT/GO nanohybrid forms a three-dimensional integrated network through π-π interactions between the MWCNTs and GO.

20. The negatively charged mixed matrix membrane of claim 15, wherein the self-assembled nanohybrid forms a three-dimensional integrated network through π-π interactions.

* * * * *